(12) United States Patent
Song et al.

(10) Patent No.: US 12,475,951 B2
(45) Date of Patent: Nov. 18, 2025

(54) METHOD FOR OPERATING THREE-DIMENSIONAL FLASH MEMORY

(71) Applicant: IUCF-HYU (Industry-University Cooperation Foundation Hanyang University), Seoul (KR)

(72) Inventors: Yun Heub Song, Seoul (KR); Jaemin Sim, Seoul (KR)

(73) Assignee: IUCF-HYU (Industry-University Cooperation Foundation Hanyang University), Seoul (KR)

( * ) Notice: Subject to any disclaimer, the term of this patent is extended or adjusted under 35 U.S.C. 154(b) by 128 days.

(21) Appl. No.: 18/560,681

(22) PCT Filed: Mar. 25, 2022

(86) PCT No.: PCT/KR2022/004191
§ 371 (c)(1),
(2) Date: Nov. 14, 2023

(87) PCT Pub. No.: WO2022/239956
PCT Pub. Date: Nov. 17, 2022

(65) Prior Publication Data
US 2024/0274203 A1    Aug. 15, 2024

(30) Foreign Application Priority Data

May 14, 2021  (KR) .......................... 10-2021-0062345
Jul. 1, 2021  (KR) .......................... 10-2021-0086288
Sep. 2, 2021  (KR) .......................... 10-2021-0116981

(51) Int. Cl.
*G11C 11/00*    (2006.01)
*G11C 16/04*    (2006.01)
(Continued)

(52) U.S. Cl.
CPC .......... *G11C 16/10* (2013.01); *G11C 16/0483* (2013.01); *G11C 16/26* (2013.01);
(Continued)

(58) Field of Classification Search
CPC ..... G11C 16/10; G11C 16/0483; G11C 16/26; G11C 16/3427; G11C 16/3459; G11C 2216/02
See application file for complete search history.

(56) References Cited

U.S. PATENT DOCUMENTS 8,705,273 B2   4/2014  Kim et al.
2019/0148540 A1*  5/2019  Wang ..................... H10B 41/00
                                                257/321
(Continued)

FOREIGN PATENT DOCUMENTS

KR    1020100022228 A    3/2010
KR    1020110001101 A    1/2011
(Continued)

OTHER PUBLICATIONS

Ilsik Ham et al., "Ferroelectric Polarization Aided Low Voltage Operation of 3D NAND Flash Memories", Electronics 2021, Dec. 29, 2020, total pp. 6.
(Continued)

*Primary Examiner* — Pho M Luu
(74) *Attorney, Agent, or Firm* — NKL Law; Jae Youn Kim

(57) ABSTRACT

Provided is a method for operating a program of a three-dimensional flash memory. A program voltage has a value obtained by adding a step voltage to a previous program voltage applied in a previous program operation, and the step voltage is increased as a program operation is repeated. Also, the program operation is performed on a target memory cell by applying a negative voltage to a bit line of (Continued)

a selected cell string and applying the program voltage to a selected word line. In addition, tunneling oxide-charge trap nitride-blocking oxide (ONO) formed surrounding a vertical channel pattern is included, and at least one of a tunneling oxide layer or a blocking oxide layer of the ONO is formed of a ferroelectric material.

11 Claims, 26 Drawing Sheets

(51) Int. Cl.
  *G11C 16/10* (2006.01)
  *G11C 16/26* (2006.01)
  *G11C 16/34* (2006.01)
(52) U.S. Cl.
  CPC ...... *G11C 16/3427* (2013.01); *G11C 16/3459* (2013.01); *G11C 2216/02* (2013.01)

(56) References Cited

U.S. PATENT DOCUMENTS

2019/0198525 A1\* 6/2019 Arreghini ............ H10D 30/689
2022/0013532 A1\* 1/2022 Young ................... G11C 16/08

FOREIGN PATENT DOCUMENTS

| KR | 1020110096414 A | 8/2011 |
| KR | 1020140086599 A | 7/2014 |
| KR | 1020170093099 A | 8/2017 |
| KR | 1020190076483 A | 7/2019 |
| KR | 1020200051926 A | 5/2020 |

OTHER PUBLICATIONS

Zhen Fan et al., "Ferroelectric HfO2-based materials for next-generation ferroelectric memories", Journal of Advanced Dielectrics vol. 6, No. 2 (2016) 1630003 (11 pages).

\* cited by examiner

Negative bias : -10V
FeFET

Vth of specific cell only shifted

Positive bias : 10V
FeFET ground state

FeFet cell also returned to Erase Vth state by polarization change

METHOD FOR OPERATING THREE-DIMENSIONAL FLASH MEMORY

TECHNICAL FIELD

The following embodiments relate to an operating method of a three-dimensional flash memory, and more particularly, relate to a technology associated with a method for an ISPP (Incremental step pulse programming)-based program operation, a method for an improved program operation, and a method for a program operation making a memory window wider.

BACKGROUND ART

A flash memory device that is an electrically erasable programmable read only memory (EEPROM) controlling the data input/output through the F-N (Fowler-Nordheim) tunneling or the hot electron injection may be used in common in a computer, a digital camera, an MP3 player, a game system, a memory stick, etc.

The flash memory device uses an ISPP (Incremental step pulse programming) scheme to solve the issue that a program characteristic is degraded as a program operation is repeated.

The ISPP scheme is a program scheme in which there is applied a program voltage increased as much as a step voltage of a given magnitude as the program operation is repeated; as illustrated in FIG. 1 being a conceptual diagram for describing an existing ISPP scheme, a program voltage Vpgm2 obtained by adding a step voltage ΔV and a program voltage Vpgm1 applied in a first program operation is applied in a second program operation, and a program voltage Vpgm3 obtained by adding the step voltage ΔV and the program voltage Vpgm2 applied in the second program operation is applied in a third program operation.

The existing ISPP scheme is characterized in that the step voltage ΔV that is the difference between a previous program voltage applied in a previous program operation and a current program voltage applied in a current program operation is maintained always uniformly regardless of the repetition of the program operation.

However, even though the program voltage is increased as the program operation is repeated, the existing ISPP scheme has the limitation of failing to prevent the issue that the program characteristic is degraded depending on the degree of nitride trap of an ONO used as a data storage pattern.

Accordingly, the following embodiments are intended to provide a technology for overcoming the limitation of the existing ISPP scheme.

Also, nowadays, as the number of layers and the degree of integration of the three-dimensional flash memory are increasing, issues such as a decrease in a speed at which program operation is performed and a decrease in a cell current are emerging due to the increasing number of layers and the increasing degree of integration. Accordingly, to solve the above issues, a method of applying the program voltage Vpgm whose value is greater than that of the existing program voltage Vpgm has been proposed; however, the method has the issue of laying a burden on a circuit of the three-dimensional flash memory and having a bad influence on memory reliability.

Accordingly, the following embodiments are intended to provide a technology for solving the above issues.

In addition, because the three-dimensional flash memory is also limited by a limited physical size and the limited degree of integration, the research and development has recently been conducted on a technology for implementing multi-level data for storage.

However, the existing data multi-level implementation technology has the limitation of implementing a 4-bit level with a memory window of about 7 V. Accordingly, there is a need to propose a technology for expanding the memory window to implement 5 bits or more.

DETAILED DESCRIPTION OF THE INVENTION

Technical Problem

Embodiments provide a program operation method of a three-dimensional flash memory using an improved ISPP scheme to overcome the limitations of an existing ISPP scheme.

In detail, embodiments provide a program operation method of a three-dimensional flash memory allowing a step voltage to increase as a program operation is repeated.

In addition, to solve a problem caused by a high program voltage, embodiments provide a three-dimensional flash memory using a relatively low program voltage by applying a voltage of a negative value to a bit line of a selected cell string, a program operation method thereof, and an electronic system including the same.

Also, embodiments provide a three-dimensional flash memory applying a voltage of a positive value to a back gate included in a vertical channel pattern to improve a cell current, a read operation method thereof, and an electronic system including the same.

In addition, embodiments provide a three-dimensional flash memory using both a charge trap nitride layer of an ONO (Tunneling Oxide-Charge Trap Nitride-Blocking Oxide) and a layer formed of a ferroelectric material as a data storage element, to expand a memory window and to implement a multi-value.

However, technical problems to be solved by the present disclosure are not limited to the above problems, and may be expanded in various ways without departing from the technical spirit and scope of the invention.

Technical Solution

According to an embodiment, a program operation method of a three-dimensional flash memory which includes word lines formed on a substrate to extend in a horizontal direction and disposed to be spaced from each other in a vertical direction; and cell strings penetrating the word lines and formed to extend in the vertical direction, each of the cell strings including a data storage pattern formed to extend in the vertical direction and a vertical channel pattern covering an inner sidewall of the data storage pattern and formed to extend in the vertical direction, and the data storage pattern and the vertical channel pattern constituting memory cells corresponding to the word lines may include applying a program voltage to a selected word line corresponding to a target memory cell from among the word lines, wherein the program voltage has a value obtained by adding a step voltage to a previous program voltage applied in a previous program operation. The step voltage may be increased as a program operation is repeated.

According to an aspect, the step voltage may be uniformly maintained for each program voltage range and may be increased when the program voltage range is changed.

According to another aspect, a step voltage increasing the program voltage may be continuously increased in proportion to that the program operation is repeated.

According to an embodiment, a method for a program operation of a three-dimensional flash memory which includes word lines formed on a substrate to extend in a horizontal direction and disposed to be spaced from each other in a vertical direction; and cell strings penetrating the word lines and formed to extend in the vertical direction, each of the cell strings including a data storage pattern formed to extend in the vertical direction and a vertical channel pattern covering an inner sidewall of the data storage pattern and formed to extend in the vertical direction, and the data storage pattern and the vertical channel pattern constituting memory cells corresponding to the word lines may include applying a voltage of a negative value to a bit line of a selected cell string corresponding to a target memory cell targeted for the program operation from among the cell strings, applying a program voltage to a selected word line corresponding to the target memory cell from among the word lines, and performing the program operation on the target memory cell by forming a channel in the vertical channel pattern included in the selected cell string, in response to that the voltage of the negative value is applied to the bit line of the selected cell string and the program voltage is applied to the selected word line.

According to an aspect, the applying of the voltage of the negative value to the bit line of the selected cell string may include applying the voltage of the negative value to the bit line of the selected cell string such that a voltage between the selected word line and the bit line of the selected cell string is directly transferred to the vertical channel pattern included in the selected cell string.

According to another aspect, when the vertical channel pattern includes a back gate formed to extend in the vertical direction with at least a portion thereof surrounded by the vertical channel pattern, the applying of the program voltage to the selected word line may include floating remaining unselected word lines other than the selected word line among the word lines, and applying a pass voltage to the back gate.

According to another aspect, the floating of the unselected word lines may include preventing a disturb phenomenon due to the pass voltage applied to the unselected word lines as each of the unselected word lines is floated.

According to another aspect, when the vertical channel pattern includes a back gate formed to extend in the vertical direction with at least a portion thereof surrounded by the vertical channel pattern, the applying of the program voltage to the selected word line may include applying a ground voltage of each of remaining unselected word lines other than the selected word line among the word lines, and applying a pass voltage to the back gate.

According to an embodiment, a three-dimensional flash memory may include word lines formed on a substrate to extend in a horizontal direction and disposed to be spaced from each other in a vertical direction, and cell strings penetrating the word lines and formed to extend in the vertical direction. Each of the cell strings may include a data storage pattern formed to extend in the vertical direction, and a vertical channel pattern covering an inner sidewall of the data storage pattern and formed to extend in the vertical direction, the data storage pattern and the vertical channel pattern constituting memory cells corresponding to the word lines. The three-dimensional flash memory may be configured such that in a program operation, a voltage of a negative value is applied to a bit line of a selected cell string corresponding to a target memory cell targeted for the program operation from among the cell strings.

According to an embodiment, a method for a read operation of a three-dimensional flash memory which includes word lines formed on a substrate to extend in a horizontal direction and disposed to be spaced from each other in a vertical direction; and cell strings penetrating the word lines and formed to extend in the vertical direction, each of the cell strings including a data storage pattern formed to extend in the vertical direction and a vertical channel pattern covering an inner sidewall of the data storage pattern and formed to extend in the vertical direction, the data storage pattern and the vertical channel pattern constituting memory cells corresponding to the word lines, and the vertical channel pattern including a back gate formed to extend in the vertical direction with at least a portion thereof surrounded by the vertical channel pattern may include applying a first voltage higher than a ground voltage to a bit line of a selected cell string corresponding to a target memory cell targeted for the read operation from among the cell strings, applying a verify voltage to a selected word line corresponding to the target memory cell from among the word lines, applying a read voltage to each of remaining unselected word lines other than the selected word line among the word lines, applying a voltage of a positive value to the back gate, and performing the read operation on the target memory cell, in response to that the first voltage is applied to the bit line of the selected cell string, the verify voltage is applied to the selected word line, a pass voltage is applied to each of the unselected word lines, and the voltage of the positive value is applied to the back gate.

According to an embodiment, a three-dimensional flash memory may include word lines formed to extend in a horizontal direction and disposed to be spaced from each other in a vertical direction, and vertical channel structures penetrating the word lines and formed to extend in the vertical direction. Each of the vertical channel structures may include a vertical channel pattern formed to extend in the vertical direction, and an ONO (Tunneling Oxide-Charge Trap Nitride-Blocking Oxide) formed to surround the vertical channel pattern. At least one of a tunneling oxide layer or a blocking oxide layer of the ONO may be formed of a ferroelectric material. The ONO and the vertical channel pattern may constitute memory cells corresponding to the word lines.

According to an aspect, the three-dimensional flash memory uses a charge trap nitride layer of the ONO as a primary data storage element and uses at least one layer formed of the ferroelectric material from among the tunneling oxide layer or the blocking oxide layer as a secondary data storage element.

According to an aspect, the three-dimensional flash memory may perform a two-step program operation including a first-step program operation which generates FN tunneling by applying a program voltage of a positive value to a target memory cell targeted for a program operation from among the plurality of memory cells, and a second-step program operation which increases a threshold voltage of the target memory cell by applying a program voltage of a negative value to the target memory cell such that a polarization phenomenon is generated in a region corresponding to the target memory cell among the at least one layer formed of the ferroelectric material.

According to an aspect, the three-dimensional flash memory may apply the program voltage of the positive value to the target memory cell to place positive charges at an interface with the charge trap nitride layer within a region corresponding to the target memory cell among the at least one layer formed of the ferroelectric material such that a threshold voltage of the target memory cell decreases to a negative region, and may apply the program voltage of the negative value to the target memory cell to place negative charges at the interface with the charge trap nitride layer within a region corresponding to the target memory cell among the at least one layer formed of the ferroelectric material such that the threshold voltage of the target memory cell increases to a positive region.

Advantageous Effects of the Invention

Embodiments provide a program operation method of a three-dimensional flash memory using an improved ISPP scheme, and thus, the limitation of an existing ISPP scheme may be overcome.

In detail, embodiments provide a program operation method of a three-dimensional flash memory allowing a step voltage to increase as a program operation is repeated.

In addition, embodiments provide a three-dimensional flash memory using a relatively low program voltage by applying a voltage of a negative value to a bit line of a selected cell string, a program operation method thereof, and an electronic system including the same.

Accordingly, the three-dimensional flash memory according to embodiments may solve the problem—the problem of laying a burden on a three-dimensional flash memory—caused by a high program voltage and may improve the reliability of memory.

Also, embodiments provide a three-dimensional flash memory applying a voltage of a positive value to a back gate included in a vertical channel pattern, a read operation method thereof, and an electronic system including the same.

As such, the three-dimensional flash memory according to embodiments may improve a cell current.

In addition, embodiments provide a three-dimensional flash memory expanding a memory window and implementing a multi-value, by using both a charge trap nitride layer of an ONO (Tunneling Oxide-Charge Trap Nitride-Blocking Oxide) and a layer formed of a ferroelectric material as a data storage element.

However, the present disclosure is not limited to the effects, and the effects may be variously expanded without departing from the technical spirit and scope of the invention.

BEST MODE

Below, embodiments of the present disclosure will be described in detail with reference to accompanying drawings. However, the present disclosure is not limited by the embodiments. Also, the same reference signs/numerals in each drawing indicate the same members.

In addition, terminologies used in the specification that are terms used to appropriately express a preferred embodiment of the present disclosure may vary depending on the intention of the viewer, operator, or customs in the field to which the invention belongs. Therefore, definitions of these terms should be made based on the content throughout the specification. For example, in the specification, singular forms also include plural forms unless specifically stated otherwise in the context. Also, components, steps, operations, and/or elements described through the terms "comprise" and/or "comprising" used in the specification do not preclude the presence or addition of one or more other components, steps, operations, and/or elements. Additionally, even though the terms such as first and second are used in the specification to describe various areas, directions, and shapes, the areas, directions, and shapes should not be limited by these terms. These terms are merely used to distinguish one area, direction or shape from another area, direction or shape. Accordingly, a portion/part referred to as a "first part/portion" in one embodiment may be referred to as a "second part/portion" in another embodiment.

In addition, it should be understood that various embodiments of the present disclosure are different from each other but are not necessarily mutually exclusive. For example, specific shapes, structures and characteristics described herein may be implemented in other embodiments without departing from the spirit and scope of the invention with respect to one embodiment. Also, it should be understood that a location, placement, or configuration of an individual component may be changed without departing from the technical spirit and scope of the invention in each embodiment category presented.

Below, a three-dimensional flash memory, an operating method thereof, and an electronic system including the same, according to embodiments, will be described in detail with reference to drawings.

Figure 1:
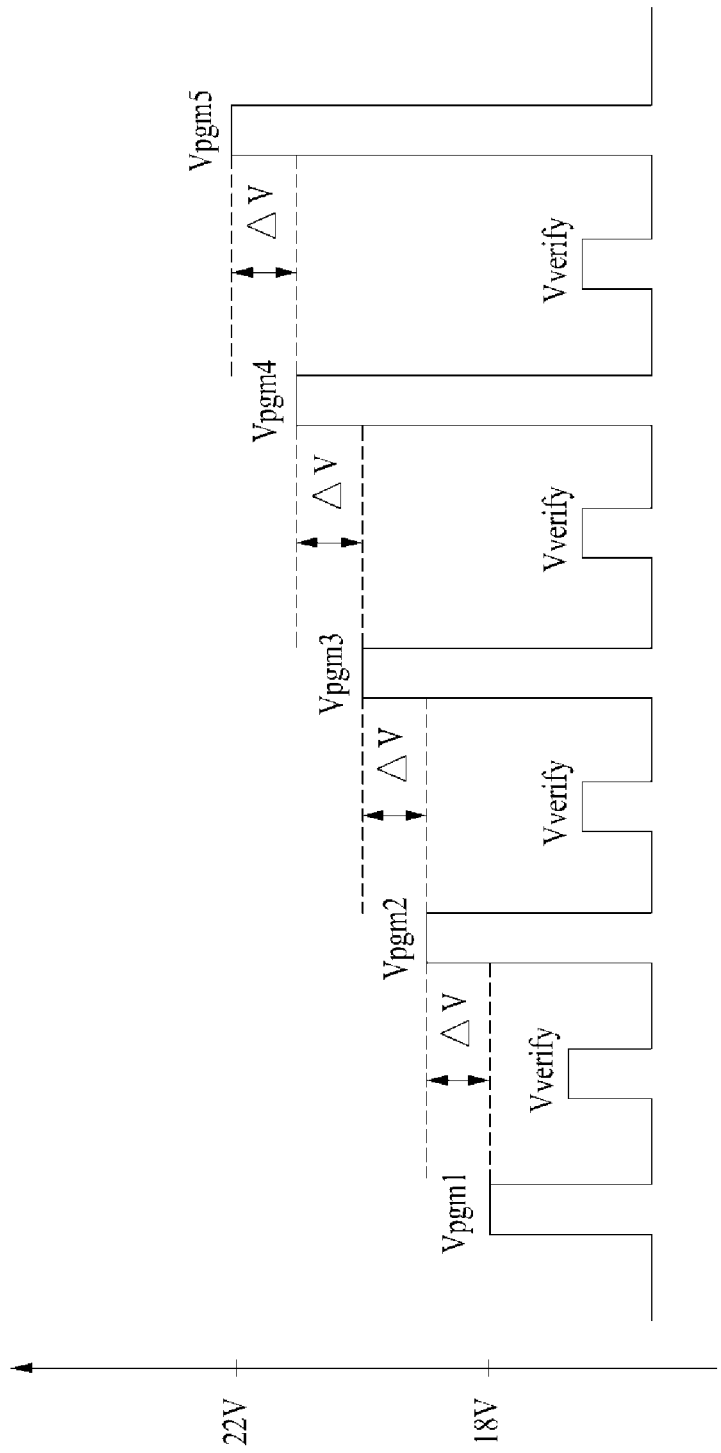
FIG. 1 is a conceptual diagram for describing an existing ISPP scheme.
Figure 2:
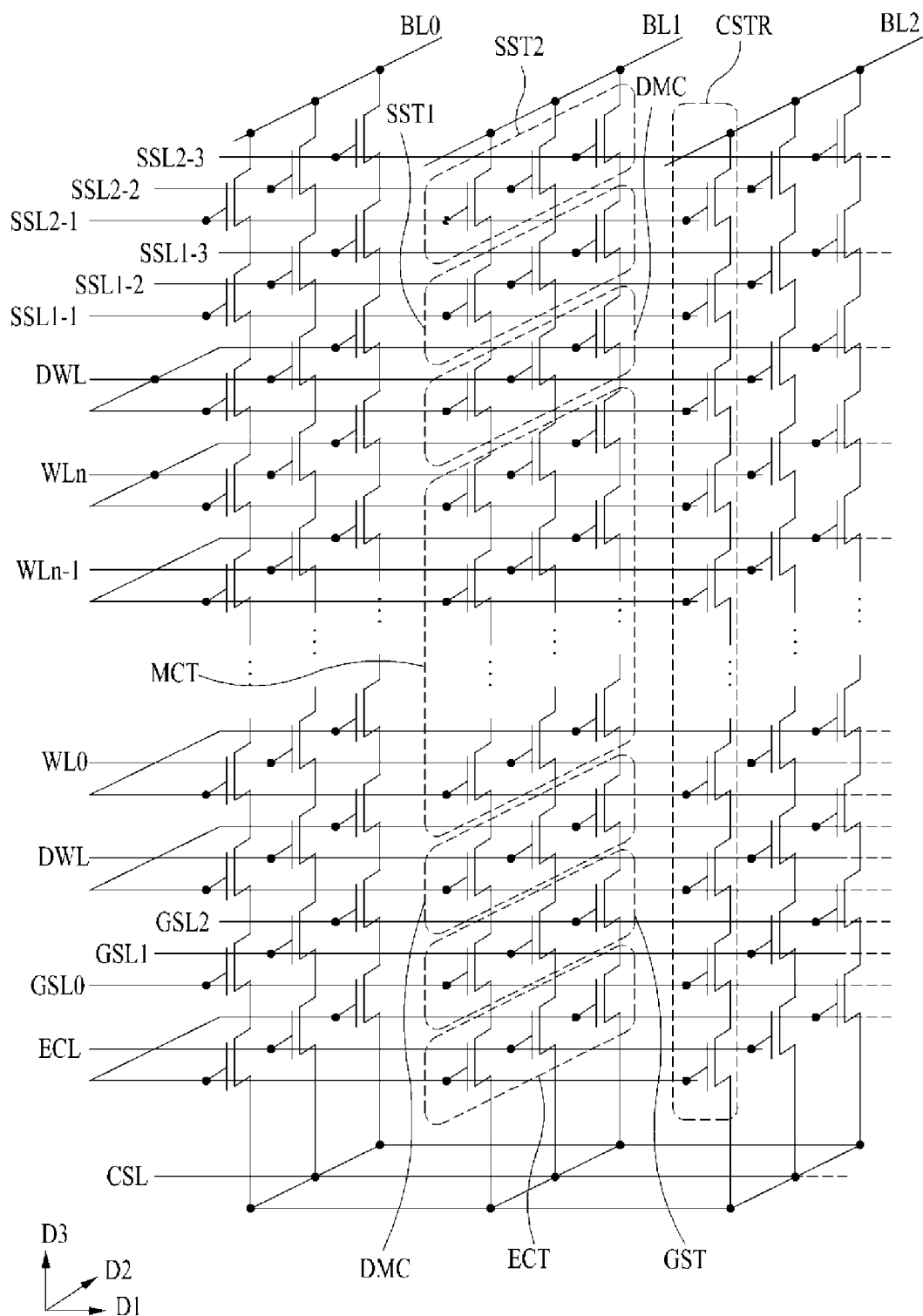
FIG. 2 is a circuit diagram schematically illustrating a three-dimensional flash memory according to embodiment.

FIG. 2 is a circuit diagram schematically illustrating a three-dimensional flash memory according to embodiment.

Referring to FIG. 2, an array of a three-dimensional flash memory according to an embodiment may include a common source line CSL, a plurality of bit lines BL0, BL1, and BL2, a plurality of cell strings CSTR disposed between the common source line CSL and the bit lines BL0, BL1, and BL2.

The bit lines BL0, BL1, and BL2 may be spaced from each other along a first direction D1 in a state of being formed to extend in a second direction D2 and may be arranged in a two-dimensional structure. Herein, the first direction D1, the second direction D2, and a third direction D3 may cross at right angles and may form Cartesian coordinate system defined by the X-axis, the Y-axis, and the Z-axis.

A plurality of cell strings CSTR may be connected in parallel to each of the bit lines BL0, BL1, and BL2. The cell strings CSTR may be connected in common to the common source line CSL in a state of being provided between the bit lines BL0, BL1, and BL2 and one common source line CSL. In this case, the common source line CSL may be provided in plurality, and the plurality of common source lines CSL may be spaced from each other along the second direction D2 in a state of being formed to extend in the first direction D1 and may be arranged in a two-dimensional structure. The same voltage may be electrically applied to the plurality of common source lines CSL, but the present disclosure is not limited thereto. For example, different voltages may be applied to the plurality of common source lines CSL so as to be controlled independently of each other.

The cell strings CSTR may be arranged to be spaced from each other along the second direction D2 for each bit line in a state of being formed to extend in the third direction D3. According to an embodiment, each of the cell strings CSTR may include a ground selection transistor GST connected to the common source line CSL, first and second string selection transistors SST1 and SST2 connected to the bit lines BL0, BL1, and BL2 and connected in series, memory cell transistors MCT connected in series, and an erase control transistor ECT in a state of being disposed between the ground selection transistor GST and the first and second string selection transistors SST1 and SST2. Also, each of the memory cell transistors MCT may include a data storage element.

As an example, each of the cell strings CSTR may include the first and second string selection transistors SST1 and SST2 connected in series, and the second string selection transistor SST2 may be connected to one of the bit lines BL0, BL1, and BL2. However, the present disclosure is not limited thereto. For example, each of the cell strings CSTR may include one string selection transistor. As another example, as in the first and second string selection transistors SST1 and SST2, in each of the cell strings CSTR, the ground selection transistor GST may include a plurality of MOS transistors connected in series.

One cell string CSTR may include the plurality of memory cell transistors MCT having different distances from the common source lines CSL. That is, the memory cell transistors MCT may be connected in series in a state of being disposed between the first string selection transistor SST1 and the ground selection transistor GST along the third direction D3. The erase control transistor ECT may be connected between the ground selection transistor GST and the common source lines CSL. Each of the cell strings CSTR may further include dummy cell transistors DMC between the first string selection transistor SST1 and the uppermost memory cell transistor among the memory cell transistors MCT and between the ground selection transistor GST and the lowermost memory cell transistor among the memory cell transistors MCT.

According to an embodiment, the first string selection transistor SST1 may be controlled by first string selection lines SSL1-1, SSL1-2, and SSL1-3, and the second string selection transistor SST2 may be controlled by second string selection lines SSL2-1, SSL2-2, and SSL2-3. The memory cell transistors MCT may be respectively controlled by a plurality of word lines WL0 to WLn, and the dummy cell transistors DMC may be respectively controlled by dummy word lines DWL. The ground selection transistor GST may be controlled by ground selection lines GSL0, GSL1, and GSL2, and the erase control transistor ECT may be controlled by an erase control line ECL. The erase control transistor ECT may be provided in plurality. The common source lines CSL may be connected in common to sources of the erase control transistors ECT.

Gate electrodes of the memory cell transistors MCT that are provided at substantially the same distance from the common source lines CSL may be connected in common to one of the word lines WL0 to WLn and DWL and may be in an equipotential state. However, the present disclosure is not limited thereto. For example, even though the gate electrodes of the memory cell transistors MCT are provided at substantially the same level from the common source lines CSL, gate electrodes that are provided at different rows or columns may be controlled independently of each other.

The ground selection lines GSL0, GSL1, and GSL2, the first string selection lines SSL1-1, SSL1-2, and SSL1-3, and the second string selection lines SSL2-1, SSL2-2, and SSL2-3 may extend along the first direction D1, may be spaced from each other in the second direction D2, and may be arranged in a two-dimensional structure. The ground selection lines GSL0, GSL1, and GSL2, the first string selection lines SSL1-1, SSL1-2, and SSL1-3, and the second string selection lines SSL2-1, SSL2-2, and SSL2-3 that are provided at substantially the same levels from the common source lines CSL may be electrically separated from each other. Also, the erase control transistors ECT of different cell strings CSTR may be controlled by the common erase control line ECL. The erase control transistors ECT may generate a gate induced drain leakage (IGIDL) in an erase operation of a memory cell array. In some embodiments, in the erase operation of the memory cell array, an erase voltage may be applied to the bit lines BL0, BL1, and BL2 and/or the common source lines CSL, and a gate induced leakage current may be generated at the string selection transistor SST and/or the erase control transistors ECT.

The string selection line SSL described above may be expressed as an upper selection line (USL), and the ground selection line GSL may be expressed as a lower selection line.

Figure 3:
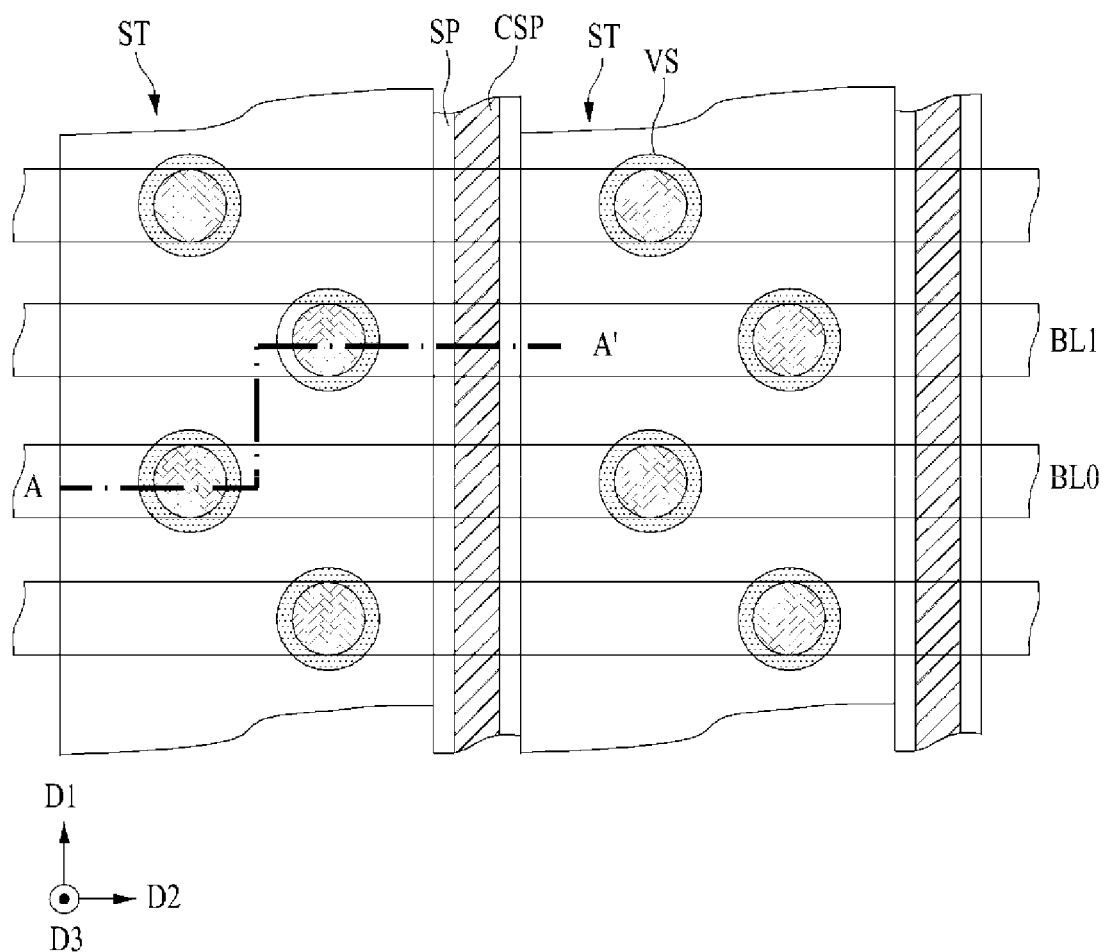
FIG. 3 is a plan view illustrating a three-dimensional flash memory according to embodiment.
Figure 4:
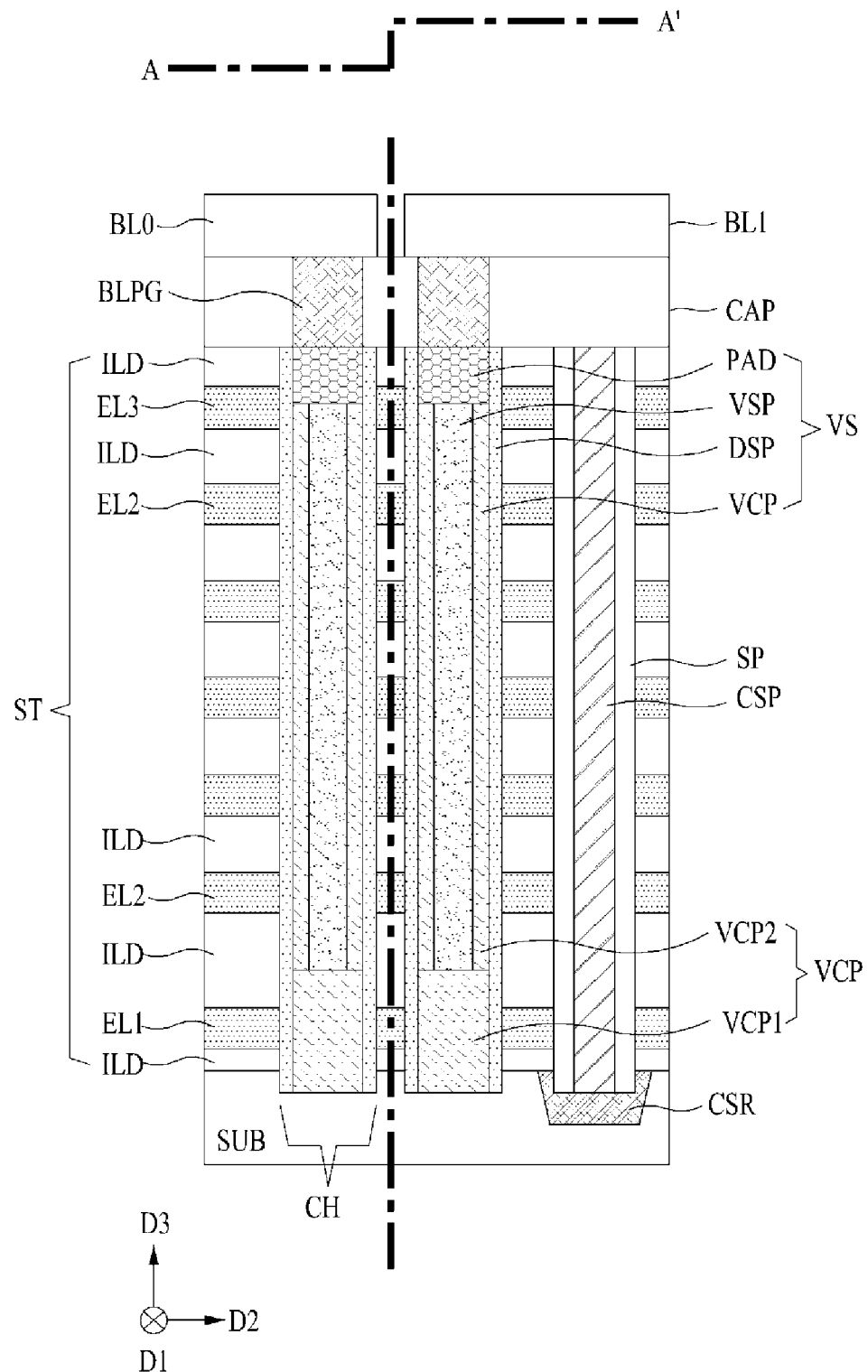
FIG. 4 is a cross-sectional view illustrating a structure of a three-dimensional flash memory according to an embodiment and corresponds to the cross section taken along line A-A' of FIG. 3.

FIG. 3 is a plan view illustrating a three-dimensional flash memory according to embodiment. FIG. 4 is a cross-sectional view illustrating a structure of a three-dimensional flash memory according to an embodiment and corresponds to the cross section taken along line A-A' of FIG. 3.

Referring to FIGS. 3 and 4, a substrate SUB may be a semiconductor substrate such as a silicon substrate, a silicon-germanium substrate, a germanium substrate, or a single crystal epitaxial layer grown on a monocrystalline silicon substrate. First conductive-type impurities (e.g., P-type impurities) may be doped in the substrate SUB.

Stacked structures ST may be disposed on the substrate SUB. The stacked structures ST may be arranged along the second direction D2 in the two-dimensional structure in a state of being formed to extend in the first direction D1. Also, the stacked structures ST may be spaced from each other in the second direction D2.

Each of the stacked structures ST may include gate electrodes EL1, EL2, and EL3 and interlayer insulating layers ILD alternately stacked in a vertical direction (e.g., the third direction D3) perpendicular to an upper surface of the substrate SUB. The stacked structures ST may have substantially a flat (or even) upper surface. That is, the upper surface of the stacked structures ST may be parallel to the upper surface of the substrate SUB. Below, the vertical direction means the third direction D3 or a direction facing away from the third direction D3.

Returning to FIG. 2, each of the gate electrodes EL1, EL2, and EL3 may be one of the erase control line ECL, the ground selection lines GSL0, GSL1, and GSL2, the word lines WL0 to WLn and DWL, the first string selection lines SSL1-1, SSL1-2, and SSL1-3, and the second string selection lines SSL2-1, SSL2-2, and SSL2-3 sequentially stacked on the substrate SUB.

Each of the gate electrodes EL1, EL2, and EL3 may have the same thickness in the third direction D3 in a state of being formed to extend in the first direction D1. Below, the thickness means a thickness in the third direction D3. Each of the gate electrodes EL1, EL2, and EL3 may be formed of a conductive material. For example, each of the gate electrodes EL1, EL2, and EL3 may include at least one selected from the group of doped semiconductor (e.g., doped silicon, etc.), metal (e.g., tungsten (W), copper (Cu), aluminum (Al), titanium (Ti), tantalum (Ta), molybdenum (Mo), ruthenium (Ru), gold (Au), etc.), or conductive metal nitride (e.g., titanium nitride, tantalum nitride, etc.). Each of the gate electrodes EL1, EL2, and EL3 may include at least one of all metal materials capable of being formed by ALD, in addition to the above metal materials.

In detail, the gate electrodes EL1, EL2, and EL3 may include the first gate electrode EL1 being the lowermost, the third gate electrode EL3 being the uppermost, and the plurality of second gate electrodes EL2 between the first gate electrode EL1 and the third gate electrode EL3. Each of the first gate electrode EL1 and the third gate electrode EL3 is illustrated and described in the singular form, but this is provided as an example without limitation thereto; if necessary, each of the first gate electrode EL1 and the third gate electrode EL3 may be provided in plurality. The first gate electrode EL1 may be one of the ground selection lines GSL0, GSL1, and GSL2 illustrated in FIG. 2. The second gate electrode EL2 may correspond to one of the word lines WL0 to WLn and DWL illustrated in FIG. 2. The third gate electrode EL3 may correspond to one of the first string selection lines SSL1-1, SSL1-2, and SSL1-3 illustrated in FIG. 2 or one of the second string selection lines SSL2-1, SSL2-2, and SSL2-3 illustrated in FIG. 2.

Although not illustrated, end portions of the stacked structures ST may have a stepwise structure along the first direction D1. In detail, in the gate electrodes EL1, EL2, and EL3 of the stacked structures ST, a length in the first direction D1 may decrease as a distance from the substrate SUB increases. The length of the third gate electrode EL3 in the first direction D1 may be the smallest, and the separation distance of the third gate electrode EL3 from the substrate SUB in the third direction D3 may be the greatest. The length of the first gate electrode EL1 in the first direction D1 may be the greatest, and the separation distance of the first gate electrode EL1 from the substrate SUB in the third direction D3 may be the smallest. By the stepwise structure, the thickness of each of the stacked structures ST may decrease as a distance from an outer-most one of vertical channel structures VS to be described later increases; in a plan view, sidewalls of the gate electrodes EL1, EL2, and EL3 may be spaced from each other along the first direction D1 at given intervals.

The interlayer insulating layers ILD may have different thicknesses. As an example, the uppermost one and the lowermost one among the interlayer insulating layers ILD may have a thickness smaller than that of the remaining interlayer insulating layers ILD. However, this is provided as an example without limitation thereto. For example, the interlayer insulating layers ILD may have different thicknesses depending on a characteristic of a semiconductor device, or all the interlayer insulating layers ILD may be set to have the same thickness. The interlayer insulating layers ILD may be formed of an insulating material for the purpose of insulation between the gate electrodes EL1, EL2, and EL3. As an example, the interlayer insulating layers ILD may be formed of silicon oxide.

The above description is given as each of the stacked structures ST includes the interlayer insulating layers ILD, but each of the stacked structures ST may include air gaps instead of the interlayer insulating layers ILD. In this case, like the interlayer insulating layers ILD, the air gaps may be alternately disposed with the gate electrodes EL1, EL2, and EL3 such that the insulation between the gate electrodes EL1, EL2, and EL3 is possible.

A plurality of channel holes CH penetrating the stacked structures ST and a portion of the substrate SUB may be provided. The vertical channel structures VS may be provided in the channel holes CH. The vertical channel structures VS that are the plurality of cell strings CSTR illustrated in FIG. 2 may be formed to extend in the third direction D3 in a state of being connected to the substrate SUB. That the vertical channel structures VS are connected to the substrate SUB may mean that a portion of each of the vertical channel structures VS is buried inside the substrate SUB, but the present disclosure is not limited thereto. For example, the vertical channel structures VS may be formed such that lower surfaces of the vertical channel structures VS are in contact with the upper surface of the substrate SUB. When the portion of each of the vertical channel structures VS is buried inside the substrate SUB, the lower surfaces of the vertical channel structures VS may be located to be lower in level than the upper surface of the substrate SUB.

Columns of the vertical channel structures VS penetrating one of the stacked structures ST may be provided in plurality. For example, as illustrated in FIG. 3, columns of two vertical channel structures VS may penetrate one of the stacked structures ST. However, the present disclosure is not limited thereto. For example, columns of three or more vertical channel structures VS may penetrate one of the stacked structures ST. In a pair of adjacent columns, the vertical channel structures VS corresponding to one column may be shifted in the first direction D1 from the vertical channel structures VS corresponding to the other column adjacent thereto. In a plan view, the vertical channel structures VS may be arranged in a zig-zag shape along the first direction D1. However, the present disclosure is not limited thereto. For example, the vertical channel structures VS may form an arrangement in which the vertical channel structures VS are disposed side by side in a row and a column.

Each of the vertical channel structures VS may be formed to extend from the substrate SUB in the third direction D3. An example in which each of the vertical channel structures VS has a pillar shape where an upper end and a lower end have the same width is illustrated in drawing, but the present disclosure is not limited thereto. For example, each of the vertical channel structures VS may have a shape in which widths in the first direction D1 and the second direction D2 increase as it goes toward the third direction D3. This is caused due to the limitation that when the channel holes CH are etched, the widths in the first direction D1 and the second direction D2 decrease as it goes toward a direction facing away from the third direction D3. The upper surface of each of the vertical channel structures VS may have a circular shape, an oval shape, a square shape, or a bar shape.

Each of the vertical channel structures VS may include a data storage pattern DSP, a vertical channel pattern VCP, a vertical semiconductor pattern VSP, and a conductive pad "PAD". In each of the vertical channel structures VS, the lower end of the data storage pattern DSP may be in the shape of an opened pipe or a macaroni, and the lower end of the vertical channel pattern VCP may be in the shape of a closed pipe or a macaroni. The vertical semiconductor pattern VSP may fill a space surrounded by the vertical channel pattern VCP and the conductive pad "PAD".

In a state of covering an inner sidewall of each of the channel holes CH, the data storage pattern DSP may contact the vertical channel pattern VCP inwardly and may contact the sidewalls of the gate electrodes EL1, EL2, and EL3 outwardly. As such, regions of the data storage pattern DSP, which correspond to the second gate electrodes EL2, may form memory cells, in which a memory operation (e.g., a program operation, a read operation, or an erase operation) is performed by voltages applied through the second gate electrodes EL2, together with regions of the vertical channel pattern VCP, which correspond to the second gate electrodes EL2. The memory cells correspond to the memory cell transistors MCT illustrated in FIG. 2. That is, the data storage pattern DSP may trap charges or holes by the voltages applied through the second gate electrodes EL2 or may maintain a state of charges (e.g., a polarization state of charges) by the voltages applied through the second gate electrodes EL2, and thus, the data storage pattern DSP may act as data storage in the three-dimensional flash memory. For example, an ONO (Tunneling Oxide-Charge Trap Nitride-Blocking Oxide) layer or a ferroelectric layer may be used as the data storage pattern DSP. The data storage pattern DSP may indicate a binary data value or a multi-bit (multi-level) data value through the change in the amount of trapped charges or holes or may indicate a binary data value or a multi-bit (multi-level) data value through a state change of charges.

The vertical channel pattern VCP may cover an inner sidewall of the data storage pattern DSP. The vertical channel pattern VCP may include a first portion VCP1 and a second portion VCP2 on the first portion VCP1.

The first portion VCP1 of the vertical channel pattern VCP may be provided on a lower portion of each of the channel holes CH and may contact the substrate SUB. The first portion VCP1 of the vertical channel pattern VCP may be used for the purpose of blocking, suppressing, or minimizing a leakage current in each of the vertical channel structures VS and/or for the purpose of an epitaxial pattern. A thickness of the first portion VCP1 of the vertical channel pattern VCP may be, for example, greater than the thickness of the first gate electrode EL1. A sidewall of the first portion VCP1 of the vertical channel pattern VCP may be surrounded by the data storage pattern DSP. An upper surface of the first portion VCP1 of the vertical channel pattern VCP may be located to be higher in level than an upper surface of the first gate electrode EL1. In detail, the upper surface of the first portion VCP1 of the vertical channel pattern VCP may be located between the upper surface of the first gate electrode EL1 and a lower surface of the lowermost one of the second gate electrodes EL2. A lower surface of the first portion VCP1 of the vertical channel pattern VCP may be located to be lower in level than the uppermost surface of the substrate SUB (i.e., a lower surface of the lowermost one of the interlayer insulating layers ILD). A portion of the first portion VCP1 of the vertical channel pattern VCP may overlap the first gate electrode EL1 in a horizontal direction. Below, the horizontal direction means an arbitrary direction extending on a plane parallel to the first direction D1 and the second direction D2.

The second portion VCP2 of the vertical channel pattern VCP may extend from the upper surface of the first portion VCP1 in the third direction D3. The second portion VCP2 of the vertical channel pattern VCP may be provided between the data storage pattern DSP and the vertical semiconductor pattern VSP and may correspond to the second gate electrodes EL2. As described above, the second portion VCP2 of the vertical channel pattern VCP may form memory cells together with the regions of the data storage pattern DSP, which correspond to the second gate electrodes EL2.

An upper surface of the second portion VCP2 of the vertical channel pattern VCP may be substantially coplanar with an upper surface of the vertical channel pattern VCP. The upper surface of the second portion VCP2 of the vertical channel pattern VCP may be located to be higher in level than an upper surface of the uppermost one of the second gate electrodes EL2. In detail, the upper surface of the second portion VCP2 of the vertical channel pattern VCP may be located between an upper surface and a lower surface of the third gate electrode EL3.

The vertical channel pattern VCP that is a component transferring charges or holes to the data storage pattern DSP may be formed of monocrystalline silicon or polysilicon such that a channel is formed or boosted by a voltage applied thereto. However, the present disclosure is not limited thereto. For example, the vertical channel pattern VCP may be formed of an oxide semiconductor material capable of blocking, suppressing, or minimizing a leakage current. For example, the vertical channel pattern VCP may be formed of an oxide semiconductor material including at least one of In, Zn, or Ga with an excellent leakage current characteristic, a group 4 semiconductor material, etc. The vertical channel pattern VCP may be formed of, for example, a $ZnO_x$-based material including AZO, ZTO, IZO, ITO, IGZO, or Ag—ZnO. Accordingly, the vertical channel pattern VCP may block, suppress, or minimize a leakage current to the gate electrodes EL1, EL2, and EL3 or the substrate SUB and may improve a transistor characteristic (e.g., a threshold voltage distribution and a speed of the program/read operation) of at least one of the gate electrodes EL1, EL2, and EL3, and thus, an electrical characteristic of the three-dimensional flash memory may be improved.

The vertical semiconductor pattern VSP may be surrounded by the second portion VCP2 of the vertical channel pattern VCP. The upper surface of the vertical semiconductor pattern VSP may contact the conductive pad "PAD", and the lower surface of the vertical semiconductor pattern VSP may contact the first portion VCP1 of the vertical semiconductor pattern VSP. The vertical semiconductor pattern VSP may be spaced from the substrate SUB in the third direction D3. In other words, the vertical semiconductor pattern VSP may be electrically floated from the substrate SUB.

The vertical semiconductor pattern VSP may be formed of a material that helps diffusion of charges or holes in the vertical channel pattern VCP. In detail, the vertical semiconductor pattern VSP may be formed of a material whose charge and hole mobility is excellent. For example, the vertical semiconductor pattern VSP may be formed of a semiconductor material doped with impurities, an intrinsic semiconductor material not doped with impurities, or a polycrystalline semiconductor material. In detail, for example, the vertical semiconductor pattern VSP may be formed of polysilicon doped with impurities of the first conductivity type (e.g., P-type dopants) that is identical to that of the substrate SUB. That is, the vertical semiconductor pattern VSP may make the electrical characteristic of the three-dimensional flash memory better, and thus, the speed of the memory operation may be improved.

Returning to FIG. 2, the vertical channel structures VS may correspond to channels of the erase control transistor ECT, the first and second string selection transistors SST1 and SST2, the ground selection transistor GST, and the memory cell transistors MCT.

The conductive pad "PAD" may be provided on the upper surface of the second portion VCP2 of the vertical channel pattern VCP and the upper surface of the vertical channel pattern VCP. The conductive pad "PAD" may be connected to an upper portion of the vertical channel pattern VCP and an upper portion of the vertical semiconductor pattern VSP. A sidewall of the conductive pad "PAD" may be surrounded by the data storage pattern DSP. An upper surface of the conductive pad "PAD" may be substantially coplanar with the upper surface of each of the stacked structures ST (e.g., an upper surface of the uppermost one of the interlayer insulating layers ILD). A lower surface of the conductive pad "PAD" may be located to be lower in level than the upper surface of the third gate electrode EL3. In detail, the lower surface of the conductive pad "PAD" may be located between the upper surface and the lower surface of the third gate electrode EL3. That is, at least a portion of the conductive pad "PAD" may overlap the third gate electrode EL3 in the horizontal direction.

The conductive pad "PAD" may be formed of impurity-doped semiconductor or a conductive material. For example, the conductive pad "PAD" may be formed of a semiconductor material doped with impurities different from that of the vertical semiconductor pattern VSP (in detail, a semiconductor material doped with impurities of a second conductive type (e.g., N-type) different from the first conductive type (e.g., P-type)).

The conductive pad "PAD" may reduce a contact resistance between a bit line BL to be described later and the vertical channel pattern VCP (or the vertical semiconductor pattern VSP).

A structure in which the vertical channel structures VS include the conductive pad "PAD" is described above, but the present disclosure is not limited thereto. For example, the vertical channel structures VS may not include the conductive pad "PAD" in structure. In this case, as the conductive pad "PAD" is omitted from the vertical channel structures VS, each of the vertical channel pattern VCP and the vertical semiconductor pattern VSP may be formed to extend in the third direction D3 such that the upper surface of each of the vertical channel pattern VCP and the vertical semiconductor pattern VSP is substantially coplanar with the upper surface of each of the stacked structures ST (i.e., the upper surface of the uppermost one of the interlayer insulating layers ILD). Also, in this case, a bit line contact plug BLPG to be described later may directly contact the vertical channel pattern VCP and may be electrically connected thereto, instead of electrically indirectly connected to the vertical channel pattern VCP through the conductive pad "PAD".

Also, an example in which the vertical semiconductor pattern VSP is included in the vertical channel structures VS is described above, but the present disclosure is not limited thereto. For example, the vertical semiconductor pattern VSP may be omitted.

Also, the above description is given as the vertical channel pattern VCP has a structure in which the first portion VCP1 and the second portion VCP2 are included in the vertical channel pattern VCP, but the present disclosure is not limited thereto. For example, the vertical channel pattern VCP may have a structure in which the first portion VCP1 is excluded. For example, the vertical channel pattern VCP may be provided between the vertical channel pattern VCP formed to extend to the substrate SUB and the data storage pattern DSP and may be formed to extend to the substrate SUB such that the contact with the substrate SUB is made. In this case, the lower surface of the vertical channel pattern VCP may be located to be lower in level than the uppermost surface of the substrate SUB (i.e., the lower surface of the lowermost one of the interlayer insulating layers ILD), and the upper surface of the vertical channel pattern VCP may be substantially coplanar with the upper surface of the vertical semiconductor pattern VSP.

An isolation trench TR extending in the first direction D1 may be provided between the stacked structures ST adjacent to each other. A common source region CSR may be provided in the interior of the substrate SUB exposed by the isolation trench TR. The common source region CSR may extend in the first direction D1 in the substrate SUB. The common source region CSR may be formed of a semiconductor material doped with impurities of the second conductive type (e.g., N-type impurities). The common source region CSR may correspond to the common source line CSL of FIG. 2.

A common source plug CSP may be provided in the isolation trench TR. The common source plug CSP may be connected to the common source region CSR. An upper surface of the common source plug CSP may be substantially coplanar with the upper surface of each of the stacked structures ST (i.e., the upper surface of the uppermost one of the interlayer insulating layers ILD). The common source plug CSP may be in the shape of a plate extending in the first direction D1 and the third direction D3. In this case, the common source plug CSP may have a shape in which a width in the second direction D2 increases as it goes toward the third direction D3.

Insulating spaces SP may be interposed between the common source plug CSP and the stacked structures ST. The insulating spacers SP may be provided to face each other between the stacked structures ST adjacent to each other. For example, the insulating spacers SP may be formed of silicon oxide, silicon nitride, silicon oxynitride, or a low-k material with a low dielectric constant.

A capping insulating layer CAP may be provided on the stacked structures ST, the vertical channel structures VS, and the common source plug CSP. The capping insulating layer CAP may cover the upper surface of the uppermost one of the interlayer insulating layers ILD, the upper surface of the conductive pad "PAD", and the upper surface of the common source plug CSP. The capping insulating layer CAP may be formed of an insulating material different from that of the interlayer insulating layers ILD. The bit line contact plug BLPG that is electrically connected to the conductive pad "PAD" may be provided inside the capping insulating layer CAP. The bit line contact plug BLPG may have a shape in which a width in the first direction D1 and a width in the second direction D2 increase as it goes toward the third direction D3.

The bit line BL may be provided on the capping insulating layer CAP and the bit line contact plug BLPG. The bit line BL that corresponds to one of the plurality of bit lines BL0, BL1, and BL2 illustrated in FIG. 2 may be formed of a conductive material and may be formed to extend along the second direction D2. The conductive material of the bit line BL may be the same as the conductive material forming the gate electrodes EL1, EL2, and EL3 described above.

The bit line BL may be electrically connected to the vertical channel structures VS through the bit line contact plug BLPG. Herein, that the bit line BL is connected to the vertical channel structures VS may mean that the bit line BL is connected to the vertical channel pattern VCP included in the vertical channel structures VS.

The three-dimensional flash memory with the above structure may perform the program operation, the read operation, and the erase operation based on a voltage applied to each of the cell strings CSTR, a voltage applied to the string selection line SSL, a voltage applied to each of the word lines WL0 to WLn, a voltage applied to the ground selection line GSL, and a voltage applied to the common source line CSL. For example, based on the voltage applied to each of the cell strings CSTR, the voltage applied to the string selection line SSL, the voltage applied to each of the word lines WL0 to WLn, the voltage applied to the ground selection line GSL, and the voltage applied to the common source line CSL, the three-dimensional flash memory may form a channel in the vertical channel pattern VCP such that charges or holes are transferred to the data storage pattern DSP of a target memory cell. This may mean that the three-dimensional flash memory performs the program operation.

Also, the three-dimensional flash memory according to an embodiment is not limited to the above structure; depending on an example to implement, the three-dimensional flash memory may be implemented in various structures under the condition that the vertical channel pattern VCP, the data storage pattern DSP, the gate electrodes EL1, EL2, and EL3, the bit line BL, and the common source line CSL are included.

Figure 5:
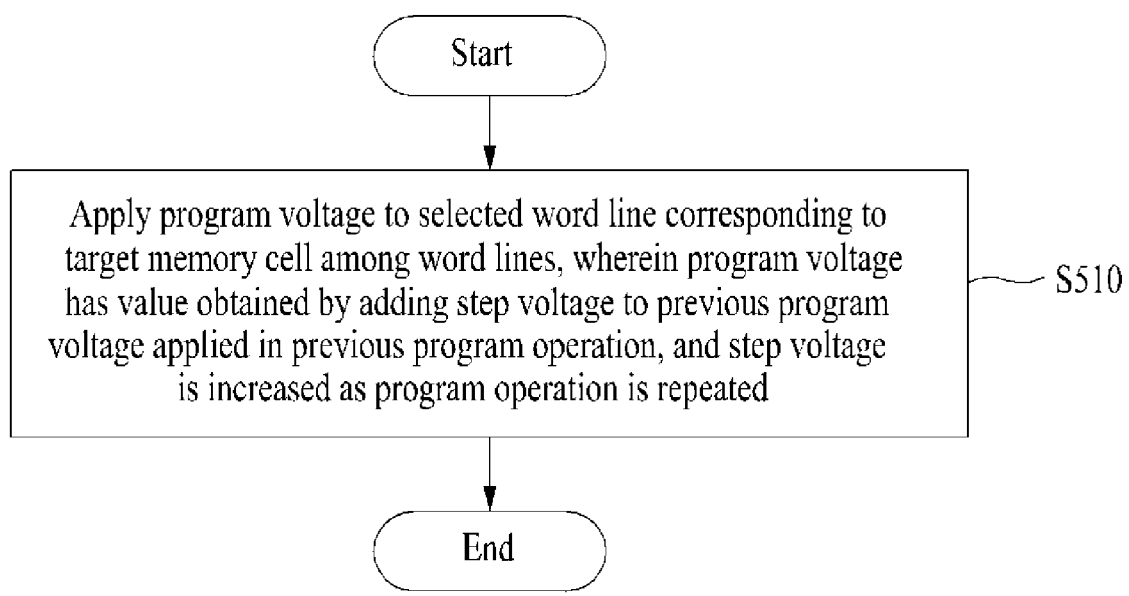
FIG. 5 is a flowchart illustrating a program operation of a three-dimensional flash memory according to an embodiment.
Figure 6:
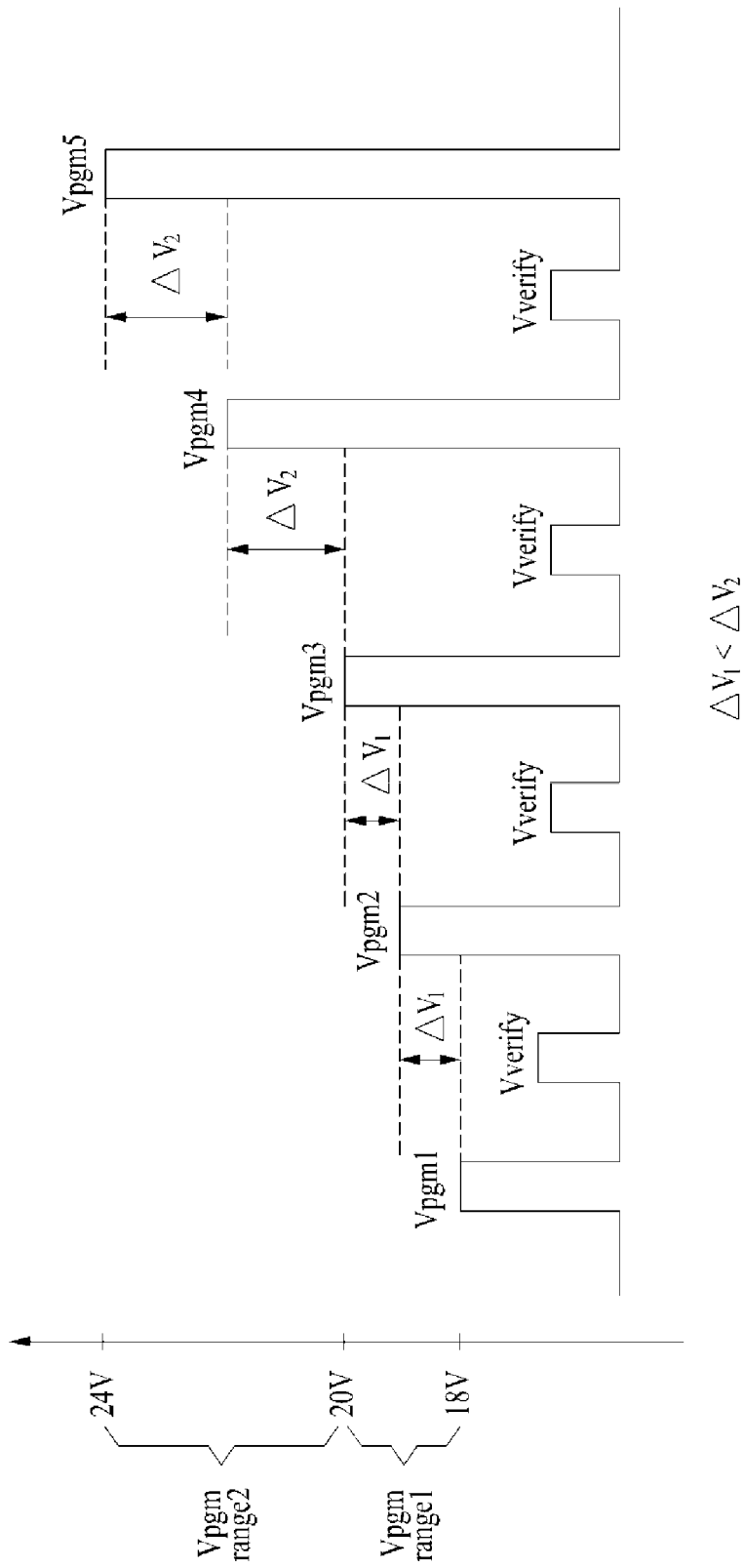
FIGS. 6 and 7 are conceptual diagrams for describing a program operation of a three-dimensional flash memory according to an embodiment.
Figure 7:
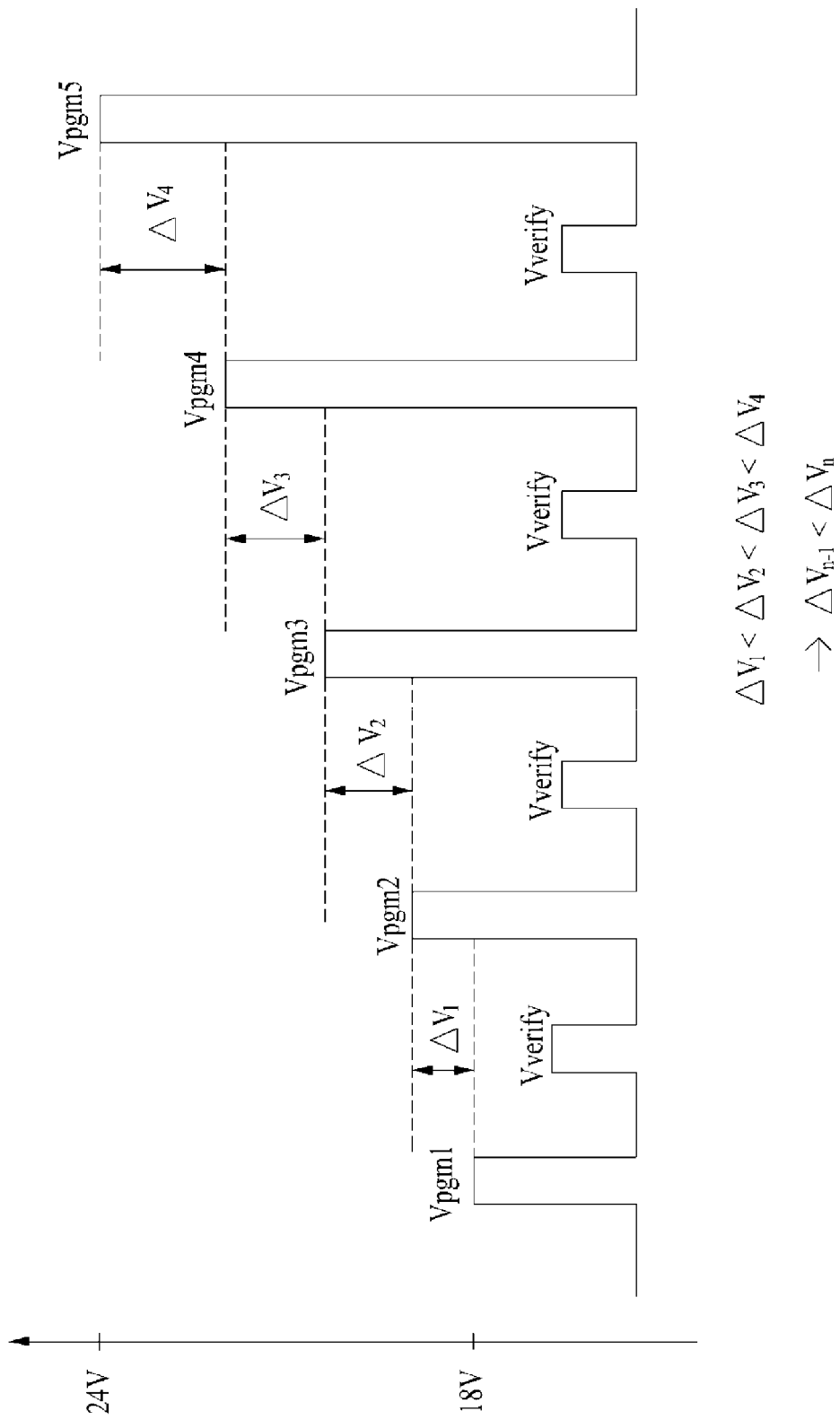

FIG. 5 is a flowchart illustrating a program operation of a three-dimensional flash memory according to an embodiment, and FIGS. 6 and 7 are conceptual diagrams for describing a program operation of a three-dimensional flash memory according to an embodiment. Below, the description will be given under the condition that a program operation method is performed in the three-dimensional flash memory with the structure described with reference to FIGS. 2 to 4. However, the program operation method to be described later is not limited thereto and may be performed by a three-dimensional flash memory of any other structure to which the ISPP scheme is capable of being applied.

Referring to FIG. 5, in operation S510, the three-dimensional flash memory may apply a program voltage to a selected word line corresponding to a target memory cell from among word lines.

In this case, as expressed by Equation 1 below, a program voltage $Vpgm_n$ may have a value obtained by adding the step voltage $\Delta V$ to a previous program voltage $Vpgm_{n-1}$ applied in a previous program operation.

$$Vpgm_n = Vpgm_{n-1} + \Delta V \qquad \text{Equation 1}$$

In particular, in the program operation of the three-dimensional flash memory according to an embodiment, the step voltage $\Delta V$ may be increased as the program operation is repeated.

Herein, that the step voltage $\Delta V$ is increased as the program operation is repeated may mean that the step voltage $\Delta V$ is increased at least once or more while the program operation is repeated, as well as that the step voltage $\Delta V$ is continuously increased without exception as the number of times that the program operation is repeated increases.

For example, as two or more program voltage ranges are set in the repetition of the program operation, the step voltage $\Delta V$ may be uniformly maintained for each program voltage range and may be increased when the program voltage range is changed, and the step voltage $\Delta V$ may be increased at least once or more. In detail, for example, as illustrated in FIG. 6, the step voltage $\Delta V$ may be uniformly maintained at a value of $\Delta V1$ (e.g., 1 V) when the program voltage is within a range from 18 V to 20 V and may be increased to a value of $\Delta V2$ (e.g., 2 V) when a program voltage range changes from the range from 18 V to 20 V to a range from 20 V to 24 V. That is, the three-dimensional flash memory may repeat the program operation while differently increasing the step voltage $\Delta V$ for each program voltage range.

For another example, the step voltage $\Delta V$ may continuously increase in proportion to the repetition of the program operation. In detail, for example, as illustrated in FIG. 7, the step voltage $\Delta V$ may continuously increase in proportion to the number of times that the program operation is repeated, regardless of the program voltage range. As such, the three-dimensional flash memory may add not the previous step voltage $\Delta V$ but the increased step voltage $\Delta V$ to the previous program operation voltage whenever the program operation is repeated.

Figure 8:
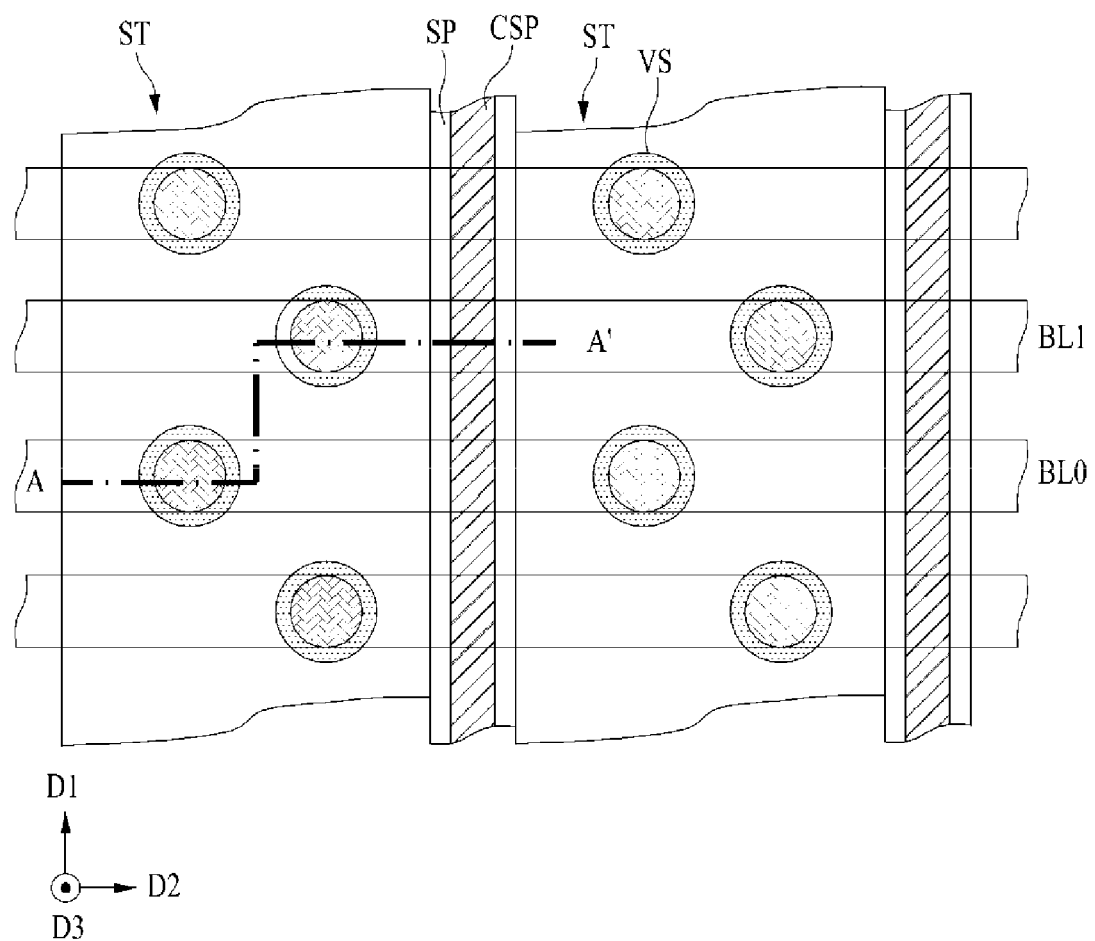
FIG. 8 is a plan view illustrating a three-dimensional flash memory according to embodiment.
Figure 9:
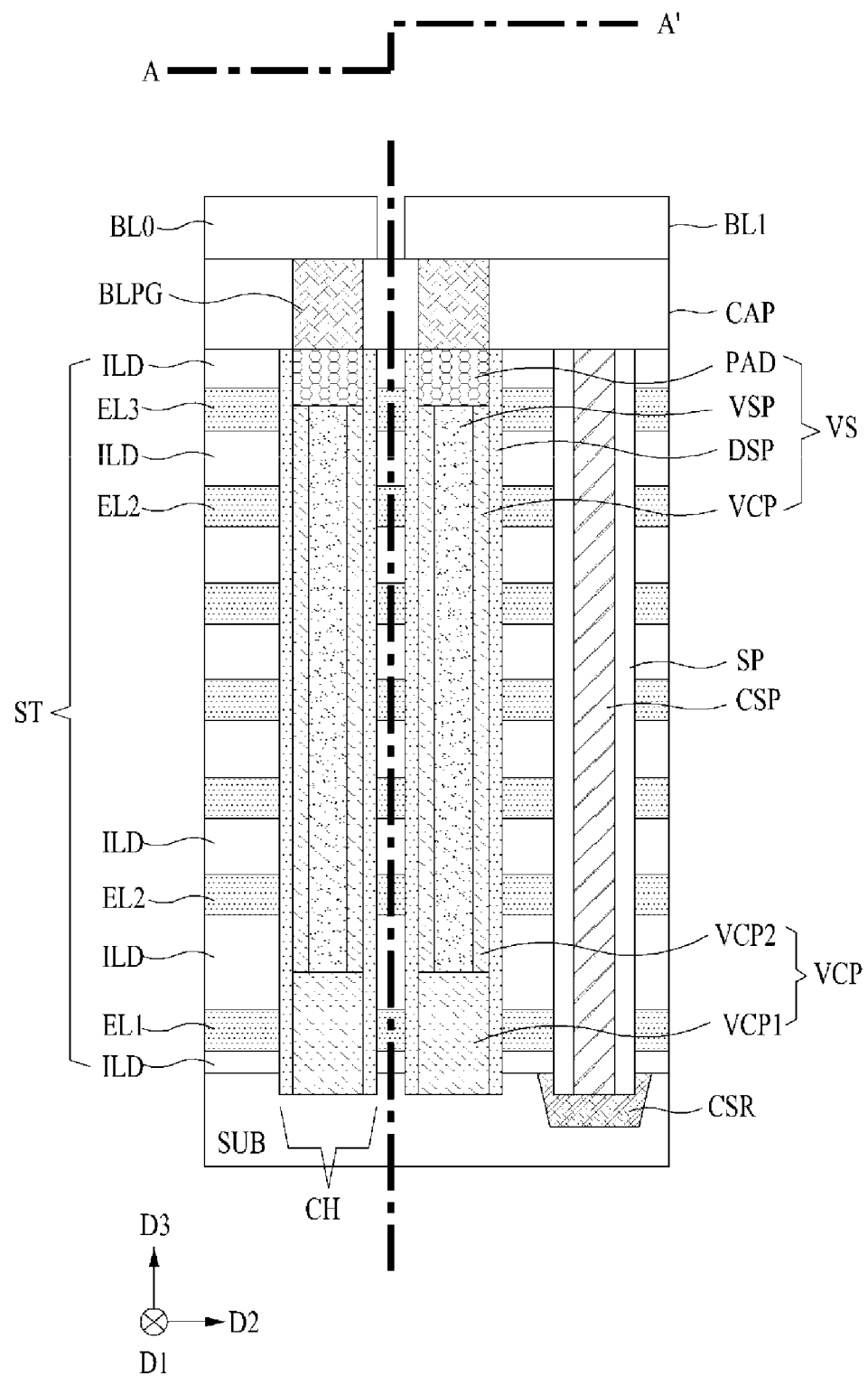
FIG. 9 is a cross-sectional view illustrating a structure of a three-dimensional flash memory according to an embodiment and corresponds to the cross section taken along line A-A' of FIG. 8.

FIG. 8 is a plan view illustrating a three-dimensional flash memory according to embodiment. FIG. 9 is a cross-sectional view illustrating a structure of a three-dimensional flash memory according to an embodiment and corresponds to the cross section taken along line A-A' of FIG. 8.

Referring to FIGS. 8 and 9, the substrate SUB may be a semiconductor substrate such as a silicon substrate, a silicon-germanium substrate, a germanium substrate, or a single crystal epitaxial layer grown on a monocrystalline silicon substrate. The first conductive-type impurities (e.g., P-type impurities) may be doped in the substrate SUB.

The stacked structures ST may be disposed on the substrate SUB. The stacked structures ST may be arranged along the second direction D2 in the two-dimensional structure in a state of being formed to extend in the first direction D1. Also, the stacked structures ST may be spaced from each other in the second direction D2.

Each of the stacked structures ST may include the gate electrodes EL1, EL2, and EL3 and the interlayer insulating layers ILD alternately stacked in the vertical direction (e.g., the third direction D3) perpendicular to an upper surface of the substrate SUB. The stacked structures ST may have substantially a flat (or even) upper surface. That is, the upper surface of the stacked structures ST may be parallel to the upper surface of the substrate SUB. Below, the vertical direction means the third direction D3 or a direction facing away from the third direction D3.

Returning to FIG. 2, each of the gate electrodes EL1, EL2, and EL3 may be one of the erase control line ECL, the ground selection lines GSL0, GSL1, and GSL2, the word lines WL0 to WLn and DWL, the first string selection lines SSL1-1, SSL1-2, and SSL1-3, and the second string selection lines SSL2-1, SSL2-2, and SSL2-3 sequentially stacked on the substrate SUB.

Each of the gate electrodes EL1, EL2, and EL3 may have the same thickness in the third direction D3 in a state of being formed to extend in the first direction D1. Below, the thickness means a thickness in the third direction D3. Each of the gate electrodes EL1, EL2, and EL3 may be formed of a conductive material. For example, each of the gate electrodes EL1, EL2, and EL3 may include at least one selected from the group of doped semiconductor (e.g., doped silicon, etc.), metal (e.g., tungsten (W), copper (Cu), aluminum (Al), titanium (Ti), tantalum (Ta), molybdenum (Mo), ruthenium (Ru), gold (Au), etc.), or conductive metal nitride (e.g., titanium nitride, tantalum nitride, etc.). Each of the gate electrodes EL1, EL2, and EL3 may include at least one of all metal materials capable of being formed by ALD, in addition to the above metal materials.

In detail, the gate electrodes EL1, EL2, and EL3 may include the first gate electrode EL1 being the lowermost, the third gate electrode EL3 being the uppermost, and the plurality of second gate electrodes EL2 between the first gate electrode EL1 and the third gate electrode EL3. Each of the first gate electrode EL1 and the third gate electrode EL3 is illustrated and described in the singular form, but this is provided as an example without limitation thereto; if necessary, each of the first gate electrode EL1 and the third gate electrode EL3 may be provided in plurality. The first gate electrode EL1 may be one of the ground selection lines GSL0, GSL1, and GLS2 illustrated in FIG. 2. The second gate electrode EL2 may correspond to one of the word lines WL0 to WLn and DWL illustrated in FIG. 2. The third gate electrode EL3 may correspond to one of the first string selection lines SSL1-1, SSL1-2, and SSL1-3 of FIG. 2 illustrated in FIG. 2 or one of the second string selection lines SSL2-1, SSL2-2, and SSL2-3 illustrated in FIG. 2.

Although not illustrated, end portions of the stacked structures ST may have a stepwise structure along the first direction D1. In detail, in the gate electrodes EL1, EL2, and EL3 of the stacked structures ST, a length in the first direction D1 may decrease as a distance from the substrate SUB increases. The length of the third gate electrode EL3 in the first direction D1 may be the smallest, and the separation distance of the third gate electrode EL3 from the substrate SUB in the third direction D3 may be the greatest. The length of the first gate electrode EL1 in the first direction D1 may be the greatest, and the separation distance of the first gate electrode EL1 from the substrate SUB in the third direction D3 may be the smallest. By the stepwise structure, the thickness of each of the stacked structures ST may decrease as a distance from the outer-most one of vertical channel structures VS to be described later increases; in a plan view, the sidewalls of the gate electrodes EL1, EL2, and EL3 may be spaced from each other along the first direction D1 at given intervals.

The interlayer insulating layers ILD may have different thicknesses. As an example, the uppermost one and the lowermost one among the interlayer insulating layers ILD may have a thickness smaller than that of the remaining interlayer insulating layers ILD. However, this is provided as an example without limitation thereto. For example, the interlayer insulating layers ILD may have different thicknesses depending on a characteristic of a semiconductor device, or all the interlayer insulating layers ILD may be set to have the same thickness. The interlayer insulating layers ILD may be formed of an insulating material for the purpose of insulation between the gate electrodes EL1, EL2, and EL3. As an example, the interlayer insulating layers ILD may be formed of silicon oxide.

The plurality of channel holes CH penetrating the stacked structures ST and a portion of the substrate SUB may be provided. The vertical channel structures VS may be provided in the channel holes CH. The vertical channel structures VS that are the plurality of cell strings CSTR illustrated in FIG. 2 may be formed to extend in the third direction D3 in a state of being connected to the substrate SUB. That the vertical channel structures VS are connected to the substrate SUB may mean that a portion of each of the vertical channel structures VS is buried inside the substrate SUB, but the present disclosure is not limited thereto. For example, the vertical channel structures VS may be formed such that lower surfaces of the vertical channel structures VS are in contact with the upper surface of the substrate SUB. When the portion of each of the vertical channel structures VS is buried inside the substrate SUB, the lower surfaces of the vertical channel structures VS may be located to be lower in level than the upper surface of the substrate SUB.

Columns of the vertical channel structures VS penetrating one of the stacked structures ST may be provided in plurality. For example, as illustrated in FIG. 8, columns of two vertical channel structures VS may penetrate one of the stacked structures ST. However, the present disclosure is not limited thereto. For example, columns of three or more vertical channel structures VS may penetrate one of the stacked structures ST. In a pair of adjacent columns, the vertical channel structures VS corresponding to one column may be shifted in the first direction D1 from the vertical channel structures VS corresponding to the other column adjacent thereto. In a plan view, the vertical channel structures VS may be arranged in a zig-zag shape along the first direction D1. However, the present disclosure is not limited thereto. For example, the vertical channel structures VS may form an arrangement in which the vertical channel structures VS are disposed side by side in a row and a column.

Each of the vertical channel structures VS may be formed to extend from the substrate SUB in the third direction D3.

An example in which each of the vertical channel structures VS has a pillar shape where an upper end and a lower end have the same width is illustrated in drawing, but the present disclosure is not limited thereto. For example, each of the vertical channel structures VS may have a shape in which widths in the first direction D1 and the second direction D2 increase as it goes toward the third direction D3. This is caused due to the limitation that when the channel holes CH are etched, the widths in the first direction D1 and the second direction D2 decrease as it goes toward a direction facing away from the third direction D3. The upper surface of each of the vertical channel structures VS may have a circular shape, an oval shape, a square shape, or a bar shape.

Each of the vertical channel structures VS may include the data storage pattern DSP, the vertical channel pattern VCP, the vertical semiconductor pattern VSP, and the conductive pad "PAD". In each of the vertical channel structures VS, the lower end of the data storage pattern DSP may be in the shape of a closed pipe or a macaroni, and the lower end of the vertical channel pattern VCP may be in the shape of an opened pipe or a macaroni. The vertical semiconductor pattern VSP may fill a space surrounded by the vertical channel pattern VCP and the conductive pad "PAD".

In a state of covering an inner sidewall of each of the channel holes CH, the data storage pattern DSP may contact the vertical channel pattern VCP inwardly and may contact the sidewalls of the gate electrodes EL1, EL2, and EL3 outwardly. As such, regions of the data storage pattern DSP, which correspond to the second gate electrodes EL2, may form memory cells, in which a memory operation (e.g., a program operation, a read operation, or an erase operation) is performed by voltages applied through the second gate electrodes EL2, together with regions of the vertical channel pattern VCP, which correspond to the second gate electrodes EL2. The memory cells correspond to the memory cell transistors MCT illustrated in FIG. 2. That is, the data storage pattern DSP may trap charges or holes by the voltages applied through the second gate electrodes EL2 or may maintain a state of charges (e.g., a polarization state of charges) by the voltages applied through the second gate electrodes EL2, and thus, the data storage pattern DSP may act as data storage in the three-dimensional flash memory. For example, an ONO (Tunneling Oxide-Charge Trap Nitride-Blocking Oxide) layer or a ferroelectric layer may be used as the data storage pattern DSP. The data storage pattern DSP may indicate a binary data value or a multi-bit (multi-level) data value through the change in the amount of trapped charges or holes or may indicate a binary data value or a multi-bit (multi-level) data value through a state change of charges.

The vertical channel pattern VCP may cover an inner sidewall of the data storage pattern DSP. The vertical channel pattern VCP may include the first portion VCP1 and the second portion VCP2 on the first portion VCP1.

The first portion VCP1 of the vertical channel pattern VCP may be provided on a lower portion of each of the channel holes CH and may contact the substrate SUB. The first portion VCP1 of the vertical channel pattern VCP may be used for the purpose of blocking, suppressing, or minimizing a leakage current in each of the vertical channel structures VS and/or for the purpose of an epitaxial pattern. A thickness of the first portion VCP1 of the vertical channel pattern VCP may be, for example, greater than the thickness of the first gate electrode EL1. A sidewall of the first portion VCP1 of the vertical channel pattern VCP may be surrounded by the data storage pattern DSP. An upper surface of the first portion VCP1 of the vertical channel pattern VCP may be located to be higher in level than an upper surface of the first gate electrode EL1. In detail, the upper surface of the first portion VCP1 of the vertical channel pattern VCP may be located between the upper surface of the first gate electrode EL1 and a lower surface of the lowermost one of the second gate electrodes EL2. A lower surface of the first portion VCP1 of the vertical channel pattern VCP may be located to be lower in level than the uppermost surface of the substrate SUB (i.e., a lower surface of the lowermost one of the interlayer insulating layers ILD). A portion of the first portion VCP1 of the vertical channel pattern VCP may overlap the first gate electrode EL1 in a horizontal direction. Below, the horizontal direction means an arbitrary direction extending on a plane parallel to the first direction D1 and the second direction D2.

The second portion VCP2 of the vertical channel pattern VCP may extend from the upper surface of the first portion VCP1 in the third direction D3. The second portion VCP2 of the vertical channel pattern VCP may be provided between the data storage pattern DSP and the vertical semiconductor pattern VSP and may correspond to the second gate electrodes EL2. As described above, the second portion VCP2 of the vertical channel pattern VCP may form memory cells together with the regions of the data storage pattern DSP, which correspond to the second gate electrodes EL2.

An upper surface of the second portion VCP2 of the vertical channel pattern VCP may be substantially coplanar with an upper surface of the vertical channel pattern VCP. The upper surface of the second portion VCP2 of the vertical channel pattern VCP may be located to be higher in level than an upper surface of the uppermost one of the second gate electrodes EL2. In detail, the upper surface of the second portion VCP2 of the vertical channel pattern VCP may be located between an upper surface and a lower surface of the third gate electrode EL3.

The vertical channel pattern VCP that is a component transferring charges or holes to the data storage pattern DSP may be formed of monocrystalline silicon or polysilicon such that a channel is formed or boosted by a voltage applied thereto. However, the present disclosure is not limited thereto. For example, the vertical channel pattern VCP may be formed of an oxide semiconductor material capable of blocking, suppressing, or minimizing a leakage current. For example, the vertical channel pattern VCP may be formed of an oxide semiconductor material including at least one of In, Zn, or Ga with an excellent leakage current characteristic, a group 4 semiconductor material, etc. The vertical channel pattern VCP may be formed of, for example, a $ZnO_x$-based material including AZO, ZTO, IZO, ITO, IGZO, or Ag—ZnO. Accordingly, the vertical channel pattern VCP may block, suppress, or minimize a leakage current to the gate electrodes EL1, EL2, and EL3 or the substrate SUB and may improve a transistor characteristic (e.g., a threshold voltage distribution and a speed of the program/read operation) of at least one of the gate electrodes EL1, EL2, and EL3, and thus, an electrical characteristic of the three-dimensional flash memory may be improved.

The vertical semiconductor pattern VSP may be surrounded by the second portion VCP2 of the vertical channel pattern VCP. The upper surface of the vertical semiconductor pattern VSP may contact the conductive pad "PAD", and the lower surface of the vertical semiconductor pattern VSP may contact the first portion VCP1 of the vertical semiconductor pattern VSP. The vertical semiconductor pattern VSP may be spaced from the substrate SUB in the third direction D3. In other words, the vertical semiconductor pattern VSP may be electrically floated from the substrate SUB.

The vertical semiconductor pattern VSP may be formed of a material that helps diffusion of charges or holes in the vertical channel pattern VCP. In detail, the vertical semiconductor pattern VSP may be formed of a material whose charge and hole mobility is excellent. For example, the vertical semiconductor pattern VSP may be formed of a semiconductor material doped with impurities, an intrinsic semiconductor material not doped with impurities, or a polycrystalline semiconductor material. In detail, for example, the vertical semiconductor pattern VSP may be formed of polysilicon doped with impurities of the first conductivity type (e.g., P-type dopants) that is identical to that of the substrate SUB. That is, the vertical semiconductor pattern VSP may make the electrical characteristic of the three-dimensional flash memory better, and thus, the speed of the memory operation may be improved.

Returning to FIG. 2, the vertical channel structures VS may correspond to channels of the erase control transistor ECT, the first and second string selection transistors SST1 and SST2, the ground selection transistor GST, and the memory cell transistors MCT.

The conductive pad "PAD" may be provided on the upper surface of the second portion VCP2 of the vertical channel pattern VCP and the upper surface of the vertical channel pattern VCP. The conductive pad "PAD" may be connected to an upper portion of the vertical channel pattern VCP and an upper portion of the vertical semiconductor pattern VSP. A sidewall of the conductive pad "PAD" may be surrounded by the data storage pattern DSP. An upper surface of the conductive pad "PAD" may be substantially coplanar with the upper surface of each of the stacked structures ST (e.g., an upper surface of the uppermost one of the interlayer insulating layers ILD). A lower surface of the conductive pad "PAD" may be located to be lower in level than the upper surface of the third gate electrode EL3. In detail, the lower surface of the conductive pad "PAD" may be located between the upper surface and the lower surface of the third gate electrode EL3. That is, at least a portion of the conductive pad "PAD" may overlap the third gate electrode EL3 in the horizontal direction.

The conductive pad "PAD" may be formed of impurity-doped semiconductor or a conductive material. For example, the conductive pad "PAD" may be formed of a semiconductor material doped with impurities different from that of the vertical semiconductor pattern VSP (in detail, a semiconductor material doped with impurities of the second conductive type (e.g., N-type) different from the first conductive type (e.g., P-type).

The conductive pad "PAD" may reduce a contact resistance between the bit line BL to be described later and the vertical channel pattern VCP (or the vertical semiconductor pattern VSP).

A structure in which the vertical channel structures VS include the conductive pad "PAD" is described above, but the present disclosure is not limited thereto. For example, the vertical channel structures VS may not include the conductive pad "PAD" in structure. In this case, as the conductive pad "PAD" is omitted from the vertical channel structures VS, each of the vertical channel pattern VCP and the vertical semiconductor pattern VSP may be formed to extend in the third direction D3 such that the upper surface of each of the vertical channel pattern VCP and the vertical semiconductor pattern VSP is substantially coplanar with the upper surface of each of the stacked structures ST (i.e., the upper surface of the uppermost one of the interlayer insulating layers ILD). Also, in this case, the bit line contact plug BLPG to be described later may directly contact the vertical channel pattern VCP and may be electrically connected thereto, instead of electrically indirectly connected to the vertical channel pattern VCP through the conductive pad "PAD".

Also, an example in which the vertical semiconductor pattern VSP is included in the vertical channel structures VS is described above, but the present disclosure is not limited thereto. For example, the vertical semiconductor pattern VSP may be omitted.

Also, the above description is given as the vertical channel pattern VCP has a structure in which the first portion VCP1 and the second portion VCP2 are included in the vertical channel pattern VCP, but the present disclosure is not limited thereto. For example, the vertical channel pattern VCP may have a structure in which the first portion VCP1 is excluded. For example, the vertical channel pattern VCP may be provided between the vertical channel pattern VCP formed to extend to the substrate SUB and the data storage pattern DSP and may be formed to extend to the substrate SUB such that the contact with the substrate SUB is made. In this case, the lower surface of the vertical channel pattern VCP may be located to be lower in level than the uppermost surface of the substrate SUB (i.e., the lower surface of the lowermost one of the interlayer insulating layers ILD), and the upper surface of the vertical channel pattern VCP may be substantially coplanar with the upper surface of the vertical semiconductor pattern VSP.

The isolation trench TR extending in the first direction D1 may be provided between the stacked structures ST adjacent to each other. The common source region CSR may be provided in the interior of the substrate SUB exposed by the isolation trench TR. The common source region CSR may extend in the first direction D1 in the substrate SUB. The common source region CSR may be formed of a semiconductor material doped with impurities of the second conductive type (e.g., N-type impurities). The common source region CSR may correspond to the common source line CSL of FIG. 2.

The common source plug CSP may be provided in the isolation trench TR. The common source plug CSP may be connected to the common source region CSR. An upper surface of the common source plug CSP may be substantially coplanar with the upper surface of each of the stacked structures ST (i.e., the upper surface of the uppermost one of the interlayer insulating layers ILD). The common source plug CSP may be in the shape of a plate extending in the first direction D1 and the third direction D3. In this case, the common source plug CSP may have a shape in which a width in the second direction D2 increases as it goes toward the third direction D3.

The insulating spaces SP may be interposed between the common source plug CSP and the stacked structures ST. The insulating spacers SP may be provided to face each other between the stacked structures ST adjacent to each other. For example, the insulating spacers SP may be formed of silicon oxide, silicon nitride, silicon oxynitride, or a low-k material with a low dielectric constant.

The capping insulating layer CAP may be provided on the stacked structures ST, the vertical channel structures VS, and the common source plug CSP. The capping insulating layer CAP may cover the upper surface of the uppermost one of the interlayer insulating layers ILD, the upper surface of the conductive pad "PAD", and the upper surface of the common source plug CSP. The capping insulating layer CAP may be formed of an insulating material different from that of the interlayer insulating layers ILD. The bit line contact plug BLPG that is electrically connected to the conductive pad "PAD" may be provided inside the capping insulating layer CAP. The bit line contact plug BLPG may have a shape in which a width in the first direction D1 and a width in the second direction D2 increase as it goes toward the third direction D3.

The bit line BL may be provided on the capping insulating layer CAP and the bit line contact plug BLPG. The bit line BL that corresponds to one of the plurality of bit lines BL0, BL1, and BL2 illustrated in FIG. 2 may be formed of a conductive material and may be formed to extend along the second direction D2. The conductive material of the bit line BL may be the same as the conductive material forming the gate electrodes EL1, EL2, and EL3 described above.

The bit line BL may be electrically connected to the vertical channel structures VS through the bit line contact plug BLPG. Herein, that the bit line BL is connected to the vertical channel structures VS may mean that the bit line BL is connected to the vertical channel pattern VCP included in the vertical channel structures VS.

The three-dimensional flash memory with the above structure may perform the program operation, the read operation, and the erase operation based on a voltage applied to each of the cell strings CSTR, a voltage applied to the string selection line SSL, a voltage applied to each of the word lines WL0 to WLn, a voltage applied to the ground selection line GSL, and a voltage applied to the common source line CSL. For example, based on the voltage applied to each of the cell strings CSTR, the voltage applied to the string selection line SSL, the voltage applied to each of the word lines WL0 to WLn, the voltage applied to the ground selection line GSL, and the voltage applied to the common source line CSL, the three-dimensional flash memory may form a channel in the vertical channel pattern VCP such that charges or holes are transferred to the data storage pattern DSP of a target memory cell. This may mean that the three-dimensional flash memory performs the program operation. This will be described in detail with reference to FIGS. 11 and 12.

Also, the three-dimensional flash memory according to an embodiment is not limited to the above structure; depending on an example to implement, the three-dimensional flash memory may be implemented in various structures under the condition that the vertical channel pattern VCP, the data storage pattern DSP, the gate electrodes EL1, EL2, and EL3, the bit line BL, and the common source line CSL are included.

Figure 10:
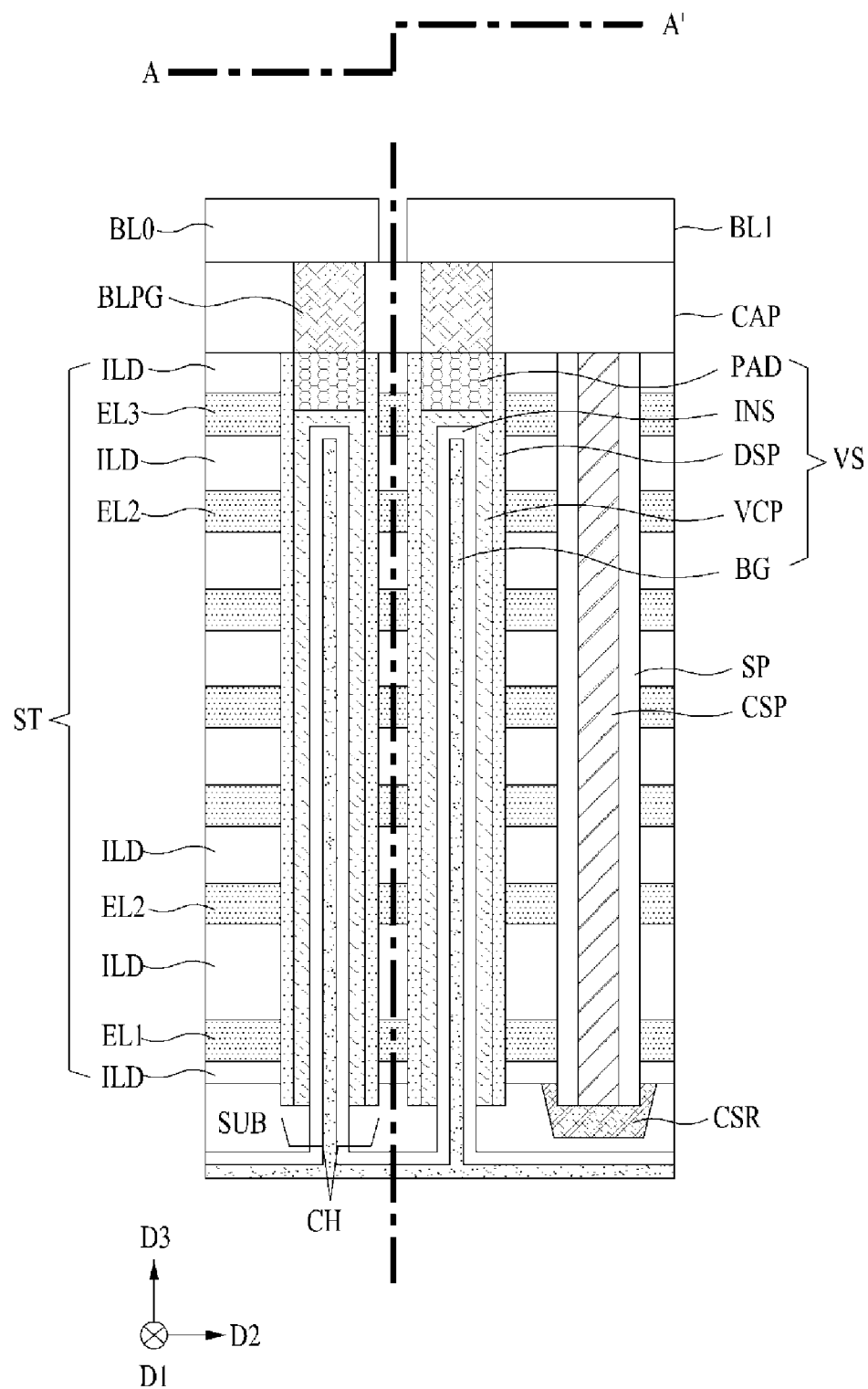
FIG. 10 is a cross-sectional view illustrating a structure of a three-dimensional flash memory according to another embodiment and corresponds to the cross section taken along line A-A' of FIG. 8.

FIG. 10 is a cross-sectional view illustrating a structure of a three-dimensional flash memory according to another embodiment and corresponds to the cross section taken along line A-A' of FIG. 8.

Referring to FIG. 10, the substrate SUB may be a semiconductor substrate such as a silicon substrate, a silicon-germanium substrate, a germanium substrate, or a single crystal epitaxial layer grown on a monocrystalline silicon substrate. The first conductive-type impurities (e.g., P-type impurities) may be doped in the substrate SUB.

The stacked structures ST may be disposed on the substrate SUB. The stacked structures ST may be arranged along the second direction D2 in the two-dimensional structure in a state of being formed to extend in the first direction D1. Also, the stacked structures ST may be spaced from each other in the second direction D2.

Each of the stacked structures ST may include the gate electrodes EL1, EL2, and EL3 and the interlayer insulating layers ILD alternately stacked in the vertical direction (e.g., the third direction D3) perpendicular to an upper surface of the substrate SUB. The stacked structures ST may have substantially a flat (or even) upper surface. That is, the upper surface of the stacked structures ST may be parallel to the upper surface of the substrate SUB. Below, the vertical direction means the third direction D3 or a direction facing away from the third direction D3.

Returning to FIG. 2, each of the gate electrodes EL1, EL2, and EL3 may be one of the erase control line ECL, the ground selection lines GSL0, GSL1, and GSL2, the word lines WL0 to WLn and DWL, the first string selection lines SSL1-1, SSL1-2, and SSL1-3, and the second string selection lines SSL2-1, SSL2-2, and SSL2-3 sequentially stacked on the substrate SUB.

Each of the gate electrodes EL1, EL2, and EL3 may have the same thickness in the third direction D3 in a state of being formed to extend in the first direction D1. Below, the thickness means a thickness in the third direction D3. Each of the gate electrodes EL1, EL2, and EL3 may be formed of a conductive material. For example, each of the gate electrodes EL1, EL2, and EL3 may include at least one selected from the group of doped semiconductor (e.g., doped silicon, etc.), metal (e.g., tungsten (W), copper (Cu), aluminum (Al), titanium (Ti), tantalum (Ta), molybdenum (Mo), ruthenium (Ru), gold (Au), etc.), or conductive metal nitride (e.g., titanium nitride, tantalum nitride, etc.). Each of the gate electrodes EL1, EL2, and EL3 may include at least one of all metal materials capable of being formed by ALD, in addition to the above metal materials.

In detail, the gate electrodes EL1, EL2, and EL3 may include the first gate electrode EL1 being the lowermost, the third gate electrode EL3 being the uppermost, and the plurality of second gate electrodes EL2 between the first gate electrode EL1 and the third gate electrode EL3. Each of the first gate electrode EL1 and the third gate electrode EL3 is illustrated and described in the singular form, but this is provided as an example without limitation thereto; if necessary, each of the first gate electrode EL1 and the third gate electrode EL3 may be provided in plurality. The first gate electrode EL1 may be one of the ground selection lines GSL0, GSL1, and GLS2 illustrated in FIG. 2. The second gate electrode EL2 may correspond to one of the word lines WL0 to WLn and DWL illustrated in FIG. 2. The third gate electrode EL3 may correspond to one of the first string selection lines SSL1-1, SSL1-2, and SSL1-3 of FIG. 2 illustrated in FIG. 2 or one of the second string selection lines SSL2-1, SSL2-2, and SSL2-3 illustrated in FIG. 2.

Although not illustrated, end portions of the stacked structures ST may have a stepwise structure along the first direction D1. In detail, in the gate electrodes EL1, EL2, and EL3 of the stacked structures ST, a length in the first direction D1 may decrease as a distance from the substrate SUB increases. The length of the third gate electrode EL3 in the first direction D1 may be the smallest, and the separation distance of the third gate electrode EL3 from the substrate SUB in the third direction D3 may be the greatest. The length of the first gate electrode EL1 in the first direction D1 may be the greatest, and the separation distance of the first gate electrode EL1 from the substrate SUB in the third direction D3 may be the smallest. By the stepwise structure, the thickness of each of the stacked structures ST may decrease as a distance from the outer-most one of vertical channel structures VS to be described later increases; in a plan view, the sidewalls of the gate electrodes EL1, EL2, and EL3 may be spaced from each other along the first direction D1 at given intervals.

The interlayer insulating layers ILD may have different thicknesses. As an example, the uppermost one and the lowermost one among the interlayer insulating layers ILD may have a thickness smaller than that of the remaining interlayer insulating layers ILD. However, this is provided as an example without limitation thereto. For example, the interlayer insulating layers ILD may have different thicknesses depending on a characteristic of a semiconductor device, or all the interlayer insulating layers ILD may be set to have the same thickness. The interlayer insulating layers ILD may be formed of an insulating material for the purpose of insulation between the gate electrodes EL1, EL2, and EL3. As an example, the interlayer insulating layers ILD may be formed of silicon oxide.

The plurality of channel holes CH penetrating the stacked structures ST and a portion of the substrate SUB may be provided. The vertical channel structures VS may be provided in the channel holes CH. The vertical channel structures VS that are the plurality of cell strings CSTR illustrated in FIG. 2 may be formed to extend in the third direction D3 in a state of being connected to the substrate SUB. That the vertical channel structures VS are connected to the substrate SUB may mean that a portion of each of the vertical channel structures VS is buried inside the substrate SUB, but the present disclosure is not limited thereto. For example, the vertical channel structures VS may be formed such that lower surfaces of the vertical channel structures VS are in contact with the upper surface of the substrate SUB. When the portion of each of the vertical channel structures VS is buried inside the substrate SUB, the lower surfaces of the vertical channel structures VS may be located to be lower in level than the upper surface of the substrate SUB.

columns of the vertical channel structures VS penetrating one of the stacked structures ST may be provided in plurality. For example, as illustrated in FIG. 2, columns of two vertical channel structures VS may penetrate one of the stacked structures ST. However, the present disclosure is not limited thereto. For example, columns of three or more vertical channel structures VS may penetrate one of the stacked structures ST. In a pair of adjacent columns, the vertical channel structures VS corresponding to one column may be shifted in the first direction D1 from the vertical channel structures VS corresponding to the other column adjacent thereto. In a plan view, the vertical channel structures VS may be arranged in a zig-zag shape along the first direction D1. However, the present disclosure is not limited thereto. For example, the vertical channel structures VS may form an arrangement in which the vertical channel structures VS are disposed side by side in a row and a column.

Each of the vertical channel structures VS may be formed to extend from the substrate SUB in the third direction D3. An example in which each of the vertical channel structures VS has a pillar shape where an upper end and a lower end have the same width is illustrated in drawing, but the present disclosure is not limited thereto. For example, each of the vertical channel structures VS may have a shape in which widths in the first direction D1 and the second direction D2 increase as it goes toward the third direction D3. This is caused due to the limitation that when the channel holes CH are etched, the widths in the first direction D1 and the second direction D2 decrease as it goes toward a direction facing away from the third direction D3. The upper surface of each of the vertical channel structures VS may have a circular shape, an oval shape, a square shape, or a bar shape.

Each of the vertical channel structures VS may include the data storage pattern DSP, the vertical channel pattern VCP, a back gate BG, and the conductive pad "PAD". In each of the vertical channel structures VS, the lower end of the data storage pattern DSP may be in the shape of an opened pipe or a macaroni, and the lower end of the vertical channel pattern VCP may be in the shape of a closed pipe or a macaroni. The back gate BG may be formed to apply a voltage to the vertical channel pattern VCP, with at least a portion thereof surrounded by the vertical channel pattern VCP. Below, that the back gate BG is included in the vertical channel pattern VCP may mean a state where at least a portion of the back gate BG is surrounded by the vertical channel pattern VCP, as described.

In a state of covering an inner sidewall of each of the channel holes CH, the data storage pattern DSP may contact the vertical channel pattern VCP inwardly and may contact the sidewalls of the gate electrodes EL1, EL2, and EL3 outwardly. As such, regions of the data storage pattern DSP, which correspond to the second gate electrodes EL2, may form memory cells, in which the memory operation (e.g., a program operation, a read operation, or an erase operation) is performed by voltages applied through the second gate electrodes EL2, together with regions of the vertical channel pattern VCP, which correspond to the second gate electrodes EL2. The memory cells correspond to the memory cell transistors MCT illustrated in FIG. 2. That is, the data storage pattern DSP may trap charges or holes by the voltages applied through the second gate electrodes EL2 or may maintain a state of charges (e.g., a polarization state of charges) by the voltages applied through the second gate electrodes EL2, and thus, the data storage pattern DSP may act as data storage in the three-dimensional flash memory. For example, an ONO (Tunneling Oxide-Charge Trap Nitride-Blocking Oxide) layer or a ferroelectric layer may be used as the data storage pattern DSP. The data storage pattern DSP may indicate a binary data value or a multi-bit (multi-level) data value through the change in the amount of trapped charges or holes or may indicate a binary data value or a multi-bit (multi-level) data value through a state change of charges.

The vertical channel pattern VCP may cover an inner sidewall of the data storage pattern DSP and may extend in the third direction D3. The vertical channel pattern VCP may be provided between the data storage pattern DSP and the back gate BG and may correspond to the second gate electrodes EL2. As such, as described above, the vertical channel pattern VCP may form memory cells together with the regions of the data storage pattern DSP, which correspond to the second gate electrodes EL2.

An upper surface of the vertical channel pattern VCP may be located to be higher in level than an upper surface of the uppermost one of the second gate electrodes EL2. In detail, the upper surface of the vertical channel pattern VCP may be located between the upper surface and the lower surface of the third gate electrode EL3.

The vertical channel pattern VCP that is a component transferring charges or holes to the data storage pattern DSP may be formed of monocrystalline silicon or polysilicon such that a channel is formed or boosted by a voltage applied thereto. However, the present disclosure is not limited thereto. For example, the vertical channel pattern VCP may be formed of an oxide semiconductor material capable of blocking, suppressing, or minimizing a leakage current. For example, the vertical channel pattern VCP may be formed of an oxide semiconductor material including at least one of In, Zn, or Ga with an excellent leakage current characteristic, a group 4 semiconductor material, etc. The vertical channel pattern VCP may be formed of, for example, a $ZnO_x$-based material including AZO, ZTO, IZO, ITO, IGZO, or Ag—ZnO. Accordingly, the vertical channel pattern VCP may block, suppress, or minimize a leakage current to the gate electrodes EL1, EL2, and EL3 or the substrate SUB and may improve a transistor characteristic (e.g., a threshold voltage distribution and a speed of the program/read operation) of at least one of the gate electrodes EL1, EL2, and EL3, and thus, an electrical characteristic of the three-dimensional flash memory may be improved.

The back gate BG may contact the vertical channel pattern VCP, with at least a portion thereof surrounded by the vertical channel pattern VCP, and may be formed to apply a voltage to the vertical channel pattern VCP for the memory operation. To this end, the back gate BG may be formed of a conductive material may include at least one selected from the group of doped semiconductor (e.g., doped silicon, etc.), metal (e.g., tungsten (W), copper (Cu), aluminum (Al), titanium (Ti), tantalum (Ta), molybdenum (Mo), ruthenium (Ru), gold (Au), etc.), or conductive metal nitride (e.g., titanium nitride, tantalum nitride, etc.). The back gate BG may include at least one of all metal materials capable of being formed by ALD, in addition to the above metal materials.

In this case, the back gate BG may be formed to extend along the third direction D3 in the vertical channel pattern VCP from a level corresponding to the first gate electrode EL1 to a level corresponding to the second gate electrode EL2. that is, an upper surface of the back gate BG may be located to be higher in level than the upper surface of the uppermost one of the second gate electrodes EL2. However, the present disclosure is not limited thereto. For example, the back gate BG may be formed to extend along the third direction D3 in the vertical channel pattern VCP to a level corresponding to the third gate electrode EL3.

A lower substrate contacting a lower portion of the back gate BG is omitted in drawing, but depending on an example to implement, the lower substrate contacting a lower surface of the back gate BG may be included. Also, depending on an example to implement, the back gate BG may be formed from the interior of the substrate SUB or may be formed from an upper portion of the substrate SUB.

The back gate BG may be included in the vertical channel pattern VCP of each of the cell strings CSTR, and all the back gates BG respectively included in the vertical channel patterns VCP of the cell strings CSTR may be electrically connected on a plane that the first direction D1 and the second direction D2 form. That is, the back gate BG may be connected in common to the cell strings CSTR. In this case, the back gates BG of the cell strings CSTR may be controlled at the same time such that the same voltage is applied to all the back gates BG.

However, the present disclosure is not limited thereto. For example, the back gates BG respectively included in the vertical channel patterns VCP of the cell strings CSTR may be electrically connected to each other along the first direction D1 of FIG. 2. In this case, the back gates BG of the cell strings CSTR arranged along the second direction D2 may be electrically controlled independently of each other such that different voltages are applied to the back gates BG, and the back gates BG of the cell strings CSTR arranged along the first direction D1 of FIG. 2 may be controlled at the same time such that the same voltage is applied to the back gates BG.

Also. the back gates BG respectively included in the vertical channel patterns VCP of the cell strings CSTR may be electrically connected to each other along the second direction D2 of FIG. 2. In this case, the back gates BG of the cell strings CSTR arranged along the first direction D1 may be electrically controlled independently of each other such that different voltages are applied to the back gates BG, and the back gates BG of the cell strings CSTR arranged along the second direction D2 of FIG. 2 may be controlled at the same time such that the same voltage is applied to the back gates BG.

An insulating layer INS may be disposed between the back gate BG and the vertical channel pattern VCP, and thus, the back gate BG may be prevented from directly contacting the vertical channel pattern VCP. Like the interlayer insulating layers ILD, the insulating layer ILS may be formed of an insulating material such as silicon oxide.

A structure in which the back gate BG is formed in an inner hole of the vertical channel pattern VCP and is formed in a state of being closely surrounded by the vertical channel pattern VCP is described above, but the present disclosure is not limited thereto. For example, a structure in which only at least a portion of the back gate BG may be surrounded by the vertical channel pattern VCP may be possible. For example, a structure in which the back gate BG and the insulating layer INS are included in at least a portion of the vertical channel pattern VCP or a structure in which the back gate BG and the insulating layer INS penetrate the vertical channel pattern VCP may be possible.

Returning to FIG. 2, the vertical channel structures VS may correspond to channels of the erase control transistor ECT, the first and second string selection transistors SST1 and SST2, the ground selection transistor GST, and the memory cell transistors MCT.

The conductive pad "PAD" may be provided on the upper surface of the vertical channel pattern VCP. The conductive pad "PAD" may be connected to an upper portion of the vertical channel pattern VCP. A sidewall of the conductive pad "PAD" may be surrounded by the data storage pattern DSP. An upper surface of the conductive pad "PAD" may be substantially coplanar with the upper surface of each of the stacked structures ST (e.g., an upper surface of the uppermost one of the interlayer insulating layers ILD). A lower surface of the conductive pad "PAD" may be located to be lower in level than the upper surface of the third gate electrode EL3. In detail, the lower surface of the conductive pad "PAD" may be located between the upper surface and the lower surface of the third gate electrode EL3. That is, at least a portion of the conductive pad "PAD" may overlap the third gate electrode EL3 in the horizontal direction.

The conductive pad "PAD" may be formed of impurity-doped semiconductor or a conductive material. For example, the conductive pad "PAD" may be formed of a semiconductor material doped with impurities different from that of the substrate SUB (in detail, a semiconductor material doped with impurities of the second conductive type (e.g., N-type) different from the first conductive type (e.g., P-type)).

The conductive pad "PAD" may reduce a contact resistance between the bit line BL to be described later and the vertical channel pattern VCP.

The isolation trench TR extending in the first direction D1 may be provided between the stacked structures ST adjacent to each other. The common source region CSR may be provided in the interior of the substrate SUB exposed by the isolation trench TR. The common source region CSR may extend in the first direction D1 in the substrate SUB. The common source region CSR may be formed of a semiconductor material doped with impurities of the second conductive type (e.g., N-type impurities). The common source region CSR may correspond to the common source line CSL of FIG. 2.

The common source plug CSP may be provided in the isolation trench TR. The common source plug CSP may be connected to the common source region CSR. An upper surface of the common source plug CSP may be substantially coplanar with the upper surface of each of the stacked structures ST (i.e., the upper surface of the uppermost one of the interlayer insulating layers ILD). The common source plug CSP may be in the shape of a plate extending in the first direction D1 and the third direction D3. In this case, the common source plug CSP may have a shape in which a width in the second direction D2 increases as it goes toward the third direction D3.

The insulating spaces SP may be interposed between the common source plug CSP and the stacked structures ST. The insulating spacers SP may be provided to face each other between the stacked structures ST adjacent to each other. For example, the insulating spacers SP may be formed of silicon oxide, silicon nitride, silicon oxynitride, or a low-k material with a low dielectric constant.

The capping insulating layer CAP may be provided on the stacked structures ST, the vertical channel structures VS, and the common source plug CSP. The capping insulating layer CAP may cover the upper surface of the uppermost one of the interlayer insulating layers ILD, the upper surface of the conductive pad "PAD", and the upper surface of the common source plug CSP. The capping insulating layer CAP may be formed of an insulating material different from that of the interlayer insulating layers ILD. The bit line contact plug BLPG that is electrically connected to the conductive pad "PAD" may be provided inside the capping insulating layer CAP. The bit line contact plug BLPG may have a shape in which a width in the first direction D1 and a width in the second direction D2 increase as it goes toward the third direction D3.

The bit line BL may be provided on the capping insulating layer CAP and the bit line contact plug BLPG. The bit line BL that corresponds to one of the plurality of bit lines BL0, BL1, and BL2 illustrated in FIG. 2 may be formed of a conductive material and may be formed to extend along the second direction D2. The conductive material of the bit line BL may be the same as the conductive material forming the gate electrodes EL1, EL2, and EL3 described above.

The bit line BL may be electrically connected to the vertical channel structures VS through the bit line contact plug BLPG. Herein, that the bit line BL is connected to the vertical channel structures VS may mean that the bit line BL is connected to the vertical channel pattern VCP included in the vertical channel structures VS.

The three-dimensional flash memory with the above structure may perform the program operation, the read operation, and the erase operation based on a voltage applied to each of the cell strings CSTR, a voltage applied to the string selection line SSL, a voltage applied to each of the word lines WL0 to WLn, a voltage applied to the ground selection line GSL, a voltage applied to the common source line CSL, and a voltage applied to the back gate BG. For example, based on the voltage applied to each of the cell strings CSTR, the voltage applied to the string selection line SSL, the voltage applied to each of the word lines WL0 to WLn, the voltage applied to the ground selection line GSL, the voltage applied to the common source line CSL, and the voltage applied to the back gate BG, the three-dimensional flash memory may form a channel in the vertical channel pattern VCP such that charges or holes are transferred to the data storage pattern DSP of a target memory cell. This may mean that the three-dimensional flash memory performs the program operation. This will be described in detail with reference to FIGS. 11 and 12.

Also, the three-dimensional flash memory according to another embodiment is not limited to the above structure; depending on an example to implement, the three-dimensional flash memory may be implemented in various structures under the condition that the vertical channel pattern VCP, the data storage pattern DSP, the back gate BG, the gate electrodes EL1, EL2, and EL3, the bit line BL, and the common source line CSL are included.

Figure 11:
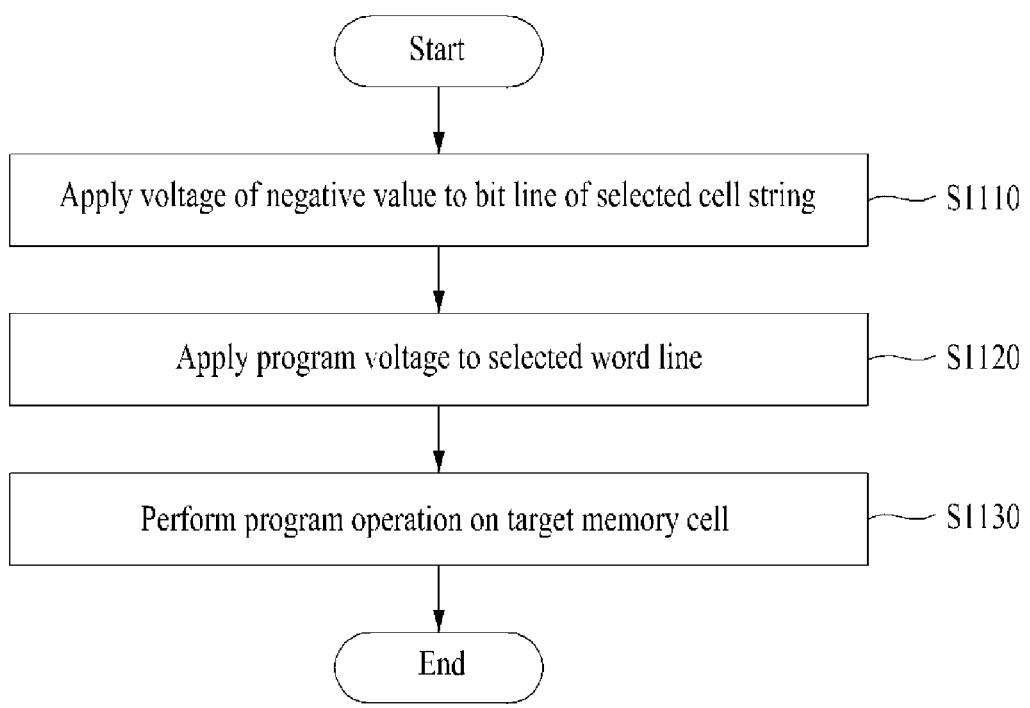
FIG. 11 is a flowchart illustrating a program operation method of a three-dimensional flash memory illustrated in FIGS. 9 and 10.
Figure 12:
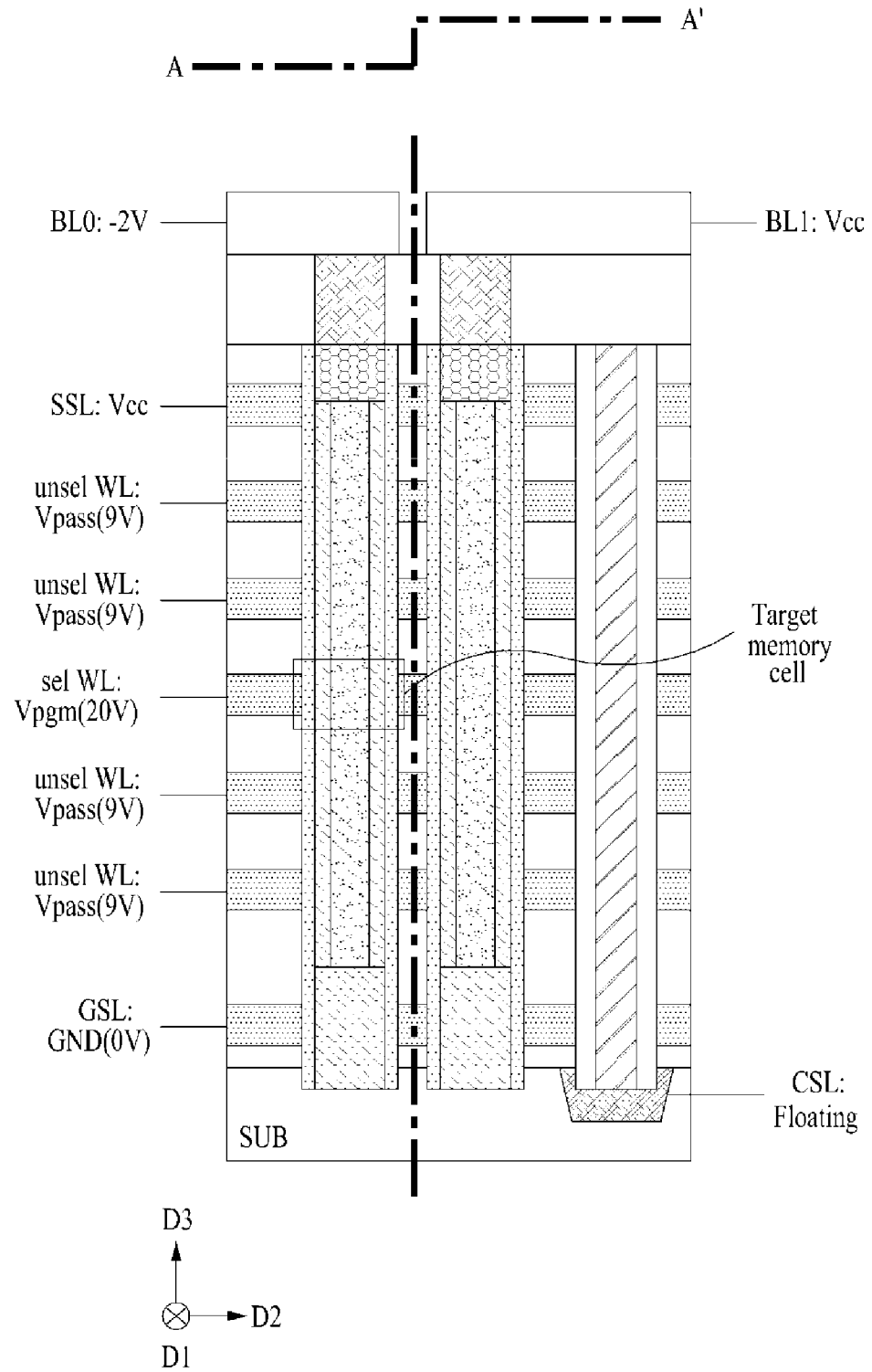
FIG. 12 is a cross-sectional view illustrating a structure of a three-dimensional flash memory illustrated in FIG. 9 to describe a program operation method illustrated in FIG. 11.
Figure 13:
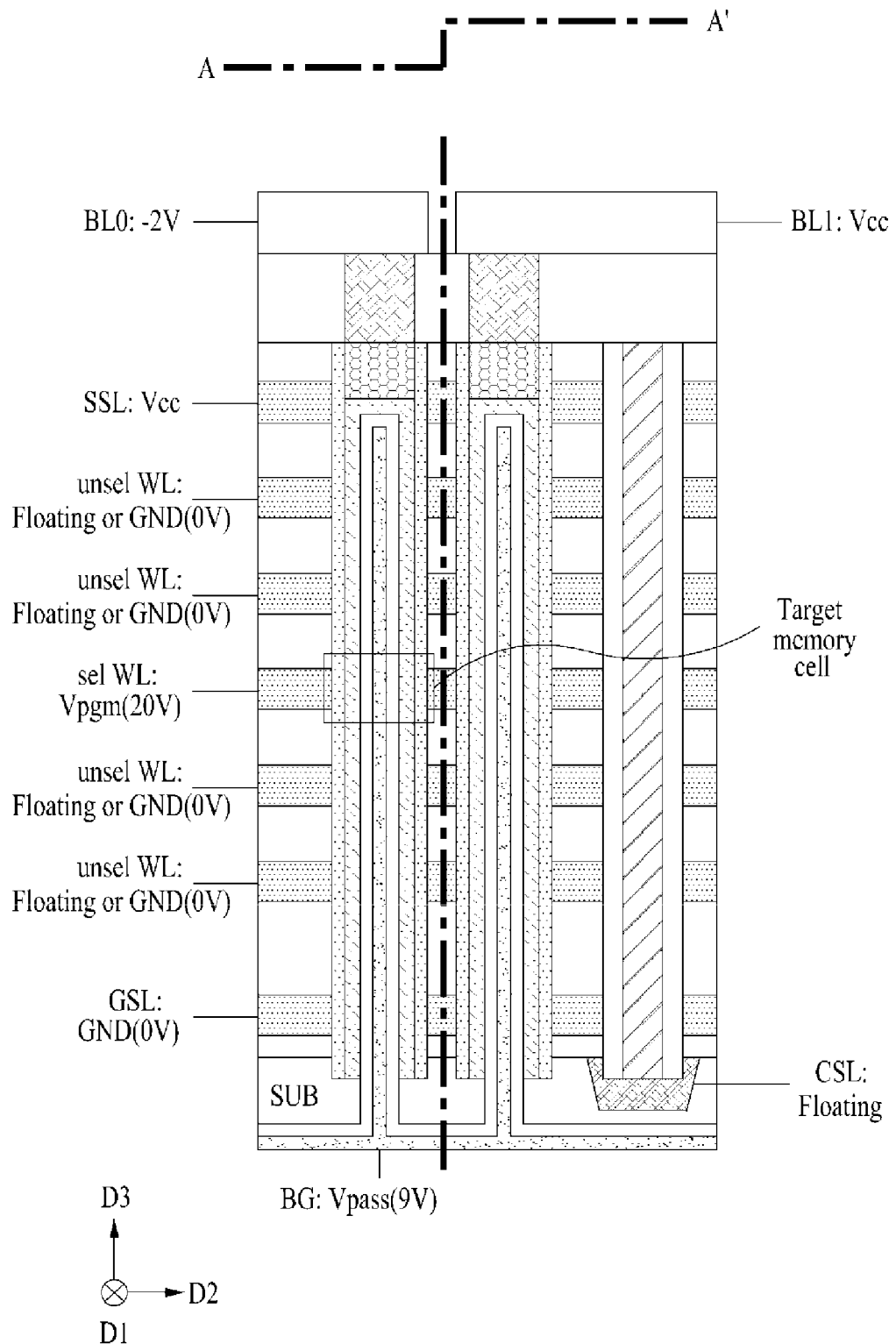
FIG. 13 is a cross-sectional view illustrating a structure of a three-dimensional flash memory illustrated in FIG. 10 to describe a program operation method illustrated in FIG. 11.

FIG. 11 is a flowchart illustrating a program operation method of a three-dimensional flash memory illustrated in FIGS. 9 and 10, FIG. 12 is a cross-sectional view illustrating a structure of a three-dimensional flash memory illustrated in FIG. 9 to describe a program operation method illustrated in FIG. 11, and FIG. 13 is a cross-sectional view illustrating a structure of a three-dimensional flash memory illustrated in FIG. 10 to describe a program operation method illustrated in FIG. 11. Below, the description will be given under the condition that a program operation method is performed in the three-dimensional flash memory with the structure described with reference to FIGS. 2 and 8 to 10. Also, below, a "selected cell string sel CSTR" means a cell string including a target memory cell targeted for the program operation from among the cell strings CSTR, and an "unselected cell string unsel CSTR" means a cell string not including the target memory cell from among the cell strings CSTR. Likewise, a "selected word line sel WL" means a word line corresponding to the target memory cell from among the word lines WL0 to WLn, and an "unselected word line unsel WL" means word lines not corresponding to the target memory cell from among the word lines WL0 to WLn (i.e., the remaining word lines other than a selected word line). Herein, the word lines WL0 to WLn may correspond to the second gate electrodes EL2 illustrated in FIGS. 2 and 8 to 10, and the string selection line SSL may correspond to the third gate electrode EL3 illustrated in FIGS. 2 and 8 to 10.

Referring to drawing, in operation S1110, the three-dimensional flash memory may apply a voltage of a negative value to a bit line sel BL0 of the selected cell string sel CSTR corresponding to the target memory cell targeted for the program operation from among the cell strings CSTR. In this case, the voltage of the negative value may be appropriately determined based on the program voltage Vpgm to be applied to the selected word line sel WL to be described later such that a potential difference between the selected word line sel WL and the bit line sel BL0 of the selected cell string sel CSTR is 20 V or higher. For example, when the program voltage Vpgm is 20 V, the voltage of the negative value may be −2 V.

Although not illustrated separately in drawing, in the program operation, the three-dimensional flash memory may be configured such that the voltage of the negative value is applied to the bit line sel BL0 of the selected cell string sel CSTR in operation S1110. For example, in addition to the structure described with reference to FIGS. 1 and 8 to 10, the three-dimensional flash memory may further include a circuit capable of generating the voltage of the negative value, and the circuit may have a structure in which the circuit is electrically connected to the bit line BL of the cell strings CSTR.

Also, the voltage of the negative value may be generated by using an existing circuit instead of being generated through a circuit provided only for the program operation. In detail, the voltage of the negative value applied to the bit line sel BL0 of the selected cell string sel CSTR in operation S1110 may be generated from a circuit that generates a voltage of a negative value to be used when the three-dimensional flash memory performs any other operation (e.g., a read operation) other than the program operation. That is, in operation S1110, the three-dimensional flash memory may apply the voltage of the negative value, which is generated from the circuit generating the voltage of the negative value to be used when the three-dimensional flash memory performs any other operation other than the program operation, to the bit line sel BL0 of the selected cell string sel CSTR.

In operation S1120, the three-dimensional flash memory may apply the program voltage Vpgm (e.g., 20 V) to the selected word line sel WL corresponding to the target memory cell from among word lines.

The above scheme of the present disclosure, in which the voltage of the negative value is applied to the bit line sel BL0 of the selected cell string sel CSTR, may further improve a program speed compared to an existing scheme in which a ground voltage is applied to the bit line sel BL0 of the selected cell string sel CSTR. The reason is as follows. In each of the scheme of the present disclosure (i.e., a scheme in which the voltage of the negative value, that is, −2 V is applied to the bit line sel BL0 of the selected cell string sel CSTR and the program voltage of 20 V is applied to the selected word line sel WL) and the existing scheme (i.e., a scheme in which a ground voltage of 0 V is applied to the bit line sel BL0 of the selected cell string sel CSTR and the program voltage of 22 V is applied to the selected word line sel WL), even though a potential difference between the selected word line sel WL and the bit line sel BL of the selected cell string sel CSTR is identical, the potential difference (i.e., a voltage between the selected word line sel WL and the bit line sel BL0 of the selected cell string sel CSTR) corresponding to the scheme of the present disclosure is directly transferred to the vertical channel pattern VCP, while the potential difference (i.e., a voltage between the selected word line sel WL and the bit line sel BL0 of the selected cell string sel CSTR) corresponding to the existing scheme is indirectly transferred to the vertical channel pattern VCP through the data storage pattern DSP.

As such, the existing scheme in which 22 V being the voltage between the selected word line sel WL and the bit line sel BL0 of the selected cell string sel CSTR is indirectly transferred to the vertical channel pattern VCP through the data storage pattern DSP may cause the decrease in the program speed due to the coupling, and the scheme of the present disclosure, in which 22 V being the voltage between the selected word line sel WL and the bit line sel BL0 of the selected cell string sel CSTR is directly transferred to the vertical channel pattern VCP, may prevent the coupling and thus may improve the program speed.

Accordingly, operation S1110 may be characterized in that the voltage of the negative value is applied to the bit line sel BL of the selected cell string sel CSTR such that the voltage between the selected word line sel WL and the bit line sel BL0 of the selected cell string sel CSTR is directly transferred to the vertical channel pattern VCP included in the selected cell string sel CSTR.

In operation S1130, the three-dimensional flash memory may perform the program operation on the target memory cell by forming a channel in the vertical channel pattern VCP included in the selected cell string sel CSTR in response to that the voltage of the negative value is applied to the bit line sel BL of the selected cell string sel CSTR and the program voltage is applied to the selected word line sel WL.

Meanwhile, with regard to the unselected cell string unsel CSTR, the three-dimensional flash memory may boost the unselected cell string unsel CSTR such that the program operation is prevented from being performed with respect to memory cells included in the unselected cell string unsel CSTR. In detail, the three-dimensional flash memory may apply a power supply voltage Vcc to a bit line unsel BL1 of the unselected cell string unsel CSTR such that the unselected cell string unsel CSTR has a potential boosted by the power supply voltage applied to the bit line unsel BL1 and the program voltage applied to the selected word line sel WL. Accordingly, the memory cells included in the unselected cell string unsel CSTR may be prevented from being programmed.

Below, the program operation method including operation S1110 to operation S1130 will be described for each of the case where the program operation method is performed in the three-dimensional flash memory with the structure of FIG. 9 and the case where the program operation method is performed in the three-dimensional flash memory with the structure of FIG. 10.

Referring to FIG. 10, after performing operation S1110, the three-dimensional flash memory may perform operation S1120 and may simultaneously apply a pass voltage Vpass (e.g., 9 V) to each of the remaining unselected word lines unsel WL other than the selected word line sel WL among the word lines, and the pass voltage Vpass may mean a voltage higher than a threshold voltage of a memory transistor of a program state and lower than the program voltage Vpgm. In this case, the three-dimensional flash memory may apply the power supply voltage Vcc (hereinafter, a power supply voltage meaning a voltage higher than a threshold voltage of the string selection line SSL and lower than the program voltage Vpgm (e.g., 20 V) applied to the selected word line sel WL) to the string selection line SSL, may apply a ground voltage GND (e.g., 0 V) to the ground selection line GSL, and may flow the common source lines CSL.

Accordingly, because there is a little potential difference between the selected cell string sel CSTR and the unselected word lines unsel WL, memory cells corresponding to the unselected word lines unsel WL from among the memory cells included in the selected cell string sel CSTR may not be programmed, and only the target memory cell may be programmed as described in operation S1130.

Referring to FIG. 13 in which the structure including a back gate is illustrated, after performing operation S1110, the three-dimensional flash memory may perform operation S1120, and simultaneously, the three-dimensional flash memory may float the remaining unselected word lines unsel WL other than the selected word line sel WL from among the word lines and may apply the pass voltage Vpass (e.g., 9 V) (hereinafter, a pass voltage meaning a voltage higher than a threshold voltage of a memory transistor of a program state and lower than the program voltage Vpgm) to the back gate BG. The three-dimensional flash memory may apply a ground voltage (e.g., 0 V) to each of the unselected word lines unsel WL instead of floating the unselected word lines unsel WL. In this case, the three-dimensional flash memory may apply the power supply voltage Vcc (hereinafter, a power supply voltage meaning a voltage higher than a threshold voltage of the string selection line SSL and lower than the program voltage Vpgm (e.g., 20 V) applied to the selected word line sel WL) to the string selection line SSL, may apply the ground voltage GND (e.g., 0 V) to the ground selection line GSL, and may flow the common source lines CSL.

Accordingly, because there is a little potential difference does not exist between the selected cell string sel CSTR and the unselected word lines unsel WL, memory cells corresponding to the unselected word lines unsel WL from among the memory cells included in the selected cell string sel CSTR may not be programmed, and only the target memory cell may be programmed as described in operation S1130.

As illustrated in FIG. 13, in the program operation, instead of applying the pass voltage to each of the unselected word lines unsel WL, the three-dimensional flash memory including the back gate BG may float the unselected word lines unsel WL or may apply a ground voltage to each of the unselected word lines unsel WL, and thus, the three-dimensional flash memory may prevent a disturb phenomenon due to the pass voltage applied to each of the unselected word lines unsel WL.

Because the program operation method described above uses the program voltage Vpgm that is relatively low compared to the existing scheme, a burden that is imposed on the circuit may decrease, and the reliability of memory may be improved.

Figure 14:
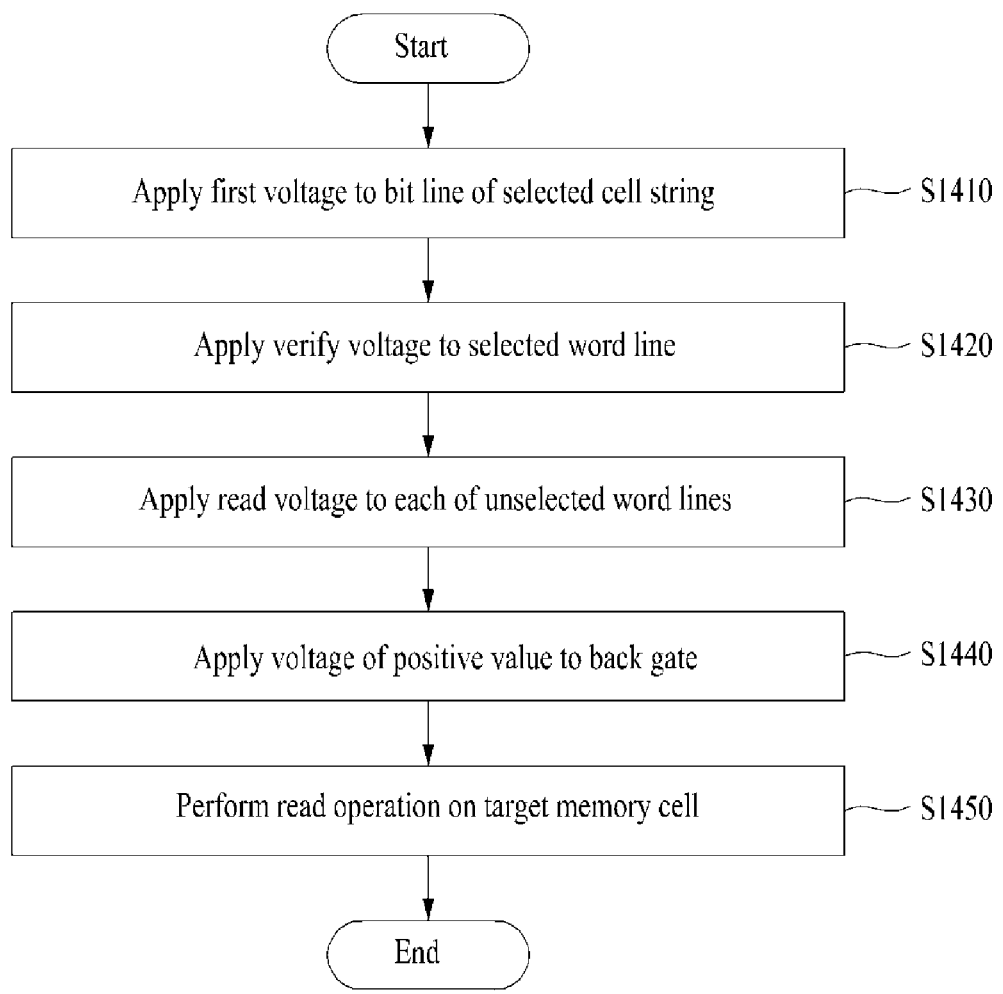
FIG. 14 is a flowchart illustrating a read operation method of a three-dimensional flash memory illustrated in FIG. 10.
Figure 15:
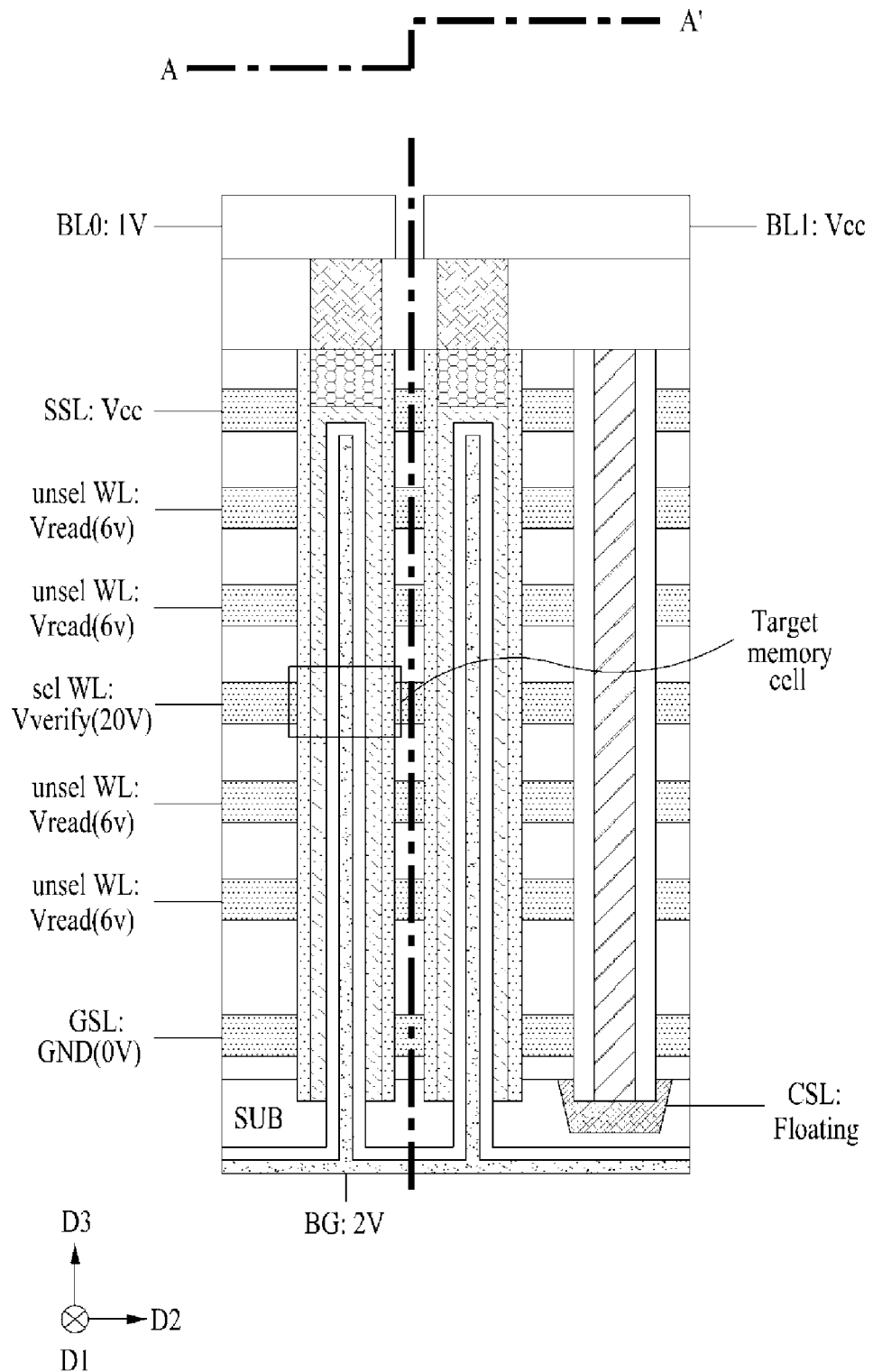
FIG. 15 is a cross-sectional view illustrating a structure of a three-dimensional flash memory illustrated in FIG. 10 to describe a read operation method illustrated in FIG. 14.

FIG. 14 is a flowchart illustrating a read operation method of a three-dimensional flash memory illustrated in FIG. 10, and FIG. 15 is a cross-sectional view illustrating a structure of a three-dimensional flash memory illustrated in FIG. 10 to describe a read operation method illustrated in FIG. 14.

Below, the description will be given under the condition that a read operation method is performed in the three-dimensional flash memory with the structure described with reference to FIG. 10. Also, below, a "selected cell string sel CSTR" means a cell string including a target memory cell targeted for the read operation from among the cell strings CSTR, and an "unselected cell string unsel CSTR" means a cell string not including the target memory cell from among the cell strings CSTR. Likewise, a "selected word line sel WL" means a word line corresponding to the target memory cell from among the word lines WL0 to WLn, and an "unselected word line unsel WL" means word lines not corresponding to the target memory cell from among the word lines WL0 to WLn (i.e., the remaining word lines other than a selected word line). Herein, the word lines WL0 to WLn may correspond to the second gate electrodes EL2 illustrated in FIGS. 2 and 8 to 10, and the string selection line SSL may correspond to the third gate electrode EL3 illustrated in FIGS. 2 and 8 to 10.

Referring to drawing, in operation S1410, the three-dimensional flash memory may apply a first voltage V1 (e.g., 1 V) higher than the ground voltage GND (e.g., 0V) to the bit line sel BL0 of the selected cell string sel CSTR corresponding to the target memory cell targeted for the read operation from among the cell strings CSTR.

In operation S1420, the three-dimensional flash memory may apply a verify voltage Vverify (e.g., 20 V) to the selected word line sel WL corresponding to the target memory cell from among word lines.

In operation S1430, the three-dimensional flash memory may apply a read voltage Vread (e.g., 6 V) (a read voltage being a voltage higher than threshold voltages of the ground and string selection transistors GST and SST and a threshold voltage of a memory transistor of a program state and lower than the program voltage Vpgm and being the pass voltage Vpass described above) to each of the remaining unselected word lines unsel WL other than the selected word line sel WL among the word lines.

In operation S1440, the three-dimensional flash memory may apply a voltage of a positive value (e.g., 2 V) to the back gate BG. The voltage of the positive value may be applied to the back gate BG for the purpose of improving a cell current in the three-dimensional flash memory.

Accordingly, in operation S1450, the three-dimensional flash memory may perform the read operation on the target memory cell in response to that the first voltage is applied to the bit line sel BL0 of the selected cell string sel CSTR, the verify voltage is applied to the selected word line sel WL, the read voltage is applied to each of the unselected word lines, and the voltage of the positive value is applied to the back gate BG.

The read operation method described above may be performed such that the voltage of the positive value is applied to the back gate BG in the read operation after the program operation, and thus, a cell current may be improved compared to the existing scheme.

Figure 16:
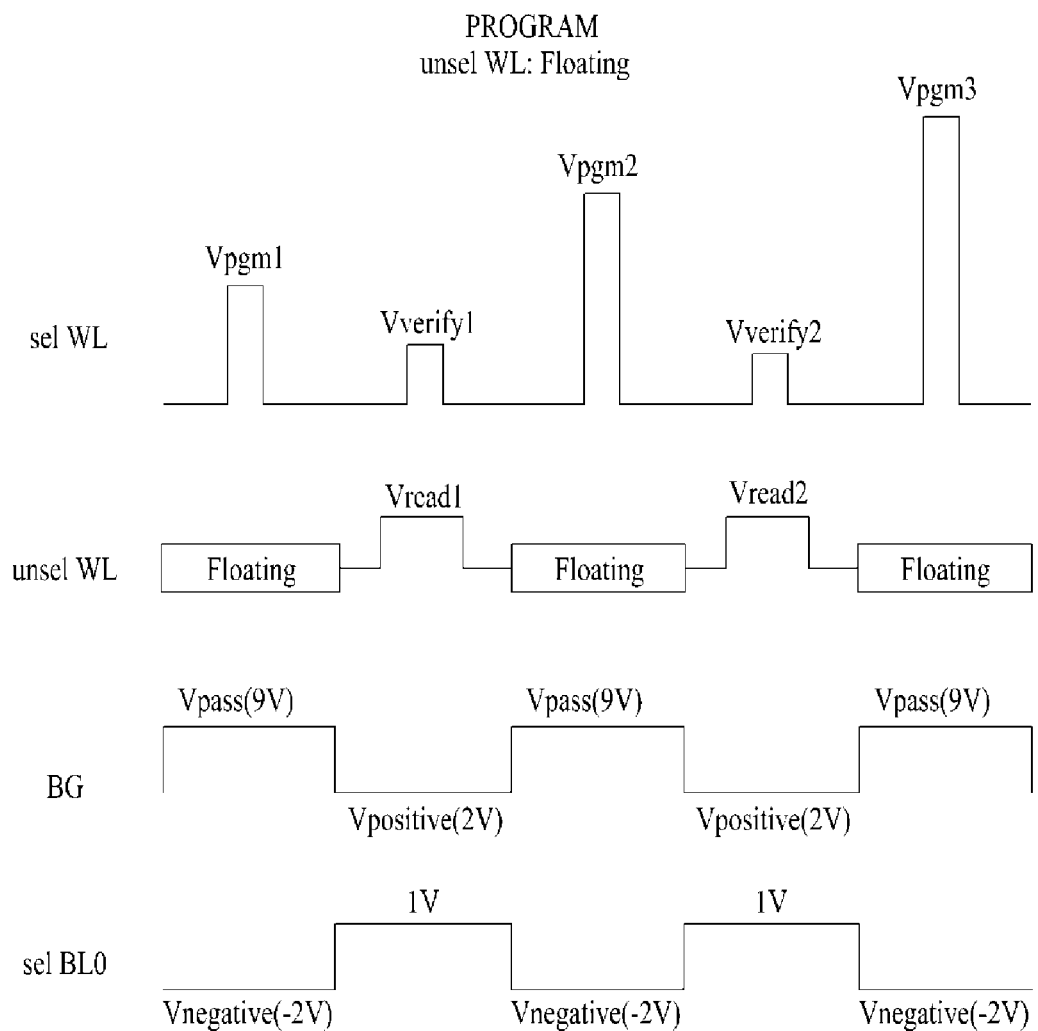
FIGS. 16 and 17 are diagrams illustrating pulses of voltages applied in a program operation and a read operation that a three-dimensional flash memory illustrated in FIG. 10 performs.
Figure 17:
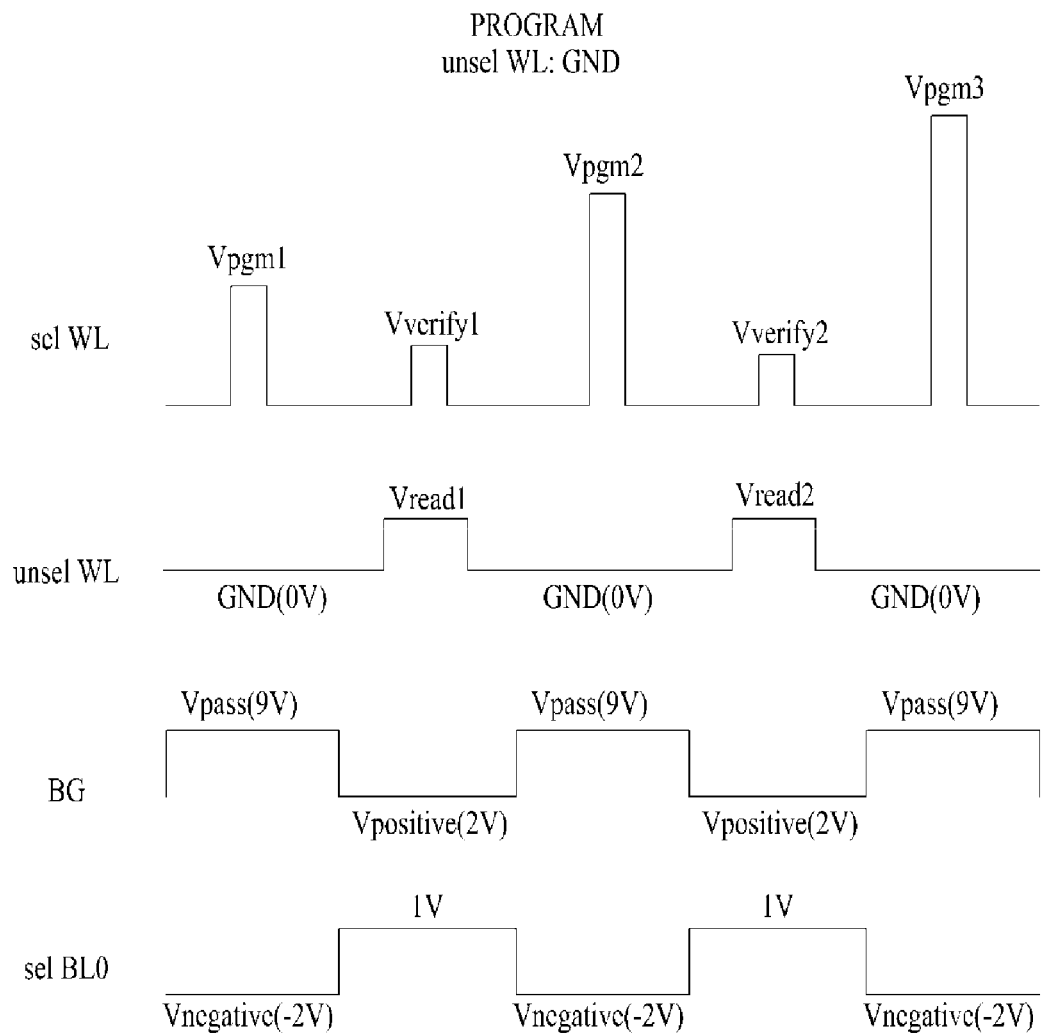

FIGS. 16 and 17 are diagrams illustrating pulses of voltages applied in a program operation and a read operation that a three-dimensional flash memory illustrated in FIG. 10 performs.

Pulses of voltages applied in the program operation and the read operation that a three-dimensional flash memory including the back gate BG, which is described above with reference to FIGS. 13 and 14, performs may be as illustrated in FIG. 16 or 17.

Figure 18:
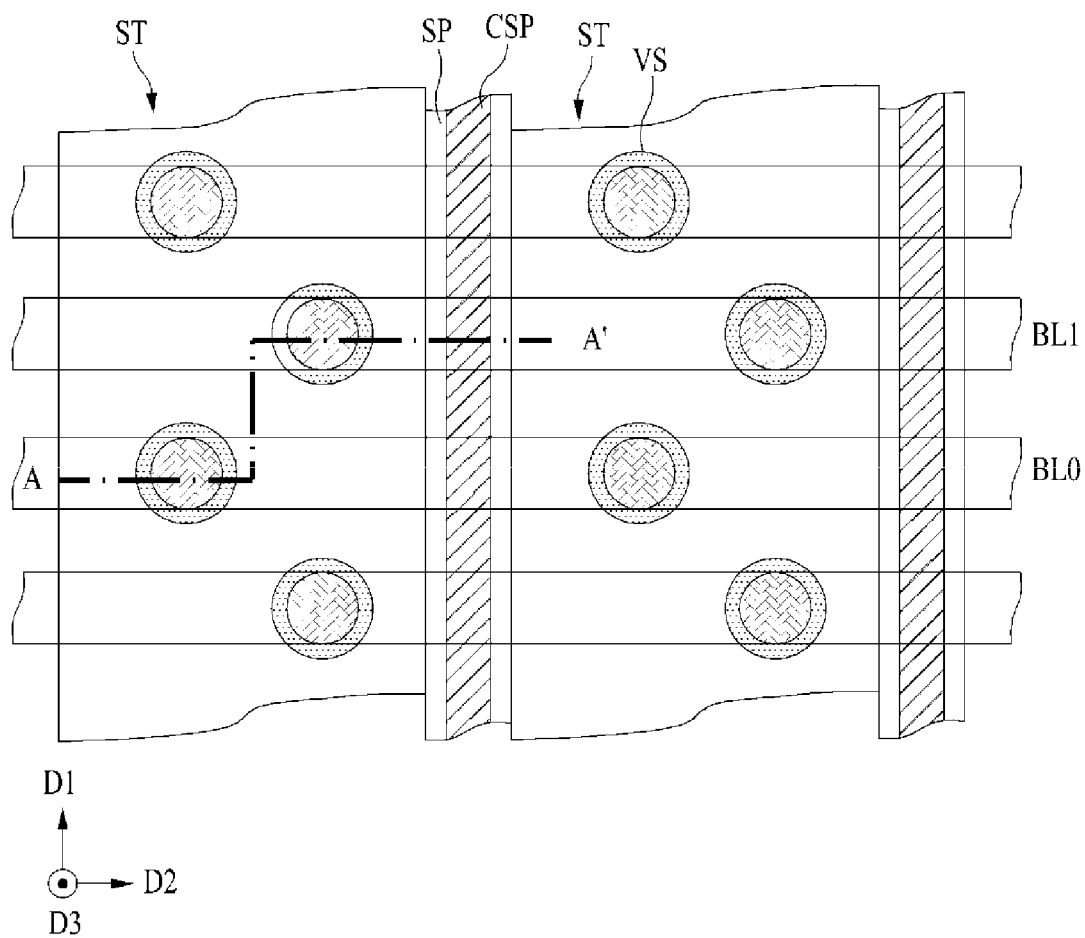
FIG. 18 is a plan view illustrating a three-dimensional flash memory according to embodiment.
Figure 19:
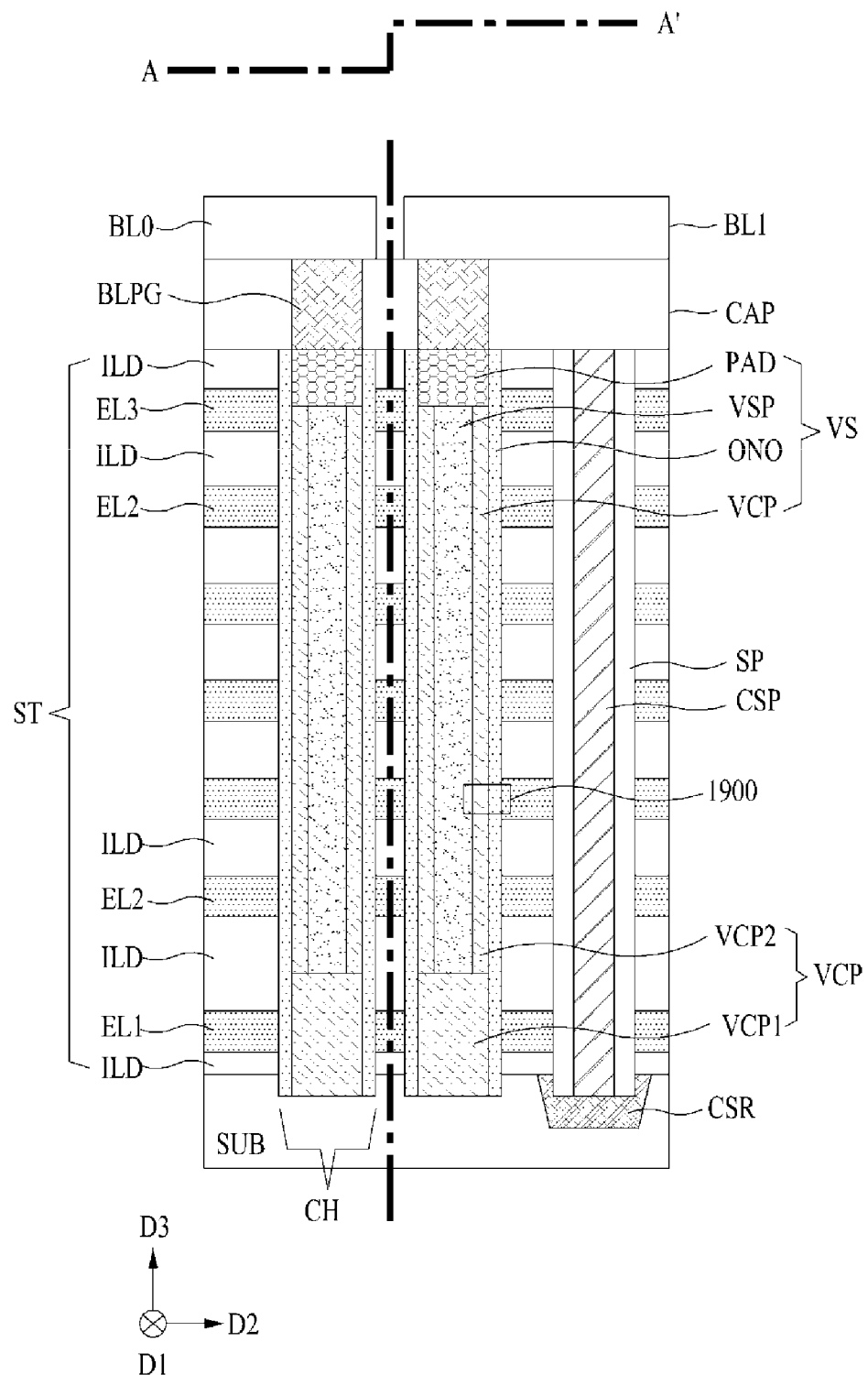
FIG. 19 is a cross-sectional view illustrating a structure of a three-dimensional flash memory according to an embodiment and corresponds to the cross section taken along line A-A' of FIG. 18.
Figure 20:
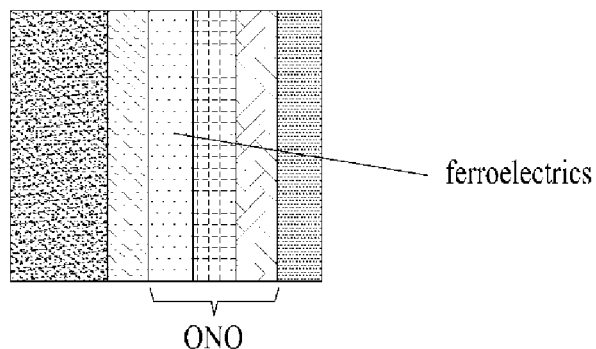
FIG. 20 is an enlarged cross-sectional view illustrating region 1900 in a three-dimensional flash memory illustrated in FIG. 19.
Figure 20:
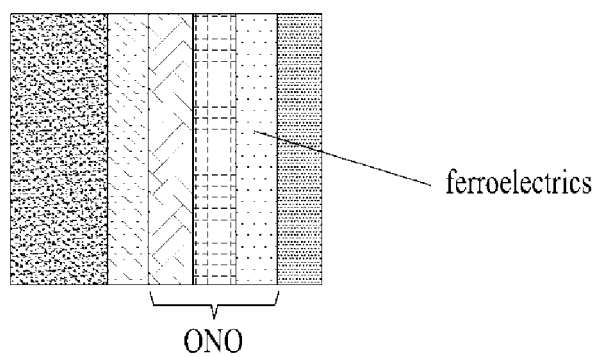
Figure 20:
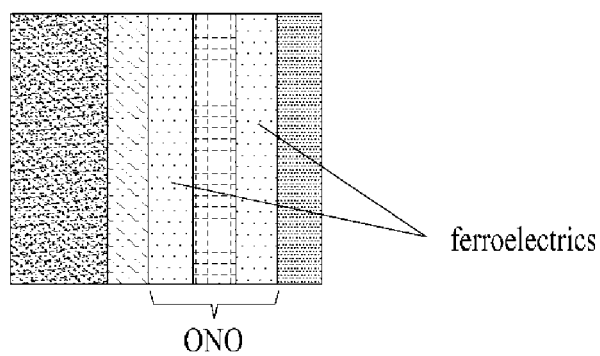

FIG. 18 is a plan view illustrating a three-dimensional flash memory according to embodiment. FIG. 19 is a cross-sectional view illustrating a structure of a three-dimensional flash memory according to an embodiment and corresponds to the cross section taken along line A-A' of FIG. 18. FIG. 20 is an enlarged cross-sectional view illustrating region 1900 in a three-dimensional flash memory illustrated in FIG. 19, FIGS. 21A to 21C are diagrams for describing a two-step program operation of a three-dimensional flash memory according to an embodiment, and FIGS. 22A and 22B are diagrams for describing a two-step erase operation of a three-dimensional flash memory according to an embodiment.

Figure 22A:
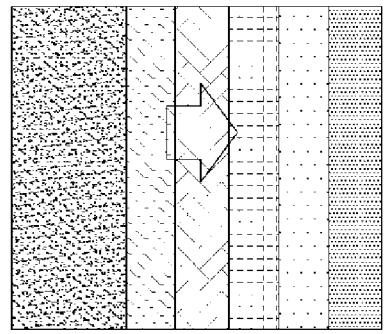
FIGS. 22A and 22B are diagrams for describing a two-step erase operation of a three-dimensional flash memory according to an embodiment.
Figure 22A:
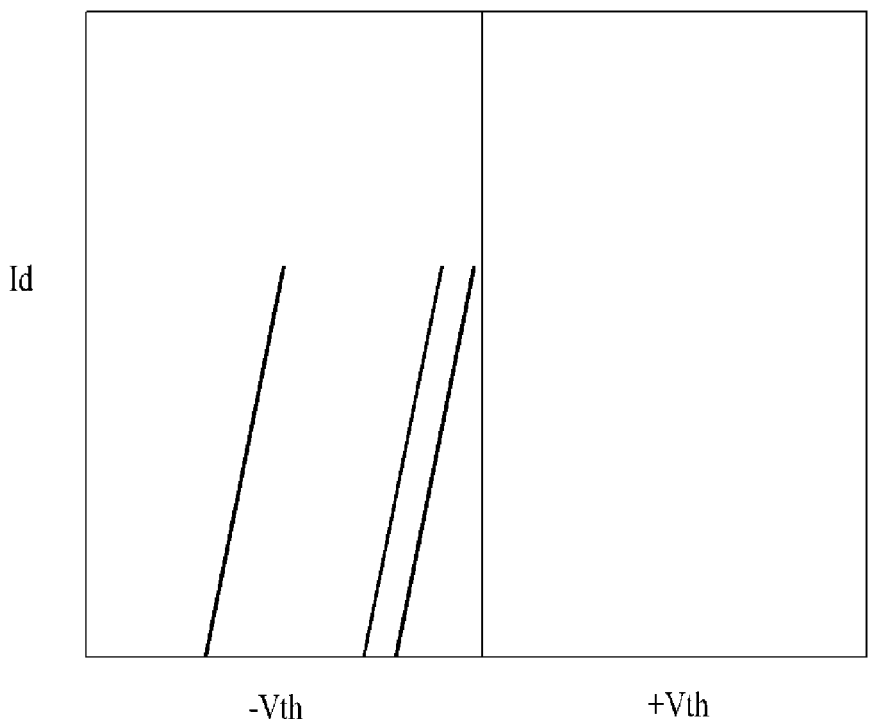
Figure 22B:
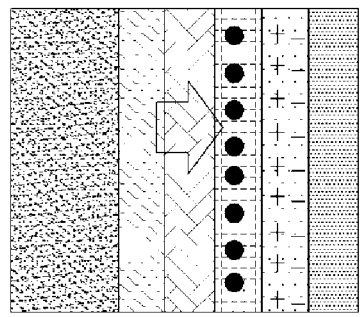
Figure 22B:
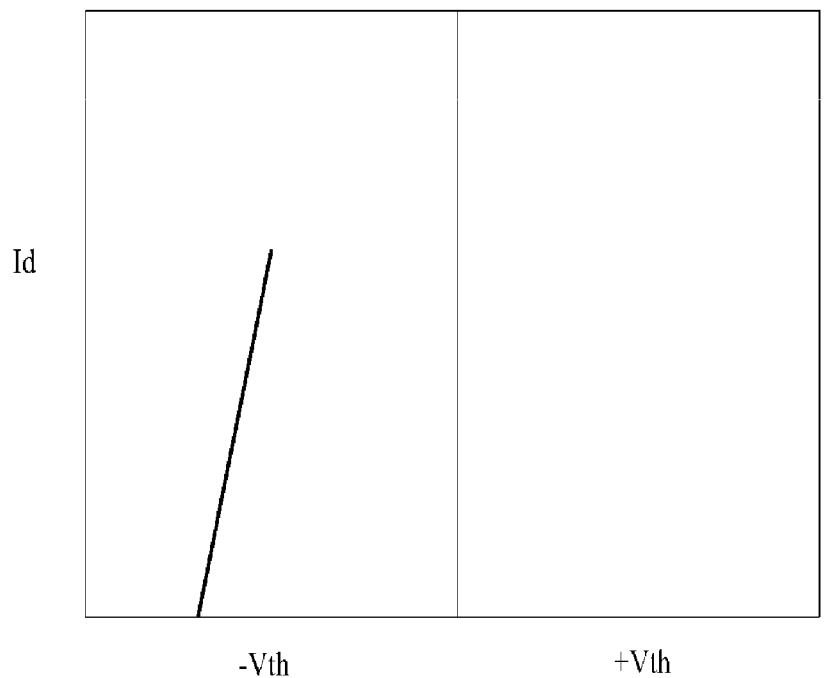

Referring to FIGS. 18 and 22B, the substrate SUB may be a semiconductor substrate such as a silicon substrate, a silicon-germanium substrate, a germanium substrate, or a single crystal epitaxial layer grown on a monocrystalline silicon substrate. The first conductive-type impurities (e.g., P-type impurities) may be doped in the substrate SUB.

The stacked structures ST may be disposed on the substrate SUB. The stacked structures ST may be arranged along the second direction D2 in the two-dimensional structure in a state of being formed to extend in the first direction D1. Also, the stacked structures ST may be spaced from each other in the second direction D2.

Each of the stacked structures ST may include the gate electrodes EL1, EL2, and EL3 and the interlayer insulating layers ILD alternately stacked in the vertical direction (e.g., the third direction D3) perpendicular to an upper surface of the substrate SUB. The stacked structures ST may have substantially a flat (or even) upper surface. That is, the upper surface of the stacked structures ST may be parallel to the upper surface of the substrate SUB. Below, the vertical direction means the third direction D3 or a direction facing away from the third direction D3.

Returning to FIG. 2, each of the gate electrodes EL1, EL2, and EL3 may be one of the erase control line ECL, the ground selection lines GSL0, GSL1, and GSL2, the word lines WL0 to WLn and DWL, the first string selection lines SSL1-1, SSL1-2, and SSL1-3, and the second string selection lines SSL2-1, SSL2-2, and SSL2-3 sequentially stacked on the substrate SUB.

Each of the gate electrodes EL1, EL2, and EL3 may have the same thickness in the third direction D3 in a state of being formed to extend in the first direction D1. Below, the thickness means a thickness in the third direction D3. Each of the gate electrodes EL1, EL2, and EL3 may be formed of a conductive material. For example, each of the gate electrodes EL1, EL2, and EL3 may include at least one selected from the group of doped semiconductor (e.g., doped silicon, etc.), metal (e.g., tungsten (W), copper (Cu), aluminum (Al), titanium (Ti), tantalum (Ta), molybdenum (Mo), ruthenium (Ru), gold (Au), etc.), or conductive metal nitride (e.g., titanium nitride, tantalum nitride, etc.). Each of the gate electrodes EL1, EL2, and EL3 may include at least one of all metal materials capable of being formed by ALD, in addition to the above metal materials.

In detail, the gate electrodes EL1, EL2, and EL3 may include the first gate electrode EL1 being the lowermost, the third gate electrode EL3 being the uppermost, and the plurality of second gate electrodes EL2 between the first gate electrode EL1 and the third gate electrode EL3. Each of the first gate electrode EL1 and the third gate electrode EL3 is illustrated and described in the singular form, but this is provided as an example without limitation thereto; if necessary, each of the first gate electrode EL1 and the third gate electrode EL3 may be provided in plurality. The first gate electrode EL1 may be one of the ground selection lines GSL0, GSL1, and GLS2 illustrated in FIG. 2. The second gate electrode EL2 may correspond to one of the word lines WL0 to WLn and DWL illustrated in FIG. 2. The third gate electrode EL3 may correspond to one of the first string selection lines SSL1-1, SSL1-2, and SSL1-3 of FIG. 2 illustrated in FIG. 2 or one of the second string selection lines SSL2-1, SSL2-2, and SSL2-3 illustrated in FIG. 2.

Although not illustrated, end portions of the stacked structures ST may have a stepwise structure along the first direction D1. In detail, in the gate electrodes EL1, EL2, and EL3 of the stacked structures ST, a length in the first direction D1 may decrease as a distance from the substrate SUB increases. The length of the third gate electrode EL3 in the first direction D1 may be the smallest, and the separation distance of the third gate electrode EL3 from the substrate SUB in the third direction D3 may be the greatest. The length of the first gate electrode EL1 in the first direction D1 may be the greatest, and the separation distance of the first gate electrode EL1 from the substrate SUB in the third direction D3 may be the smallest. By the stepwise structure, the thickness of each of the stacked structures ST may decrease as a distance from the outer-most one of vertical channel structures VS to be described later increases; in a plan view, the sidewalls of the gate electrodes EL1, EL2, and EL3 may be spaced from each other along the first direction D1 at given intervals.

The interlayer insulating layers ILD may have different thicknesses. As an example, the uppermost one and the lowermost one among the interlayer insulating layers ILD may have a thickness smaller than that of the remaining interlayer insulating layers ILD. However, this is provided as an example without limitation thereto. For example, the interlayer insulating layers ILD may have different thicknesses depending on a characteristic of a semiconductor device, or all the interlayer insulating layers ILD may be set to have the same thickness. The interlayer insulating layers ILD may be formed of an insulating material for the purpose of insulation between the gate electrodes EL1, EL2, and EL3. As an example, the interlayer insulating layers ILD may be formed of silicon oxide.

The above description is given as each of the stacked structures ST includes the interlayer insulating layers ILD, but each of the stacked structures ST may include air gaps instead of the interlayer insulating layers ILD. In this case, like the interlayer insulating layers ILD, the air gaps may be alternately disposed with the gate electrodes EL1, EL2, and EL3 such that the insulation between the gate electrodes EL1, EL2, and EL3 is possible.

The plurality of channel holes CH penetrating the stacked structures ST and a portion of the substrate SUB may be provided. The vertical channel structures VS may be provided in the channel holes CH. The vertical channel structures VS that are the plurality of cell strings CSTR illustrated in FIG. 2 may be formed to extend in the third direction D3 in a state of being connected to the substrate SUB. That the vertical channel structures VS are connected to the substrate SUB may mean that a portion of each of the vertical channel structures VS is buried inside the substrate SUB, but the present disclosure is not limited thereto. For example, the vertical channel structures VS may be formed such that lower surfaces of the vertical channel structures VS are in contact with the upper surface of the substrate SUB. When the portion of each of the vertical channel structures VS is buried inside the substrate SUB, the lower surfaces of the vertical channel structures VS may be located to be lower in level than the upper surface of the substrate SUB.

Columns of the vertical channel structures VS penetrating one of the stacked structures ST may be provided in plurality. For example, as illustrated in FIG. 2, columns of two vertical channel structures VS may penetrate one of the stacked structures ST. However, the present disclosure is not limited thereto. For example, columns of three or more vertical channel structures VS may penetrate one of the stacked structures ST. In a pair of adjacent columns, the vertical channel structures VS corresponding to one column may be shifted in the first direction D1 from the vertical channel structures VS corresponding to the other column adjacent thereto. In a plan view, the vertical channel structures VS may be arranged in a zig-zag shape along the first direction D1. However, the present disclosure is not limited thereto. For example, the vertical channel structures VS may form an arrangement in which the vertical channel structures VS are disposed side by side in a row and a column.

Each of the vertical channel structures VS may be formed to extend from the substrate SUB in the third direction D3. An example in which each of the vertical channel structures VS has a pillar shape where an upper end and a lower end have the same width is illustrated in drawing, but the present disclosure is not limited thereto. For example, each of the vertical channel structures VS may have a shape in which widths in the first direction D1 and the second direction D2 increase as it goes toward the third direction D3. This is caused due to the limitation that when the channel holes CH are etched, the widths in the first direction D1 and the second direction D2 decrease as it goes toward a direction facing away from the third direction D3. The upper surface of each of the vertical channel structures VS may have a circular shape, an oval shape, a square shape, or a bar shape.

Each of the vertical channel structures VS may include an ONO (Tunneling Oxide-Charge Trap Nitride-Blocking Oxide), the vertical channel pattern VCP, the vertical semiconductor pattern VSP, and the conductive pad "PAD". In each of the vertical channel structures VS, the lower end of the ONO may be in the shape of an opened pipe or a macaroni, and the lower end of the vertical channel pattern VCP may be in the shape of a closed pipe or a macaroni. The vertical semiconductor pattern VSP may fill a space surrounded by the vertical channel pattern VCP and the conductive pad "PAD".

In a state of covering an inner sidewall of each of the channel holes CH, the ONO may contact the vertical channel pattern VCP inwardly and may contact the sidewalls of the gate electrodes EL1, EL2, and EL3 outwardly. As such, regions of the ONO, which correspond to the second gate electrodes EL2, may form memory cells, in which the memory operation (e.g., a program operation, a read operation, or an erase operation) is performed by voltages applied through the second gate electrodes EL2, together with regions of the vertical channel pattern VCP, which correspond to the second gate electrodes EL2. The memory cells correspond to the memory cell transistors MCT illustrated in FIG. 2.

In this case, at least one of a tunneling oxide layer or a blocking oxide layer of the ONO may be formed of a ferroelectric material as illustrated in FIG. 20. For example, as illustrated in to CASE 1 of FIG. 20, the tunneling oxide layer may be formed of a ferroelectric material; as illustrated in to CASE 2, the blocking oxide layer may be formed of a ferroelectric material; or, as illustrated in to CASE 3, both the tunneling oxide layer and the blocking oxide layer may be formed of a ferroelectric material. In this case, the remaining layer, which is not formed of a ferroelectric material, from among the tunneling oxide layer or the blocking oxide layer may be formed of a material that is the same as a material of a conventional tunneling oxide layer or a conventional blocking oxide layer.

Below, the ferroelectric material may include at least one of $HfO_x$ with an orthorhombic crystal structure, $HfO_x$ doped with at least one material of Al, Zr, or Si, PZT($Pb(Zr, Ti)O_3$), PTO($PbTiO_3$), SBT($SrBi_2Ti_2O_3$), BLT($Bi(La, Ti)O_3$), PLZT ($Pb(La, Zr)TiO_3$), BST($Bi(Sr, Ti)O_3$), $BaTiO_3$ (barium titanate), P(VDF-TrFE), PVDF, $AlO_x$, $ZnO_x$, $TiO_x$, $TaO_x$, or $InO_x$. The ferroelectric material is not limited to the above example and may include various materials with a hysteresis characteristic.

As such, the charge trap nitride layer of the ONO may be used as a primary data storage element that traps charges or holes by a voltage applied through the second gate electrode EL2, and at least one layer, which is formed of a ferroelectric material, from among the tunneling oxide layer or the blocking oxide layer of the ONO may be used as a secondary data storage element that maintains a state of charges (e.g., a polarization state of charges) by a voltage applied through the second gate electrode EL2.

That is, the three-dimensional flash memory may indicate a multi-bit (or multi-level) data value through a change in the amount of trapped charges or holes and a state change in charges, by simultaneously using, as a data storage element, both the charge trap nitride layer of the ONO and at least one layer, which is formed of a ferroelectric material, from among the tunneling oxide layer or the blocking oxide layer of the ONO. This will be described in detail below.

The vertical channel pattern VCP may cover an inner sidewall of the ONO. The vertical channel pattern VCP may include the first portion VCP1 and the second portion VCP2 on the first portion VCP1.

The first portion VCP1 of the vertical channel pattern VCP may be provided on a lower portion of each of the channel holes CH and may contact the substrate SUB. The first portion VCP1 of the vertical channel pattern VCP may be used for the purpose of blocking, suppressing, or minimizing a leakage current in each of the vertical channel structures VS and/or for the purpose of an epitaxial pattern. A thickness of the first portion VCP1 of the vertical channel pattern VCP may be, for example, greater than the thickness of the first gate electrode EL1. A sidewall of the first portion VCP1 of the vertical channel pattern VCP may be surrounded by the ONO. An upper surface of the first portion VCP1 of the vertical channel pattern VCP may be located to be higher in level than an upper surface of the first gate electrode EL1. In detail, the upper surface of the first portion VCP1 of the vertical channel pattern VCP may be located between the upper surface of the first gate electrode EL1 and a lower surface of the lowermost one of the second gate electrodes EL2. A lower surface of the first portion VCP1 of the vertical channel pattern VCP may be located to be lower in level than the uppermost surface of the substrate SUB (i.e., a lower surface of the lowermost one of the interlayer insulating layers ILD). A portion of the first portion VCP1 of the vertical channel pattern VCP may overlap the first gate electrode EL1 in a horizontal direction. Below, the horizontal direction means an arbitrary direction extending on a plane parallel to the first direction D1 and the second direction D2.

The second portion VCP2 of the vertical channel pattern VCP may extend from the upper surface of the first portion VCP1 in the third direction D3. The second portion VCP2 of the vertical channel pattern VCP may be provided between the ONO and the vertical semiconductor pattern VSP and may correspond to the second gate electrodes EL2. As such, as described above, the second portion VCP2 of the vertical channel pattern VCP may form memory cells together with the regions of the ONO, which correspond to the second gate electrodes EL2.

An upper surface of the second portion VCP2 of the vertical channel pattern VCP may be substantially coplanar with an upper surface of the vertical channel pattern VCP. The upper surface of the second portion VCP2 of the vertical channel pattern VCP may be located to be higher in level than an upper surface of the uppermost one of the second gate electrodes EL2. In detail, the upper surface of the second portion VCP2 of the vertical channel pattern VCP may be located between an upper surface and a lower surface of the third gate electrode EL3.

The vertical channel pattern VCP may be formed of monocrystalline silicon or polysilicon such that a channel is formed or boosted by a voltage applied thereto. However, the present disclosure is not limited thereto. For example, the vertical channel pattern VCP may be formed of an oxide semiconductor material capable of blocking, suppressing, or minimizing a leakage current. For example, the vertical channel pattern VCP may be formed of an oxide semiconductor material including at least one of In, Zn, or Ga with an excellent leakage current characteristic, a group 4 semiconductor material, etc. The vertical channel pattern VCP may be formed of, for example, a $ZnO_x$-based material including AZO, ZTO, IZO, ITO, IGZO, or Ag—ZnO. Accordingly, the vertical channel pattern VCP may block, suppress, or minimize a leakage current to the gate electrodes EL1, EL2, and EL3 or the substrate SUB and may improve a transistor characteristic (e.g., a threshold voltage distribution and a speed of the program/read operation) of at least one of the gate electrodes EL1, EL2, and EL3, and thus, an electrical characteristic of the three-dimensional flash memory may be improved.

The vertical semiconductor pattern VSP may be surrounded by the second portion VCP2 of the vertical channel pattern VCP. The upper surface of the vertical semiconductor pattern VSP may contact the conductive pad "PAD", and the lower surface of the vertical semiconductor pattern VSP may contact the first portion VCP1 of the vertical semiconductor pattern VSP. The vertical semiconductor pattern VSP may be spaced from the substrate SUB in the third direction D3. In other words, the vertical semiconductor pattern VSP may be electrically floated from the substrate SUB.

The vertical semiconductor pattern VSP may be formed of a material that helps diffusion of charges or holes in the vertical channel pattern VCP. In detail, the vertical semiconductor pattern VSP may be formed of a material whose charge and hole mobility is excellent. For example, the vertical semiconductor pattern VSP may be formed of a semiconductor material doped with impurities, an intrinsic semiconductor material not doped with impurities, or a polycrystalline semiconductor material. In detail, for example, the vertical semiconductor pattern VSP may be formed of polysilicon doped with impurities of the first conductivity type (e.g., P-type dopants) that is identical to that of the substrate SUB. That is, the vertical semiconductor pattern VSP may make the electrical characteristic of the three-dimensional flash memory better, and thus, the speed of the memory operation may be improved.

Returning to FIG. 2, the vertical channel structures VS may correspond to channels of the erase control transistor ECT, the first and second string selection transistors SST1 and SST2, the ground selection transistor GST, and the memory cell transistors MCT.

The conductive pad "PAD" may be provided on the upper surface of the second portion VCP2 of the vertical channel pattern VCP and the upper surface of the vertical channel pattern VCP. The conductive pad "PAD" may be connected to an upper portion of the vertical channel pattern VCP and an upper portion of the vertical semiconductor pattern VSP. A sidewall of the conductive pad "PAD" may be surrounded by the ONO. An upper surface of the conductive pad "PAD" may be substantially coplanar with the upper surface of each of the stacked structures ST (e.g., an upper surface of the uppermost one of the interlayer insulating layers ILD). A lower surface of the conductive pad "PAD" may be located to be lower in level than the upper surface of the third gate electrode EL3. In detail, the lower surface of the conductive pad "PAD" may be located between the upper surface and the lower surface of the third gate electrode EL3. That is, at least a portion of the conductive pad "PAD" may overlap the third gate electrode EL3 in the horizontal direction.

The conductive pad "PAD" may be formed of impurity-doped semiconductor or a conductive material. For example, the conductive pad "PAD" may be formed of a semiconductor material doped with impurities different from that of the vertical semiconductor pattern VSP (in detail, a semiconductor material doped with impurities of a second conductive type (e.g., N-type) different from the first conductive type (e.g., P-type)).

The conductive pad "PAD" may reduce a contact resistance between the bit line BL to be described later and the vertical channel pattern VCP (or the vertical semiconductor pattern VSP).

A structure in which the vertical channel structures VS include the conductive pad "PAD" is described above, but the present disclosure is not limited thereto. For example, the vertical channel structures VS may not include the conductive pad "PAD" in structure. In this case, as the conductive pad "PAD" is omitted from the vertical channel structures VS, each of the vertical channel pattern VCP and the vertical semiconductor pattern VSP may be formed to extend in the third direction D3 such that the upper surface of each of the vertical channel pattern VCP and the vertical semiconductor pattern VSP is substantially coplanar with the upper surface of each of the stacked structures ST (i.e., the upper surface of the uppermost one of the interlayer insulating layers ILD). Also, in this case, the bit line contact plug BLPG to be described later may directly contact the vertical channel pattern VCP and may be electrically connected thereto, instead of electrically indirectly connected to the vertical channel pattern VCP through the conductive pad "PAD".

Also, an example in which the vertical semiconductor pattern VSP is included in the vertical channel structures VS is described above, but the present disclosure is not limited thereto. For example, the vertical semiconductor pattern VSP may be omitted.

Also, the above description is given as the vertical channel pattern VCP has a structure in which the first portion VCP1 and the second portion VCP2 are included in the vertical channel pattern VCP, but the present disclosure is not limited thereto. For example, the vertical channel pattern VCP may have a structure in which the first portion VCP1 is excluded. For example, the vertical channel pattern VCP may be provided between the vertical channel pattern VCP formed to extend to the substrate SUB and the ONO and may be formed to extend to the substrate SUB such that the contact with the substrate SUB is made. In this case, the lower surface of the vertical channel pattern VCP may be located to be lower in level than the uppermost surface of the substrate SUB (i.e., the lower surface of the lowermost one of the interlayer insulating layers ILD), and the upper surface of the vertical channel pattern VCP may be substantially coplanar with the upper surface of the vertical semiconductor pattern VSP.

The isolation trench TR extending in the first direction D1 may be provided between the stacked structures ST adjacent to each other. The common source region CSR may be provided in the interior of the substrate SUB exposed by the isolation trench TR. The common source region CSR may extend in the first direction D1 in the substrate SUB. The common source region CSR may be formed of a semiconductor material doped with impurities of the second conductive type (e.g., N-type impurities). The common source region CSR may correspond to the common source line CSL of FIG. 2.

The common source plug CSP may be provided in the isolation trench TR. The common source plug CSP may be connected to the common source region CSR. An upper surface of the common source plug CSP may be substantially coplanar with the upper surface of each of the stacked structures ST (i.e., the upper surface of the uppermost one of the interlayer insulating layers ILD). The common source plug CSP may be in the shape of a plate extending in the first direction D1 and the third direction D3. In this case, the common source plug CSP may have a shape in which a width in the second direction D2 increases as it goes toward the third direction D3.

The insulating spaces SP may be interposed between the common source plug CSP and the stacked structures ST. The insulating spacers SP may be provided to face each other between the stacked structures ST adjacent to each other. For example, the insulating spacers SP may be formed of silicon oxide, silicon nitride, silicon oxynitride, or a low-k material with a low dielectric constant.

The capping insulating layer CAP may be provided on the stacked structures ST, the vertical channel structures VS, and the common source plug CSP. The capping insulating layer CAP may cover the upper surface of the uppermost one of the interlayer insulating layers ILD, the upper surface of the conductive pad "PAD", and the upper surface of the common source plug CSP. The capping insulating layer CAP may be formed of an insulating material different from that of the interlayer insulating layers ILD. The bit line contact plug BLPG that is electrically connected to the conductive pad "PAD" may be provided inside the capping insulating layer CAP. The bit line contact plug BLPG may have a shape in which a width in the first direction D1 and a width in the second direction D2 increase as it goes toward the third direction D3.

The bit line BL may be provided on the capping insulating layer CAP and the bit line contact plug BLPG. The bit line BL that corresponds to one of the plurality of bit lines BL0, BL1, and BL2 illustrated in FIG. 2 may be formed of a conductive material and may be formed to extend along the second direction D2. The conductive material of the bit line BL may be the same as the conductive material forming the gate electrodes EL1, EL2, and EL3 described above.

The bit line BL may be electrically connected to the vertical channel structures VS through the bit line contact plug BLPG. Herein, that the bit line BL is connected to the vertical channel structures VS may mean that the bit line BL is connected to the vertical channel pattern VCP included in the vertical channel structures VS.

The three-dimensional flash memory with the above structure may perform the program operation, the read operation, and the erase operation based on a voltage applied to each of the cell strings CSTR, a voltage applied to the string selection line SSL, a voltage applied to each of the word lines WL0 to WLn, a voltage applied to the ground selection line GSL, and a voltage applied to the common source line CSL. For example, based on the voltage applied to each of the cell strings CSTR, the voltage applied to the string selection line SSL, the voltage applied to each of the word lines WL0 to WLn, the voltage applied to the ground selection line GSL, and the voltage applied to the common source line CSL, the three-dimensional flash memory may form a channel in the vertical channel pattern VCP to perform the program operation.

In particular, as described above, by simultaneously using both the charge trap nitride layer of the ONO and at least one layer, which is formed of a ferroelectric material, from among the tunneling oxide layer or the blocking oxide layer of the ONO as a data storage element, the three-dimensional flash memory may expand a memory window and may perform the program operation implementing a multi-value (or multi-bit).

In detail, the three-dimensional flash memory may perform a two-step program operation including a first-step program operation that generates FN tunneling by applying a program voltage of a positive value to a target memory cell targeted for the program operation from among a plurality of memory cells, and a second-step program operation that increases a threshold voltage of the target memory cell by applying a program voltage of a negative value to the target memory cell such that a polarization phenomenon is generated in a region corresponding to the target memory cell.

Figure 21A:
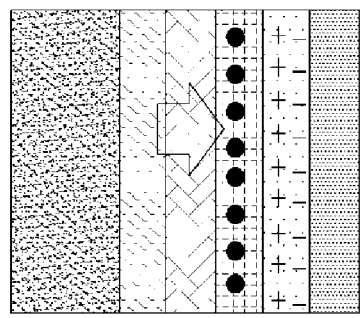
FIGS. 21A to 21C are diagrams for describing a two-step program operation of a three-dimensional flash memory according to an embodiment.
Figure 21A:
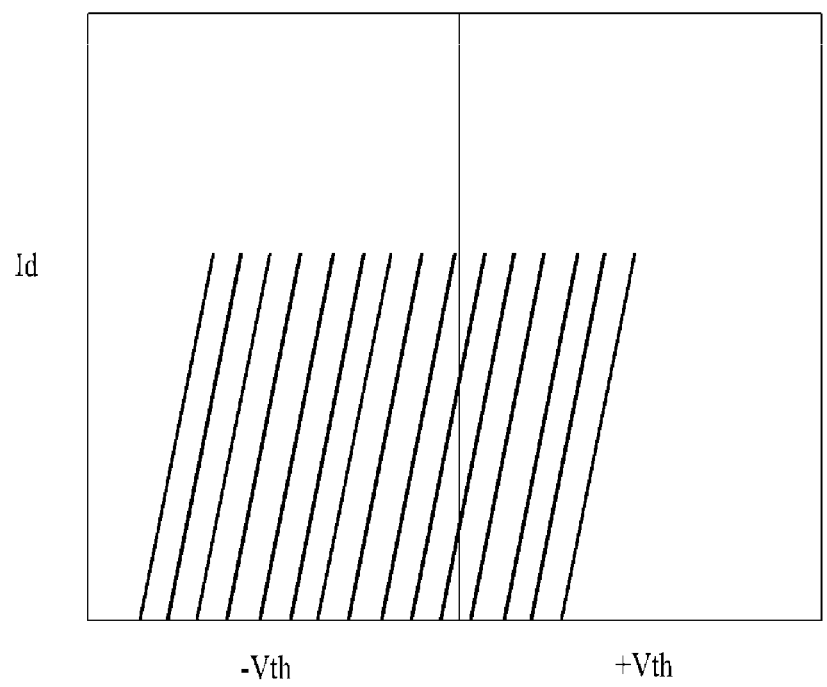
Figure 21B:
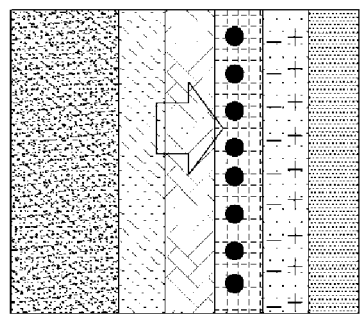
Figure 21B:
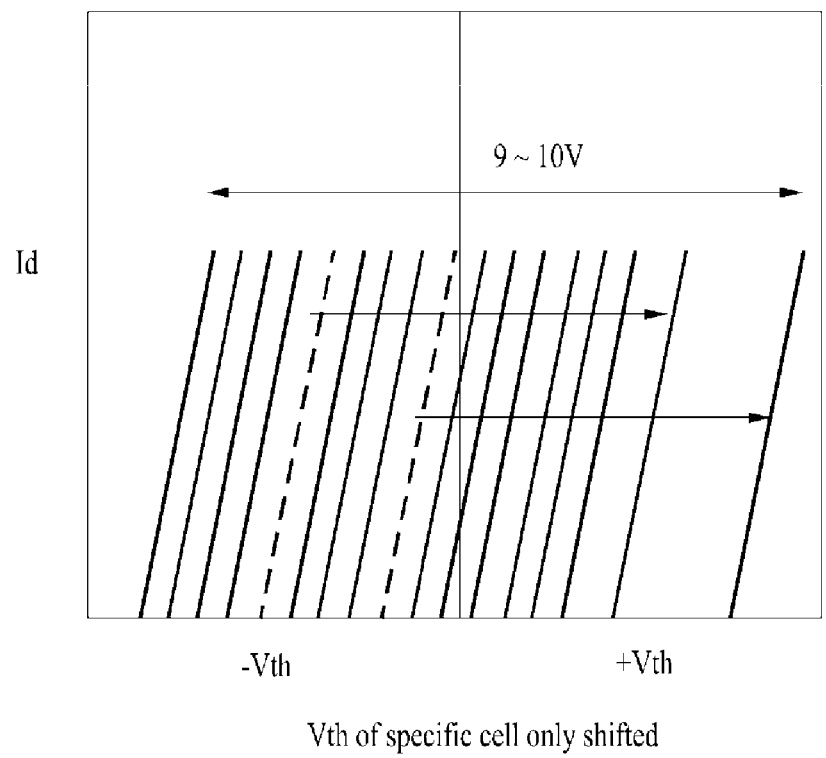

For example, as illustrated in FIG. 21A, the three-dimensional flash memory may perform the first-step program operation by applying a program voltage of a positive value (e.g., 20 V) to the target memory cell such that the FN tunneling is generated. In this case, positive charges may be placed at the interface with the charge trap nitride layer within a region corresponding to the target memory cell among at least one layer formed of a ferroelectric material (hereinafter, the description being given as the blocking oxide layer is formed of a ferroelectric material), and thus, a threshold voltage of the target memory cell may decrease to a negative region. Then, as illustrated in FIG. 21B, the three-dimensional flash memory may perform the second-step program operation by applying a program voltage of a negative value (e.g., −10 V) to the target memory cell. In this case, negative charges may be placed at the interface with the charge trap nitride layer within the region corresponding to the target memory cell among the at least one layer formed of the ferroelectric material, and thus, the threshold voltage of the target memory cell may increase to a positive region.

Figure 21C:
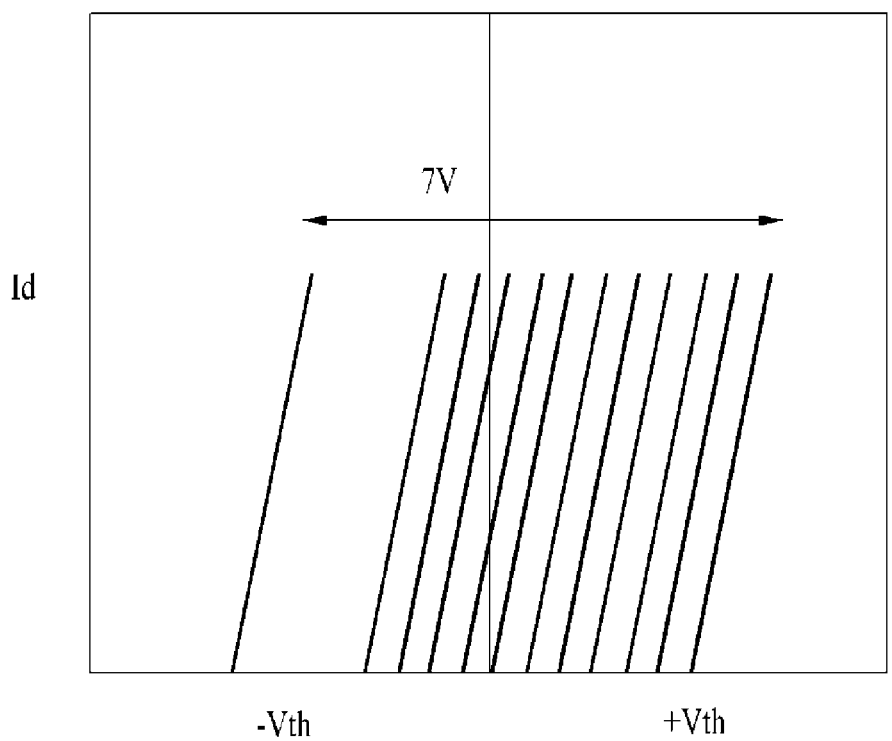

Accordingly, by the two-step programming described above, the memory window may be expanded from a conventional level of 7 V as illustrated in FIG. 21C to a level of 9 V to 10 V as illustrated in FIG. 21B, which may enable a multi-value of 5 bits or more.

In relation to the erase operation, the three-dimensional flash memory performs a two-step erase operation like the program operation. In detail, the three-dimensional flash memory may perform a two-step erase operation including a first-step erase operation and a second-step erase operation. In the first-step erase operation, holes may be injected into the charge trap nitride layer of each of a plurality of memory cells based on the GIDL scheme. In the second-step erase operation, a positive erase voltage may be applied to a word line corresponding to the target memory cell, whose threshold voltage is increased in the second-step program operation, from among a plurality of word lines, and a polarization phenomenon may be caused within the region corresponding to the target memory cell among the at least one layer formed of the ferroelectric material. As such, the threshold voltage of the target memory cell may decrease.

For example, as shown in FIG. 22A, the three-dimensional flash memory may perform the first-step erasing operation in which holes are injected into the charge trap nitride layer of each of the plurality of memory cells based on the GIDL scheme; then, as illustrated in FIG. 22B, the three-dimensional flash memory may perform the second-step erasing operation in which the positive erase voltage is applied to the word line, which corresponds to the target memory cell whose threshold voltage is increased in the second-step program operation, from among the plurality of word lines such that negative charges are placed at the interface with the charge trap nitride layer within the region corresponding to the target memory cell among the at least one layer formed of the ferroelectric material, that is, such that the threshold voltage of the target memory cell is increased to a positive region (i.e., the threshold voltage increased in the second-step program operation is returned).

Figure 23:
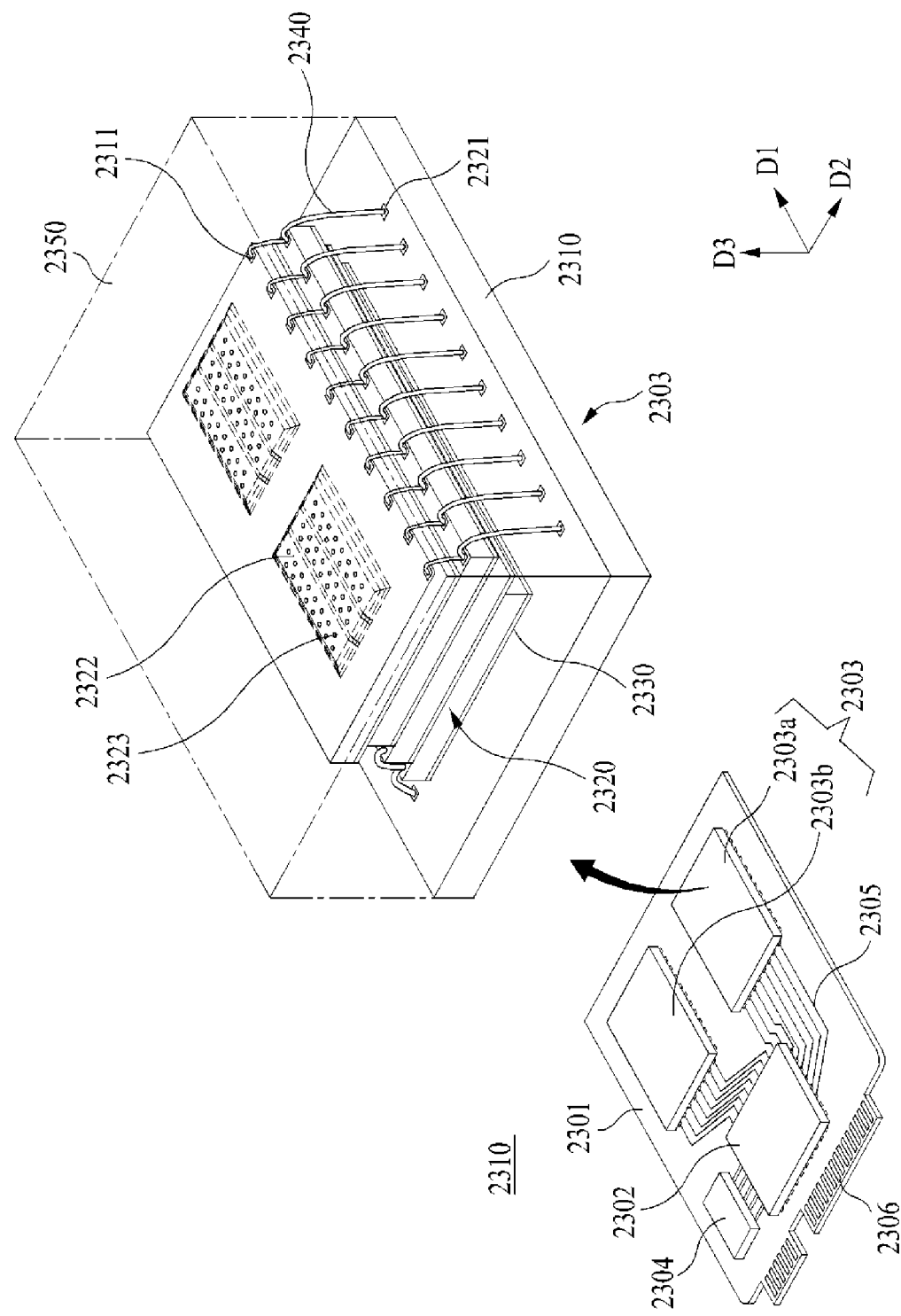
FIG. 23 is a perspective view illustrating an electronic system including a three-dimensional flash memory according to an embodiment.

FIG. 23 is a perspective view illustrating an electronic system including a three-dimensional flash memory according to an embodiment.

Referring to FIG. 23, an electronic system 2300 including the three-dimensional flash memory according to embodiments may include a main board 2301, and a controller 2302, one or more semiconductor packages 2303, and a DRAM 2304 that are mounted on the main board 2301.

The semiconductor packages 2303 and the DRAM 2304 may be connected to the controller 2302 by wiring patterns 2305 provided in the main board 2301.

The main board 2301 may include a connector 2306 including a plurality of pins that are connected to an external host. The number and arrangement of pins of the connector 2306 may change depending on a communication interface between the electronic system 2300 and the external host.

For example, tee electronic system 2300 may communicate with the external host through any one of interfaces such as USB (Universal Serial Bus), PCIE-Express (Peripheral Component Interconnect Express), SATA (Serial Advanced Technology Attachment), and M-Phy for UFS (Universal Flash Storage). The electronic system 2300 may operate, for example, based on a power supplied from the external host through the connector 2306. The electronic system 2300 may further include a power management integrated circuit (PMIC) that distributes the power from the external host into the controller 2302 and the semiconductor packages 2303.

The controller 2302 may record data at the semiconductor packages 2303 or may read data from the semiconductor packages 2303 and may make an operation speed of the electronic system 2300 better.

The DRAM 2304 may be a buffer memory for alleviating a speed difference of the semiconductor packages 2303 being a data storage space and the external host. The DRAM 2304 included in the electronic system 2300 may operate as a kind of cache memory and may provide a space for temporarily storing data in a control operation associated with the semiconductor packages 2303. In the case where the DRAM 2304 is included in the electronic system 2300, the controller 2302 may further include a DRAM controller for controlling the DRAM 2304, in addition to a NAND controller for controlling the semiconductor packages 2303.

The semiconductor packages 2303 may include first and second semiconductor packages 2303a and 2303b spaced from each other. Each of the first and second semiconductor packages 2303a and 2303b may be a semiconductor package including a plurality of semiconductor chips 2320. Each of the first and second semiconductor packages 2303a and 2303b may include a package board 2310, semiconductor chips 2320 on the package board 2310, adhesive layers 2330 respectively disposed on lower surfaces of the semiconductor chips 2320, a connection structure 2340 electrically connecting the semiconductor chips 2320 and the package board 2310, and a molding layer 2350 covering the semiconductor chips 2320 and the connection structure 2340 on the package board 2310.

The package board 2310 may be a printed circuit board including package upper pads 2311. Each of the semiconductor chips 2320 may include input/output pads 2321. Each of the semiconductor chips 2320 may include the three-dimensional flash memory described with reference to FIG. 3 or 4, the three-dimensional flash memory described with reference to FIG. 9 or 10, or the three-dimensional flash memory described with reference to FIGS. 18 to 22B. In detail, each of the semiconductor chips 2320 may include gate stack structures 2322 and memory channel structures 2323. The gate stack structures 2322 may correspond to the stacked structures ST described above, and the memory channel structures 2323 may correspond to the vertical channel structures VS described above. As such, the improved program operation described above may be performed in each of the semiconductor chips 2320.

The connection structures 2340 may be, for example, bonding wires electrically connecting the input/output pads 2321 and the package upper pads 2311. Accordingly, in each of the first and second semiconductor packages 2303a and 2303b, the semiconductor chips 2320 may be electrically connected with each other by the bonding wire method and may be electrically connected with the package upper pads 2311 of the package board 2310. According to embodiments, in each of the first and second semiconductor packages 2303a and 2303b, the semiconductor chips 2320 may be connected to each other by a through silicon via instead of the connection structures 2340 of a bonding wire method.

Unlike the example illustrated, the controller 2302 and the semiconductor chips 2320 may be included in one package. The controller 2302 and the semiconductor chips 2320 may be mounted on a separate interposer board different from the main board 2301, and the controller 2302 and the semiconductor chips 2320 may be connected to each other by wires formed in the interposer board.

While embodiments have been shown and described with reference to the accompanying drawings, it will be apparent to those skilled in the art that various modifications and variations can be made from the foregoing descriptions. For example, the described technologies are performed in an order different from that of the described method, and/or above components such as a system, a structure, a device, and a circuit are united or combined in a form different from that of the described method, or appropriate results may be achieved even though substituted or replaced by any other components or an equivalent.

Therefore, other implementations, other embodiments, and equivalents of the claims belong to the scope of the claims to be described below.

The invention claimed is:

1. A program operation method of a three-dimensional flash memory which includes word lines formed on a substrate to extend in a horizontal direction and disposed to be spaced from each other in a vertical direction; and cell strings penetrating the word lines and formed to extend in the vertical direction, each of the cell strings including a data storage pattern formed to extend in the vertical direction and a vertical channel pattern covering an inner sidewall of the data storage pattern and formed to extend in the vertical direction, and memory cells including the data storage pattern and the vertical channel pattern, the memory cells corresponding to the word lines, the method comprising:
    applying a program voltage to a selected word line corresponding to a target memory cell from among the word lines, wherein the program voltage has a value obtained by adding a step voltage to a previous program voltage applied in a previous program operation, wherein the step voltage is increased as a program operation is repeated.

2. The method of claim 1, wherein the step voltage is uniformly maintained for each program voltage range and is increased when the program voltage range is changed.

3. The method of claim 1, wherein the step voltage increasing the program voltage is continuously increased in proportion to the number of times that the program operation is repeated.

4. A method for a program operation of a three-dimensional flash memory which includes word lines formed on a substrate to extend in a horizontal direction and disposed to be spaced from each other in a vertical direction; and cell strings penetrating the word lines and formed to extend in the vertical direction, each of the cell strings including a data storage pattern formed to extend in the vertical direction and a vertical channel pattern covering an inner sidewall of the data storage pattern and formed to extend in the vertical direction, and memory cells including the data storage pattern and the vertical channel pattern, the memory cells corresponding to the word lines, the method comprising:
    applying a voltage of a negative value to a bit line of a selected cell string corresponding to a target memory cell targeted for the program operation from among the cell strings;
    applying a program voltage to a selected word line corresponding to the target memory cell from among the word lines; and
    performing the program operation on the target memory cell by forming a channel in the vertical channel pattern included in the selected cell string, in response to that the voltage of the negative value is applied to the bit line of the selected cell string and the program voltage is applied to the selected word line.

5. The method of claim 4, wherein the applying of the voltage of the negative value to the bit line of the selected cell string includes:
applying the voltage of the negative value to the bit line of the selected cell string such that a voltage between the selected word line and the bit line of the selected cell string is directly transferred to the vertical channel pattern included in the selected cell string.

6. The method of claim 4, wherein, when the vertical channel pattern includes a back gate formed to extend in the vertical direction with at least a portion thereof surrounded by the vertical channel pattern, the applying of the program voltage to the selected word line includes:
floating remaining unselected word lines among the word lines; and
applying a pass voltage to the back gate.

7. The method of claim 6, wherein the floating of the unselected word lines includes:
preventing a disturb phenomenon due to the pass voltage applied to the unselected word lines as each of the unselected word lines is floated.

8. The method of claim 4, wherein, when the vertical channel pattern includes a back gate formed to extend in the vertical direction with at least a portion thereof surrounded by the vertical channel pattern, the applying of the program voltage to the selected word line includes:
applying a ground voltage to each of remaining unselected word lines among the word lines; and
applying a pass voltage to the back gate.

9. A method for a read operation of a three-dimensional flash memory which includes word lines formed on a substrate to extend in a horizontal direction and disposed to be spaced from each other in a vertical direction; and cell strings penetrating the word lines and formed to extend in the vertical direction, each of the cell strings including a data storage pattern formed to extend in the vertical direction and a vertical channel pattern covering an inner sidewall of the data storage pattern and formed to extend in the vertical direction, and memory cells including the data storage pattern and the vertical channel pattern, the memory cells corresponding to the word lines, and the vertical channel pattern including a back gate formed to extend in the vertical direction with at least a portion thereof surrounded by the vertical channel pattern, the method comprising:
applying a first voltage higher than a ground voltage to a bit line of a selected cell string corresponding to a target memory cell targeted for the read operation from among the cell strings;
applying a verify voltage to a selected word line corresponding to the target memory cell from among the word lines;
applying a read voltage to each of remaining unselected word lines other than the selected word line among the word lines;
applying a voltage of a positive value to the back gate; and
performing the read operation on the target memory cell, in response to that the first voltage is applied to the bit line of the selected cell string, the verify voltage is applied to the selected word line, a pass voltage is applied to each of the unselected word lines, and the voltage of the positive value is applied to the back gate.

10. A three-dimensional flash memory comprising:
word lines formed to extend in a horizontal direction and disposed to be spaced from each other in a vertical direction; and
vertical channel structures penetrating the word lines and formed to extend in the vertical direction,
wherein each of the vertical channel structures includes memory cells including:
a vertical channel pattern formed to extend in the vertical direction; and
a Tunneling Oxide-Charge Trap Nitride-Blocking Oxide (ONO) formed to surround the vertical channel pattern, the ONO including at least one of a tunneling oxide layer or a blocking oxide layer and further including a charge trap nitride layer,
wherein the at least one of the tunneling oxide layer or the blocking oxide layer of the ONO is composed of a ferroelectric material,
wherein the memory cells correspond to the word lines,
wherein the three-dimensional flash memory uses the charge trap nitride layer of the ONO as a primary data storage element and uses at least one layer composed of the ferroelectric material from among the tunneling oxide layer or the blocking oxide layer as a secondary data storage element, and
wherein the three-dimensional flash memory performs a two-step program operation including a first-step program operation which generates FN tunneling by applying a program voltage of a positive value to a target memory cell targeted for a program operation among the memory cells, and a second-step program operation which increases a threshold voltage of the target memory cell by applying a program voltage of a negative value to the target memory cell such that a polarization phenomenon is generated in a region corresponding to the target memory cell among the at least one layer formed of the ferroelectric material.

11. The three-dimensional flash memory of claim 10, wherein the three-dimensional flash memory is configured to:
apply the program voltage of the positive value to the target memory cell to place positive charges at an interface with the charge trap nitride layer within a region corresponding to the target memory cell among the at least one layer formed of the ferroelectric material such that a threshold voltage of the target memory cell decreases to a negative region, and
apply the program voltage of the negative value to the target memory cell to place negative charges at the interface with the charge trap nitride layer within the region corresponding to the target memory cell among the at least one layer formed of the ferroelectric material such that the threshold voltage of the target memory cell increases to a positive region.

* * * * *